United States Patent
Kameyama

(10) Patent No.: US 8,538,139 B2
(45) Date of Patent: Sep. 17, 2013

(54) IMAGE PROCESSING APPARATUS AND METHOD, DATA PROCESSING APPARATUS AND METHOD, AND PROGRAM AND RECORDING MEDIUM

(75) Inventor: Hirokazu Kameyama, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 536 days.

(21) Appl. No.: 12/847,489

(22) Filed: Jul. 30, 2010

(65) Prior Publication Data

US 2011/0026849 A1    Feb. 3, 2011

(30) Foreign Application Priority Data

Jul. 31, 2009  (JP) ................. 2009-179841

(51) Int. Cl.
  *G06K 9/62*  (2006.01)
  *G06K 9/40*  (2006.01)
(52) U.S. Cl.
  USPC .......................... 382/159; 382/254
(58) Field of Classification Search
  USPC ................................. 382/159, 254
  See application file for complete search history.

(56) References Cited

U.S. PATENT DOCUMENTS

| | | | | |
|---|---|---|---|---|
| 7,593,566 B2 * | 9/2009 | Kato et al. | ..... | 382/159 |
| 7,646,919 B2 * | 1/2010 | Olsson et al. | ..... | 382/199 |
| 7,936,906 B2 * | 5/2011 | Hua et al. | ..... | 382/118 |
| 8,306,316 B2 * | 11/2012 | Kameyama | ..... | 382/159 |

OTHER PUBLICATIONS

Kui Jia et al., "Generalized Face Super-Resolution", IEEE Transactions of Image Processing, vol. 17, No. 6, Jun. 2008, pp. 873-886.

* cited by examiner

*Primary Examiner* — Anand Bhatnagar
*Assistant Examiner* — Soo Park
(74) *Attorney, Agent, or Firm* — Birch, Stewart, Kolasch & Birch, LLP

(57) ABSTRACT

The present invention determines the adopting ratio (weight coefficient) between the high image quality processing using the tensor projection method and the high image quality processing using another method according to the degree of deviation of the input condition of the input image, and combines these processes as appropriate. This allows a satisfactory reconstruction image to be acquired even in a case of deviation from the input condition, and avoids deterioration of the high quality image due to deterioration of the reconstruction image by the projective operation.

31 Claims, 25 Drawing Sheets

270

| ORIENTATION | IMAGE PROCESSING PARAMETER |
|---|---|
| 0° | SPECIFIC PARAMETER A0 |
| 20° | SPECIFIC PARAMETER A1 |
| ⋮ | ⋮ |
| OTHER THAN PERSON | NON-SPECIFIC PARAMETER B |

IMAGE PROCESSING APPARATUS AND METHOD, DATA PROCESSING APPARATUS AND METHOD, AND PROGRAM AND RECORDING MEDIUM

BACKGROUND OF THE INVENTION

1. Field of the Invention

The present invention relates to an image processing apparatus and method, data processing apparatus and method, and program and recording medium, and in particular, to an image processing technique and a data processing technique suitable for reconstructing, interpolating, enlarging and encoding high quality image information which does not exist in image data (low image quality information) before processed.

2. Description of the Related Art

As a method for generating a high resolution output image from a low resolution input image, a technique has been proposed that preliminarily learns pairs of low resolution images and high resolution images with respect to a plurality of the contents of images, acquires a transformational (projective) relationship from low resolution image information to high resolution image information and then generates (reconstructs) an image including high resolution information from a low resolution input image using this projective relationship (JIA Kui, GONG Shaogang "Generalized Face Super-Resolution", IEEE Transactions of Image Processing, Vol. 17, No. 6, June 2008 Pages 873-886 (2008)).

This method of the related art can be divided into a learning step and a reconstruction step. The preceding learning step preliminarily learns a projective relationship between the low resolution information and the high resolution information about the group of pairs (referred to as "learning image set") of the low resolution images and the high resolution images using tensor singular value decomposition (TSVD). For instance, tensors representing projective relationships of modality eigenspaces, such as a transformation from a real space of low resolution pixels to a pixel eigenspace, transformation to an individual difference eigenspace of a person (eigenspace), and a transformation further to a high resolution pixel eigenspace, and a transformation from the high resolution pixel eigenspace to the real space, are acquired.

On the other hand, the reconstruction step projects an arbitrary input image of low resolution information including a learning image set to an image of high resolution information using the learned tensor.

This technique is capable of representing the number of variations of the modalities of projective transformations (individual differences of people, facial expressions, resolutions of images, orientations of faces, variations in illumination, human races, etc.) in the ranks of tensors (capable of designing a learning model according thereto), and of reconstruction with high precision by projecting in a state of satisfying the input condition.

SUMMARY OF THE INVENTION

However, the method of the related art has a strict input condition for the projective transformation, and narrow permissible ranges of geometrical "deviations" in image position and size between the images and of variety of individual difference and difference in human race. Accordingly, this offers a problem that an input out of the condition deteriorates reconstruction image quality after the projection. Further, increase in modality of the projective transformation also increases the rank of tensor, which offers problems of decreasing the processing speed and increasing the amount of memory.

These problems are related not only to the image processing, but also to various data processes, such as speech recognition, language data processing, biological information processing, natural and physical information processing, that use similar projective transformations.

For instance, in a case where the technique is applied to the speech recognition, sampling frequencies and the number of quantization (the number of bits) of audio data can be modalities; it is required that learning eigenspaces for speech recognition are provided for respective sampling frequencies, such as 48 kHz, 44.1 kHz and 32 kHz, or the respective number of quantization, such as 16 bits and 8 bits.

In a case where the technique is applied to the language processing, it is required that learning eigenspaces for language recognition should be provided for respective languages, such as the Japanese and English languages. In a case where the technique is applied to the biological information processing, natural and physical information processing and the like, it is also required that learning eigenspaces for information processing should be provided for the respective sampling frequencies or the respective number of quantization.

The present invention is made in view of these situations. It is an object of the present invention to provide a highly precise, highly robust image processing apparatus, method, program, and recording medium realizing image transformation capable of relaxing the input condition of an image as a transformation source. It is another object of the present invention to provide an image processing technique capable of reducing the processing load, enhancing the processing speed and suppressing the required amount of memory, while realizing these precise transformations. It is still another object of the present invention to provide a data processing apparatus, method, program, and recording medium where this image processing technique is applied to a general data processing technique in an enhanced manner.

The following aspects of the present invention are provided in order to achieve the object.

An image processing apparatus pertaining to a first aspect of the present invention includes: an information acquisition device for acquiring an eigen projective matrix generated by a projective operation from a learning image group including pairs of first quality images and second quality images different in image quality from each other, and a projective kernel tensor generated from the learning image group and the eigen projective matrix; a first sub-kernel tensor generation device for generating a first sub-kernel tensor satisfying a condition specified by a first setting from the acquired projective kernel tensor; a second sub-kernel tensor generation device for generating a second sub-kernel tensor satisfying a condition specified by a second setting from the acquired projective kernel tensor; a first sub-tensor projection device for projecting an input image as a processing target using a first projective operation utilizing the eigen projective matrix and the first sub-kernel tensor, and calculating a coefficient vector in an intermediate eigenspace; a second sub-tensor projection device for generating a modified image having a different image quality from that of the input image by projecting the calculated coefficient vector using a second projective operation utilizing the second sub-kernel tensor and the eigen projective matrix; a high image quality processing device for generating a high quality image having the same size as that of the modified image from the input image; a learning image coefficient vector acquisition device for acquiring a coefficient vector of the learning image in the intermediate eigenspace; a weight coefficient determination device for determining a weight coefficient according to a mutual relationship between the coefficient vector of the learning image in the intermediate eigenspace and the coefficient vector of the input image in the intermediate eigenspace calculated by the first sub-tensor projection device; and a synthesis device for determining an adopting ratio between a process including the first and second projective operations and a process by the high image quality processing device according to the weight coefficient, and combining the modified image and the high quality image.

The present invention determines the adopting ratio (weight coefficient) between the high image quality processing using a tensor projection method and a high image quality processing using another method according to a degree of deviation of the input condition of the input image, and combines these processes as appropriate. This allows a satisfactory reconstruction image to be acquired even in a case of deviation from the input condition, and avoids deterioration of the high quality image due to deterioration of the reconstruction image by the projective operation, while allowing optimal determination of adopting the high image quality processing.

In the present invention, a mode that determines the degree of deviation from a positional relationship (distance, direction, etc.) between a learning sample point in the intermediate eigenspace and an input sample point can be exemplified as an example for determining the degree of deviation of the input condition.

A mode that includes a storing device for storing the weight coefficient determined by the weight coefficient determination device is preferably adopted. The weight coefficient may be stored in a format of a lookup table where the input condition is regarded as a parameter.

A mode that adjusts the number of pixels of the input image to the number of pixels of the modified image (or the reconstruction image acquired by the synthesis device) can be exemplified as a mode of the high image quality processing device.

For instance, methods utilizing a local relationship, such as the locality preserving projection (LPP), locally linear embedding (LLE), linear tangent-space alignment (LTSA), Isomap, Laplacian eigenmaps (LE), and neighborhood preserving embedding (NPE), can preferably be used as projective operations. Without limitation thereto, the principal component analysis and the like may be adopted.

The first setting may designate the projective relationship of projecting the first quality image to the intermediate eigenspace. The second setting may designate the projective relationship of projecting the second quality image to the intermediate eigenspace.

An image processing apparatus pertaining to a second aspect of the present invention includes: an information acquisition device for acquiring an eigen projective matrix generated by a projective operation from a learning image group including pairs of first quality images and second quality images different in image quality from each other, a first sub-kernel tensor satisfying a condition specified by a first setting generated using a projective kernel tensor generated from the learning image group and the eigen projective matrix, and a second sub-kernel tensor satisfying a condition specified by a second setting generated using the projective kernel tensor; a first sub-tensor projection device for projecting an input image as a processing target using a first projective operation utilizing the eigen projective matrix and the first sub-kernel tensor, and calculating a coefficient vector in an intermediate eigenspace; a second sub-tensor projection device for generating a modified image having a different image quality from that of the input image by projecting the calculated coefficient vector using a second projective operation utilizing the second sub-kernel tensor and the eigen projective matrix; a high image quality processing device for generating a high quality image having the same size as that of the modified image from the input image; a learning image coefficient vector acquisition device for acquiring a coefficient vector of the learning image in the intermediate eigenspace; a weight coefficient determination device for determining a weight coefficient according to a mutual relationship between the coefficient vector of the learning image in the intermediate eigenspace and the coefficient vector of the input image in the intermediate eigenspace calculated by the first sub-tensor projection device; and a synthesis device for determining an adopting ratio between a process including the first and second projective operations and a process by the high image quality processing device according to the weight coefficient, and combining the modified image and the high quality image.

In this aspect, a mode that includes an information storing device for storing information acquired by the information acquisition device is preferably adopted; a mode where the information is stored in association with the input condition is preferably adopted.

An image processing apparatus pertaining to a third aspect of the present invention includes: an eigen projective matrix generation device for generating an eigen projective matrix generated by a projective operation from a learning image group including pairs of first quality images and second quality images different in image quality from each other; a projective kernel tensor generation device for generating a projective kernel tensor specifying a corresponding relationship between the first quality images and an intermediate eigenspace and a corresponding relationship between the second quality images and the intermediate eigenspace; a first sub-kernel tensor acquisition device for generating a first sub-kernel tensor satisfying a condition specified by a first setting from the generated projective kernel tensor; a second sub-kernel tensor acquisition device for generating a second sub-kernel tensor satisfying a condition specified by a second setting from the generated projective kernel tensor; a first sub-tensor projection device for projecting an input image as a processing target using a first projective operation utilizing the eigen projective matrix and the first sub-kernel tensor, and calculating a coefficient vector in the intermediate eigenspace; a second sub-tensor projection device for generating a modified image having a different image quality from that of the input image by projecting the calculated coefficient vector using a second projective operation utilizing the second sub-kernel tensor and the eigen projective matrix; a high image quality processing device for generating a high quality image having the same size as that of the modified image from the input image; a learning image coefficient vector acquisition device for acquiring a coefficient vector of the learning image in the intermediate eigenspace; a weight coefficient determination device for determining a weight coefficient according to a mutual relationship between the coefficient vector of the learning image in the intermediate eigenspace and the coefficient vector of the input image in the intermediate eigenspace calculated by the first sub-tensor projection device; and a synthesis device for determining an adopting ratio between a process including the first and second projective operations and a process by the high image quality processing device according to the weight coefficient, and combining the modified image and the high quality image.

An image processing apparatus pertaining to a fourth aspect of the present invention is the apparatus according to the third aspect, further including a learning image coefficient vector calculation device for calculating the coefficient vector of the learning image in the intermediate eigenspace by projecting the learning image using the first projective operation utilizing the eigen projective matrix and the first sub-kernel tensor, instead of the learning image coefficient vector acquisition device.

An image processing apparatus pertaining to a fifth aspect of the present invention is the apparatus according to any one of the first to fourth aspects, further including a learning image coefficient vector storing device for storing the coefficient vector of the learning image in the intermediate eigenspace.

As the learning image coefficient vector storing device in this mode, a mode of storing in association with the input condition is preferably adopted.

An image processing apparatus pertaining to a sixth aspect of the present invention is the apparatus according to any one of the first to fifth aspects, wherein the weight coefficient determination device includes a weight coefficient calculation device for calculating the weight coefficient used for the synthesis device according to the mutual relationship between the coefficient vector of the learning image in the intermediate eigenspace and the coefficient vector of the input image in the intermediate eigenspace.

As the calculation of the weight coefficient in this mode, a prescribed function or an operational expression may be used, and a pre-stored lookup table may be referred to.

An image processing apparatus pertaining to a seventh aspect of the present invention is the apparatus according to any one of the first to sixth aspects, wherein the weight coefficient determination device determines the weight coefficient utilizing a reliability coefficient determined from a mutual relationship between a representative coefficient vector in a distribution of coefficient vectors of the input image and the coefficient vector in each area with respect to a distribution of the coefficient vectors of the input image in the intermediate eigenspace where the number of divisions is regarded as a sample when the input image is divided into a plurality of areas.

In this mode, the apparatus is configured such that, if a reliability coefficient is large, the weight coefficient is specified relatively larger and thereby the adopting ratio of the high image quality processing using the tensor projection method is specified relatively higher, and, if the reliability coefficient is small, the adopting ratio of the high image quality processing according to another method is specified relatively higher.

An image processing apparatus pertaining to an eighth aspect of the present invention is the apparatus according to any one of the first to sixth aspects, wherein the weight coefficient determination device determines the weight coefficient in consideration of a reconstruction error represented according to a difference between the predetermined coefficient vector of the learning image in the intermediate eigenspace and a high quality image to be generated from the input image.

It is preferable that the reconstruction error be preliminarily acquired and the relationship between the reconstruction error and the weight coefficient be stored.

An image processing apparatus pertaining to a ninth aspect of the present invention is the apparatus according to any one of the first to eighth aspects, wherein the weight coefficient calculation device determines the weight coefficient such that, relatively the longer the shortest distance between a representative coefficient vector representing a learning image coefficient vector group including at least one coefficient vector of the learning image in the intermediate eigenspace and the coefficient vector of the input image in the eigenspace, the greater an adopting ratio of a process by the high image quality processing device is specified.

According to this mode, relatively the longer the shortest distance between the representative coefficient vector and the input image in the eigenspace, relatively the lower the reliability of the high image quality processing using the tensor projection method, and thus the adopting ratio of the high quality image processing using another method is specified higher, thereby allowing a preferable reconstruction image to be acquired.

An image processing apparatus pertaining to a tenth aspect of the present invention is the apparatus according to the ninth aspect, wherein the weight coefficient determination device determines the weight coefficient with reference to a lookup table representing a relationship of the weight coefficient with the shortest distance between the pre-stored representative coefficient vector and the coefficient vector of the input image in the intermediate eigenspace, on the basis of the shortest distance between the representative coefficient vector in the intermediate eigenspace and the coefficient vector of the input image.

In this mode, a mode that preliminarily acquires and stores the relationship between the shortest distance and the weight coefficient is preferably adopted.

An image processing apparatus pertaining to an eleventh aspect of the present invention is the apparatus according to the ninth or tenth aspect, wherein the shortest distance of the input image with the coefficient vector in the eigenspace is represented as any one of the Euclidean distance, Mahalanobis distance and KL distance.

An image processing apparatus pertaining to a twelfth aspect of the present invention is the apparatus according to any one of the first to eighth aspects, wherein the weight coefficient determination device determines the weight coefficient, according to a degree of similarity in direction between a representative coefficient vector representing a learning image coefficient vector group including at least one coefficient vector of the learning image in the eigenspace and the coefficient vector of the input image in the eigenspace, such that relatively the lower the degree of similarity, the greater an adopting ratio of a process by the high image quality processing device is specified.

In this mode, when the representative coefficient vector in the eigenspace and the coefficient vector of the input image in the eigenspace are compared with each other, the more similar these vectors are, relatively the higher the reliability of the high image quality processing using the tensor projection method becomes; this thereby allows a preferable reconstruction image to be acquired by specifying a higher adopting ratio of the high image quality processing using the tensor projection method.

An image processing apparatus pertaining to a thirteenth aspect of the present invention is the apparatus according to the twelfth aspect, wherein the degree of similarity between the direction of the representative coefficient vector and the coefficient vector of the input image in the eigenspace is represented as any one of an angle, an inner product and an outer product between the representative coefficient vector and the coefficient vector of the input image in the eigenspace.

An image processing apparatus pertaining to a fourteenth aspect of the present invention is the apparatus according to any one of the first to eighth aspects, wherein the weight coefficient determination device determines the weight coefficient, with respect to a distribution of a learning image coefficient vector group including at least one coefficient vector of the learning image in the eigenspace and a distribution of the coefficient vector of the input image in the eigenspace where the number of divisions is regarded as a sample when the input image is divided into a plurality of areas, such that the wider the distribution spread of the coefficient vector of the input image in comparison with that of the learning image coefficient vector group, the greater an adopting ratio of a process by the high image quality processing device is specified.

An image processing apparatus pertaining to a fifteenth aspect of the present invention is the apparatus according to the fourteenth aspect, wherein the distribution spread of the coefficient vector of the input image in the eigenspace where the number of divisions of the input image is regarded as the sample is represented as the number of samples included in the distribution of the coefficient vector of the input image.

An image processing apparatus pertaining to a sixteenth aspect of the present invention is the apparatus according to one of the fourteenth and fifteenth aspects, wherein the distribution spread of the coefficient vector of the input image in the eigenspace where the number of divisions of the input image is regarded as a sample and the distribution spread of the learning image coefficient vector group are represented in any one of a variance and a standard deviation.

An image processing apparatus pertaining to a seventeenth aspect of the present invention is the apparatus according to any one of the first to eighth aspects, wherein the weight coefficient is calculated so that the distribution profile of the learning image coefficient vector group including at least one coefficient vector of the learning image in the eigenspace and the distribution profile of the coefficient vector of the input image in the eigenspace where the number of divisions is regarded as a sample when the input image is divided into a plurality of areas, such that the higher a degree of similarity between the distribution profile of the learning image coefficient vector group and the distribution profile of the coefficient vector of the input image in the eigenspace, the greater an adopting ratio of a process including the first and second projective operations.

An image processing apparatus pertaining to an eighteenth aspect of the present invention is the apparatus according to any one of the ninth to sixteenth aspects, wherein the representative coefficient vector is any one of the average value, median value, maximum value and minimum value of the coefficient vectors of the learning image included in the learning image coefficient vector group.

An image processing apparatus pertaining to a nineteenth aspect of the present invention is the apparatus according to any one of the ninth to sixteenth aspects, wherein the representative coefficient vector is the coefficient vector of the leaning image representing the center of gravity or circumferential boundary of the learning image coefficient vector group.

An image processing apparatus pertaining to a twentieth aspect of the present invention is the apparatus according to any one of the first to nineteenth aspects, wherein the synthesis device includes a filtering process device for applying a filtering process to a boundary between the modified image and the high quality image.

An image processing apparatus pertaining to a twenty-first aspect of the present invention is the apparatus according to any one of the first to twentieth aspects, wherein the first quality image is a relatively low quality image of the pair of images, the second quality image is a relatively high quality image of the pair of images, and the modified quality image is an image with higher quality than that of the input image.

An image processing apparatus pertaining to a twenty-second aspect of the present invention is the apparatus according to any one of the first to twenty-first aspects, wherein the first setting designates a projective relationship projecting the first quality image to the intermediate eigenspace, and the second setting designates a projective relationship projecting the second quality image to the intermediate eigenspace.

An image processing apparatus pertaining to a twenty-third aspect of the present invention is the apparatus according to any one of the first to twenty-first aspects, wherein the projective operation is any one of locality preserving projection (LPP), locally linear embedding (LLE) and linear tangent-space alignment (LTSA).

An image processing apparatus pertaining to a twenty-fourth aspect of the present invention is the apparatus according to any one of the first to twenty-third aspects, wherein the learning image group includes the pairs of images regarding a human face as a target, and the intermediate eigenspace is a personal difference eigenspace.

An image processing apparatus pertaining to a twenty-fifth aspect of the present invention is the apparatus according to any one of the first to twenty-fourth aspects, further including: a first characteristic area identification device for identifying a first characteristic area in the inputted image; a compression process device for compressing an image part of the first characteristic area with respect to the inputted image by a first degree of compression and compressing an image part other than the first characteristic area by a second degree of compression greater than the first degree of compression; and an image quality modification device for modifying image quality by projecting at least the first characteristic area by the first and the second sub-tensor projection devices.

An image processing method pertaining to a twenty-sixth aspect of the present invention includes: an information acquiring step of acquiring an eigen projective matrix generated by a projective operation from a learning image group including pairs of first quality images and second quality images different in image quality from each other, and a projective kernel tensor generated from the learning image group and the eigen projective matrix; a first sub-kernel tensor generating step of generating a first sub-kernel tensor satisfying a condition specified by a first setting from the acquired projective kernel tensor; a second sub-kernel tensor generating step of generating a second sub-kernel tensor satisfying a condition specified by a second setting from the acquired projective kernel tensor; a first sub-tensor projecting step of projecting an input image as a processing target using a first projective operation utilizing the eigen projective matrix and the first sub-kernel tensor, and calculating a coefficient vector in an intermediate eigenspace; a second sub-tensor projecting step of generating a modified image having a different image quality from that of the input image by projecting the calculated coefficient vector using a second projective operation utilizing the second sub-kernel tensor and the eigen projective matrix; a high image quality processing step of generating a high quality image having the same size as that of the modified image from the input image; a learning image coefficient vector acquiring step of acquiring a coefficient vector of the learning image in the intermediate eigenspace; a weight coefficient determining step of determining a weight coefficient according to a mutual relationship between the coefficient vector of the learning image in the intermediate eigenspace and the coefficient vector of the input image in the intermediate eigenspace calculated by the first sub-tensor projecting step; and a synthesis step of determining an adopting ratio between a process including the first and second projective operations and a process by the high image quality processing step according to the weight coefficient, and combining the modified image and the high quality image.

An image processing method pertaining to a twenty-seventh aspect of the present invention includes: an information acquiring step of acquiring an eigen projective matrix generated by a projective operation from a learning image group including pairs of first quality images and second quality images different in image quality from each other, a first sub-kernel tensor satisfying a condition specified by a first setting generated using a projective kernel tensor generated from the learning image group and the eigen projective matrix, and a second sub-kernel tensor satisfying a condition specified by a second setting generated using the projective kernel tensor; a first sub-tensor projecting step of projecting an input image as a processing target using a first projective operation utilizing the eigen projective matrix and the first sub-kernel tensor, and calculating a coefficient vector in an intermediate eigenspace; a second sub-tensor projecting step of generating a modified image having a different image quality from that of the input image by projecting the calculated coefficient vector using a second projective operation utilizing the second sub-kernel tensor and the eigen projective matrix; a high image quality processing step of generating a high quality image having the same size as that of the modified image from the input image; a learning image coefficient vector acquiring step of acquiring a coefficient vector of the learning image in the intermediate eigenspace; a weight coefficient determining step of determining a weight coefficient according to a mutual relationship between the coefficient vector of the learning image in the intermediate eigenspace and the coefficient vector of the input image in the intermediate eigenspace calculated by the first sub-tensor projecting step; and a synthesis step of determining an adopting ratio between a process including the first and second projective operations and a process by the high image quality processing step according to the weight coefficient, and combining the modified image and the high quality image.

An image processing method pertaining to a twenty-eighth aspect of the present invention includes: an eigen projective matrix generating step of generating an eigen projective matrix generated by a projective operation from a learning image group including pairs of first quality images and second quality images different in image quality from each other; a projective kernel tensor generating step of generating a projective kernel tensor specifying a corresponding relationship between the first quality images and an intermediate eigenspace and a corresponding relationship between the second quality images and the intermediate eigenspace; a first sub-kernel tensor acquiring step of generating a first sub-kernel tensor satisfying a condition specified by a first setting from the generated projective kernel tensor; a second sub-kernel tensor acquiring step of generating a second sub-kernel tensor satisfying a condition specified by a second setting from the generated projective kernel tensor; a first sub-tensor projecting step of projecting an input image as a processing target using a first projective operation utilizing the eigen projective matrix and the first sub-kernel tensor, and calculating a coefficient vector in the intermediate eigenspace; a second sub-tensor projecting step of generating a modified image having a different image quality from that of the input image by projecting the calculated coefficient vector using a second projective operation utilizing the second sub-kernel tensor and the eigen projective matrix; a high image quality processing step of generating a high quality image having the same size as that of the modified image from the input image; a learning image coefficient vector acquiring step of acquiring a coefficient vector of the learning image in the intermediate eigenspace; a weight coefficient determining step of determining a weight coefficient according to a mutual relationship between the coefficient vector of the learning image in the intermediate eigenspace and the coefficient vector of the input image in the intermediate eigenspace calculated by the first sub-tensor projection step; and a synthesis step of determining an adopting ratio between a process including the first and second projective operations and a process by the high image quality processing step according to the weight coefficient, and combining the modified image and the high quality image.

According to a recording medium pertaining to a twenty-ninth aspect of the present invention, computer readable code of an image processing program is stored in the recording medium, and the image processing program causes a computer to function as: an information acquisition device for acquiring an eigen projective matrix generated by a projective operation from a learning image group including pairs of first quality images and second quality images different in image quality from each other, and a projective kernel tensor generated from the learning image group and the eigen projective matrix; a first sub-kernel tensor generation device for generating a first sub-kernel tensor satisfying a condition specified by a first setting from the acquired projective kernel tensor; a second sub-kernel tensor generation device for generating a second sub-kernel tensor satisfying a condition specified by a second setting from the acquired projective kernel tensor; a first sub-tensor projection device for projecting an input image as a processing target using a first projective operation utilizing the eigen projective matrix and the first sub-kernel tensor, and calculating a coefficient vector in an intermediate eigenspace; a second sub-tensor projection device for generating a modified image having a different image quality from that of the input image by projecting the calculated coefficient vector using a second projective operation utilizing the second sub-kernel tensor and the eigen projective matrix; a high image quality processing device for generating a high quality image having the same size as that of the modified image from the input image; a learning image coefficient vector acquisition device for acquiring a coefficient vector of the learning image in the intermediate eigenspace; a weight coefficient determination device for determining a weight coefficient according to a mutual relationship between the coefficient vector of the learning image in the intermediate eigenspace and the coefficient vector of the input image in the intermediate eigenspace calculated by the first sub-tensor projection device; and a synthesis device for determining an adopting ratio between a process including the first and second projective operations and a process by the high image quality processing device according to the weight coefficient, and combining the modified image and the high quality image.

According to a recording medium pertaining to a thirtieth aspect of the present invention, computer readable code of an image processing program is stored in the recording medium, and the image processing program causes a computer to function as: an information acquisition device for acquiring an eigen projective matrix generated by a projective operation from a learning image group including pairs of first quality images and second quality images different in image quality from each other, a first sub-kernel tensor satisfying a condition specified by a first setting generated using a projective kernel tensor generated from the learning image group and the eigen projective matrix, and a second sub-kernel tensor satisfying a condition specified by a second setting generated using the projective kernel tensor; a first sub-tensor projection device for projecting an input image as a processing target using a first projective operation utilizing the eigen projective matrix and the first sub-kernel tensor, and calculating a coefficient vector in an intermediate eigenspace; a second sub-tensor projection device for generating a modified image having a different image quality from that of the input image by projecting the calculated coefficient vector using a second projective operation utilizing the second sub-kernel tensor and the eigen projective matrix; a high image quality processing device for generating a high quality image having the same size as that of the modified image from the input image; a learning image coefficient vector acquisition device for acquiring a coefficient vector of the learning image in the intermediate eigenspace; a weight coefficient determination device for determining a weight coefficient according to a mutual relationship between the coefficient vector of the learning image in the intermediate eigenspace and the coefficient vector of the input image in the intermediate eigenspace calculated by the first sub-tensor projection device; and a synthesis device for determining an adopting ratio between a process including the first and second projective operations and a process by the high image quality processing device according to the weight coefficient, and combining the modified image and the high quality image.

According to a recording medium pertaining to a thirty-first aspect of the present invention, computer readable code of an image processing program is stored in the recording medium, and the image processing program causes a computer to function as: an eigen projective matrix generation device for generating an eigen projective matrix generated by a projective operation from a learning image group including pairs of first quality images and second quality images different in image quality from each other; a projective kernel tensor generation device for generating a projective kernel tensor specifying a corresponding relationship between the first quality images and an intermediate eigenspace and a corresponding relationship between the second quality images and the intermediate eigenspace; a first sub-kernel tensor acquisition device for generating a first sub-kernel tensor satisfying a condition specified by a first setting from the generated projective kernel tensor; a second sub-kernel tensor acquisition device for generating a second sub-kernel tensor satisfying a condition specified by a second setting from the generated projective kernel tensor; a first sub-tensor projection device for projecting an input image as a processing target using a first projective operation utilizing the eigen projective matrix and the first sub-kernel tensor, and calculating a coefficient vector in the intermediate eigenspace; a second sub-tensor projection device for generating a modified image having a different image quality from that of the input image by projecting the calculated coefficient vector using a second projective operation utilizing the second sub-kernel tensor and the eigen projective matrix; a high image quality processing device for generating a high quality image having the same size as that of the modified image from the input image; a learning image coefficient vector acquisition device for acquiring a coefficient vector of the learning image in the intermediate eigenspace; a weight coefficient determination device for determining a weight coefficient according to a mutual relationship between the coefficient vector of the learning image in the intermediate eigenspace and the coefficient vector of the input image in the intermediate eigenspace calculated by the first sub-tensor projection device; and a synthesis device for determining an adopting ratio between a process including the first and second projective operations and a process by the high image quality processing device according to the weight coefficient, and combining the modified image and the high quality image.

A data processing apparatus pertaining to a thirty-second aspect of the present invention includes: an information acquisition device for acquiring an eigen projective matrix generated by a projective operation from a learning data group including pairs of first condition data and second condition data different in condition from each other, and a first sub-kernel tensor generated so as to satisfy a condition specified by a first setting from a projective kernel tensor generated from the learning data group and the eigen projective matrix and specifying a corresponding relationship between the first condition data and an intermediate eigenspace and a corresponding relationship between the second condition data and the intermediate eigenspace; a first sub-tensor projection device for projecting input data as a processing target using a first projective operation utilizing the eigen projective matrix and the first sub-kernel tensor, and calculating a coefficient vector in an intermediate eigenspace; a transformation process device for generating transformed data transformed from the input data on the basis of the same condition as that of modified data generated from the projective operation utilizing the coefficient vector and having a different condition from that of the input data; a learning data coefficient vector acquisition device for acquiring a coefficient vector of the learning data in the intermediate eigenspace; a weight coefficient determination device for determining a weight coefficient according to a mutual relationship between the coefficient vector of the learning data in the intermediate eigenspace and the coefficient vector of the input data in the intermediate eigenspace calculated by the first sub-tensor projection device; and a synthesis device for determining an adopting ratio between a process including the first projective operation and a process by the transformation process device according to the weight coefficient, and combining the modified data and the transformed data.

A data processing apparatus pertaining to a thirty-third aspect of the present invention includes: an information acquisition device for acquiring an eigen projective matrix generated by a projective operation from a learning data group including pairs of first condition data and second condition data different in condition from each other, and a first sub-kernel tensor generated so as to satisfy a condition specified by a first setting generated using a projective kernel tensor generated from the learning data group and the eigen projective matrix and specifying a corresponding relationship between the first condition data and an intermediate eigenspace and a corresponding relationship between the second condition data and the intermediate eigenspace; a first sub-tensor projection device for projecting input data as a processing target using a first projective operation utilizing the eigen projective matrix and the first sub-kernel tensor, and calculating a coefficient vector in an intermediate eigenspace; a transformation process device for generating transformed data transformed from the input data on the basis of the same condition as that of modified data generated from the projective operation utilizing the coefficient vector and having a different condition from that of the input data; a learning data coefficient vector acquisition device for acquiring a coefficient vector of the learning data in the intermediate eigenspace; a weight coefficient determination device for determining a weight coefficient according to a mutual relationship between the coefficient vector of the learning data in the intermediate eigenspace and the coefficient vector of the input data in the intermediate eigenspace calculated by the first sub-tensor projection device; and a synthesis device for determining an adopting ratio between a process including the first projective operation and a process by the transformation process device according to the weight coefficient, and combining the modified data and the transformed data.

A data processing apparatus pertaining to a thirty-fourth aspect of the present invention includes: an eigen projective matrix generation device for generating an eigen projective matrix generated by a projective operation from a learning data group including pairs of first condition data and second condition data different in condition from each other; a projective kernel tensor generation device for generating a projective kernel tensor generated from the learning data group and the eigen projective matrix and specifying a corresponding relationship between the first condition data and an intermediate eigenspace and a corresponding relationship between the second condition data and the intermediate eigenspace; a first sub-kernel tensor generation device for generating a first sub-kernel tensor generated so as to satisfy a condition specified by a first setting from the generated projective kernel tensor; a first sub-tensor projection device for projecting input data as a processing target using a first projective operation utilizing the eigen projective matrix and the first sub-kernel tensor, and calculating a coefficient vector in an intermediate eigenspace; a transformation process device for generating transformed data transformed from the input data on the basis of the same condition as that of modified data generated from the projective operation utilizing the coefficient vector and having a different condition from that of the input data; a learning data coefficient vector acquisition device for acquiring a coefficient vector of the learning data in the intermediate eigenspace; a weight coefficient determination device for determining a weight coefficient according to a mutual relationship between the coefficient vector of the learning data in the intermediate eigenspace and the coefficient vector of the input data in the intermediate eigenspace calculated by the first sub-tensor projection device; and a synthesis device for determining an adopting ratio between a process including the first projective operation and a process by the transformation process device according to the weight coefficient, and combining the modified data and the transformed data.

A data processing method pertaining to a thirty-fifth aspect of the present invention includes: an information acquiring step of acquiring an eigen projective matrix generated by a projective operation from a learning data group including pairs of first condition data and second condition data different in condition from each other, and a first sub-kernel tensor generated so as to satisfy a condition specified by a first setting from a projective kernel tensor generated from the learning data group and the eigen projective matrix and specifying a corresponding relationship between the first condition data and an intermediate eigenspace and a corresponding relationship between the second condition data and the intermediate eigenspace; a first sub-tensor projecting step of projecting input data as a processing target using a first projective operation utilizing the eigen projective matrix and the first sub-kernel tensor, and calculating a coefficient vector in the intermediate eigenspace; a transformation processing step of generating transformed data transformed from the input data on the basis of the same condition as that of modified data generated from the projective operation utilizing the coefficient vector and having a different condition from that of the input data; a learning data coefficient vector acquiring step of acquiring a coefficient vector of the learning data in the intermediate eigenspace; a weight coefficient determining step of determining a weight coefficient according to a mutual relationship between the coefficient vector of the learning data in the intermediate eigenspace and the coefficient vector of the input data in the intermediate eigenspace calculated by the first sub-tensor projecting step; and a synthesis step of determining an adopting ratio between a process including the first projective operation and a process by the transformation processing step according to the weight coefficient, and combining the modified data and the transformed data.

A data processing method pertaining to a thirty-sixth aspect of the present invention includes: an information acquiring step of acquiring an eigen projective matrix generated by a projective operation from a learning data group including pairs of first condition data and second condition data different in condition from each other, and a first sub-kernel tensor generated so as to satisfy a condition specified by a first setting generated using a projective kernel tensor generated from the learning data group and the eigen projective matrix and specifying a corresponding relationship between the first condition data and an intermediate eigenspace and a corresponding relationship between the second condition data and the intermediate eigenspace; a first sub-tensor projecting step of projecting input data as a processing target using a first projective operation utilizing the eigen projective matrix and the first sub-kernel tensor, and calculating a coefficient vector in the intermediate eigenspace; a transformation processing step of generating transformed data transformed from the input data on the basis of the same condition as that of modified data generated from the projective operation utilizing the coefficient vector and having a different condition from that of the input data; a learning data coefficient vector acquiring step of acquiring a coefficient vector of the learning data in the intermediate eigenspace; a weight coefficient determining step of determining a weight coefficient according to a mutual relationship between the coefficient vector of the learning data in the intermediate eigenspace and the coefficient vector of the input data in the intermediate eigenspace calculated by the first sub-tensor projecting step; and a synthesis step of determining an adopting ratio between a process including the first projective operation and a process by the transformation processing step according to the weight coefficient, and combining the modified data and the transformed data.

A data processing method pertaining to a thirty-seventh aspect of the present invention includes: an eigen projective matrix generating step of generating an eigen projective matrix generated by a projective operation from a learning data group including pairs of first condition data and second condition data different in condition from each other; a projective kernel tensor generating step of generating a projective kernel tensor generated from the learning data group and the eigen projective matrix and specifying a corresponding relationship between the first condition data and an intermediate eigenspace and a corresponding relationship between the second condition data and the intermediate eigenspace; a first sub-kernel tensor acquiring step of generating a first sub-kernel tensor generated so as to satisfy a condition specified by a first setting from the generated projective kernel tensor; a first sub-tensor projecting step of projecting input data as a processing target using a first projective operation utilizing the eigen projective matrix and the first sub-kernel tensor, and calculating a coefficient vector in the intermediate eigenspace; a transformation processing step of generating transformed data transformed from the input data on the basis of the same condition as that of modified data generated from the projective operation utilizing the coefficient vector and having a different condition from that of the input data; a learning data coefficient vector acquiring step of acquiring a coefficient vector of the learning data in the intermediate eigenspace; a weight coefficient determining step of determining a weight coefficient according to a mutual relationship between the coefficient vector of the learning data in the intermediate eigenspace and the coefficient vector of the input data in the intermediate eigenspace calculated by the first sub-tensor projection step; and a synthesis step of determining an adopting ratio between a process including the first projective operation and a process by the transformation processing step according to the weight coefficient, and combining the modified data and the transformed data.

A data processing program pertaining to a thirty-eighth aspect of the present invention causes a computer to function as: an information acquisition device for acquiring an eigen projective matrix generated by a projective operation from a learning data group including pairs of first condition data and second condition data different in condition from each other, and a first sub-kernel tensor generated so as to satisfy a condition specified by a first setting from a projective kernel tensor generated from the learning data group and the eigen projective matrix and specifying a corresponding relationship between the first condition data and an intermediate eigenspace and a corresponding relationship between the second condition data and the intermediate eigenspace; a first sub-tensor projection device for projecting input data as a processing target using the eigen projective matrix and the first projective operation, and calculating a coefficient vector in the intermediate eigenspace; a transformation process device for generating transformed data transformed from the input data on the basis of the same condition as that of modified data generated from the projective operation utilizing the coefficient vector and having a different condition from that of the input data; a learning data coefficient vector acquisition device for acquiring a coefficient vector of the learning data in the intermediate eigenspace; a weight coefficient determination device for determining a weight coefficient according to a mutual relationship between the coefficient vector of the learning data in the intermediate eigenspace and the coefficient vector of the input data in the intermediate eigenspace calculated by the first sub-tensor projection device; and a synthesis device for determining an adopting ratio between a process including the first projective operation and a process by the transformation process device according to the weight coefficient, and combining the modified data and the transformed data.

A data processing program pertaining to a thirty-ninth aspect of the present invention causes a computer to function as: an information acquisition device for acquiring an eigen projective matrix generated by a projective operation from a learning data group including pairs of first condition data and second condition data different in condition from each other, and a first sub-kernel tensor generated so as to satisfy a condition specified by a first setting generated using a projective kernel tensor generated from the learning data group and the eigen projective matrix and specifying a corresponding relationship between the first condition data and an intermediate eigenspace and a corresponding relationship between the second condition data and the intermediate eigenspace; a first sub-tensor projection device for projecting input data as a processing target using a first projective operation utilizing the eigen projective matrix and the first sub-kernel tensor, and calculating a coefficient vector in an intermediate eigenspace; a transformation process device for generating transformed data transformed from the input data on the basis of the same condition as that of modified data generated from the projective operation utilizing the coefficient vector and having a different condition from that of the input data; a learning data coefficient vector acquisition device for acquiring a coefficient vector of the learning data in the intermediate eigenspace; a weight coefficient determination device for determining a weight coefficient according to a mutual relationship between the coefficient vector of the learning data in the intermediate eigenspace and the coefficient vector of the input data in the intermediate eigenspace calculated by the first sub-tensor projection device; and a synthesis device for determining an adopting ratio between a process including the first projective operation and a process by the transformation process device according to the weight coefficient, and combining the modified data and the transformed data.

A data processing program pertaining to a fortieth aspect of the present invention causes a computer to function as: an eigen projective matrix generation device for generating an eigen projective matrix generated by a projective operation from a learning data group including pairs of first condition data and second condition data different in condition from each other; a projective kernel tensor generation device for generating a projective kernel tensor generated from the learning data group and the eigen projective matrix and specifying a corresponding relationship between the first condition data and an intermediate eigenspace and a corresponding relationship between the second condition data and the intermediate eigenspace; a first sub-kernel tensor generation device for generating a first sub-kernel tensor generated so as to satisfy a condition specified by a first setting from the generated projective kernel tensor; a first sub-tensor projection device for projecting input data as a processing target using a first projective operation utilizing the eigen projective matrix and the first sub-kernel tensor, and calculating a coefficient vector in the intermediate eigenspace; a transformation process device for generating transformed data transformed from the input data on the basis of the same condition as that of modified data generated from the projective operation utilizing the coefficient vector and having a different condition from that of the input data; a learning data coefficient vector acquisition device for acquiring a coefficient vector of the learning data in the intermediate eigenspace; a weight coefficient determination device for determining a weight coefficient according to a mutual relationship between the coefficient vector of the learning data in the intermediate eigenspace and the coefficient vector of the input data in the intermediate eigenspace calculated by the first sub-tensor projection device; and a synthesis device for determining an adopting ratio between a process including the first projective operation and a process by the transformation process device according to the weight coefficient, and combining the modified data and the transformed data.

According to the thirty-second to fortieth aspects of the present invention, for instance, with an example for description of a case of applying the personal identification based on a facial image, a plurality of conditions (commonly one or more condition) such as facing the front, facing right, facing left, . . . , etc., may be considered with regard to the orientation of a face; there are characteristics that any input of the image in any direction, provided that the input corresponds to the same person, condenses into one point in a common second eigenspace by projection from a first eigenspace (i.e., pixel eigenspace) to the common second eigenspace (i.e., "intermediate eigenspace", e.g., the individual difference eigenspace) with preservation of the locality through a modality of "orientation" having one or more condition. Since the projection can thus be made from the first eigenspace to the second eigenspace, it is not required to prepare the condition to determine the positional relationship ("proximity") between the learning samples and the input samples for every condition of orientation (facing the front, facing left, facing right, . . . ) in the second eigenspace. The one or more conditions can precisely be handled according to a single standard. Further, combination with another process according to the degree of deviation of the input condition allows realization of robustness. Accordingly, a precise, robust processing can be realized; advantageous effects of enhancing the processing speed and reducing the amount of memory are exerted.

Specific examples of the transformation process devices (steps) pertaining to the thirty-second to fortieth aspects of the present invention include the PCA, SVA (support vector regression) and adaBoost. Similar devices (steps) to those of the first to third and twenty-sixth to thirty-first aspects can be applied to the learning coefficient vector acquisition device (step), weight coefficient acquisition device (step), device (step) for determining the adopting ratio between the two processes, and synthesis device (step).

Similar devices (steps) to the characteristics of the fourth to twenty-fifth aspects of the present invention can arbitrarily be added to any one of the twenty-sixth to twenty-eighth and thirty-fifth to thirty-seventh aspects of the methods of the present invention, the twenty-ninth to thirty-first and thirty-eighth to fortieth aspects of the programs of the present invention, and the data processing apparatuses pertaining to the thirty-second to thirty-fourth aspects of the present invention.

A forty-second aspect of the present invention is a recording medium in which computer readable code of the program according to any one of the thirty-eighth to fortieth aspects is stored.

The present invention determines the adopting ratio (weight coefficient) between the high image quality processing using the tensor projection method and the high image quality processing using another method according to the degree of deviation of the input condition of the input image, and combines these processes as appropriate. This allows a satisfactory reconstruction image to be acquired even in a case of deviation from the input condition, and avoids deterioration of the high quality image due to deterioration of the reconstruction image by the projective operation.

Transformation to the same rank in the tensor space allows the optimal system to be determined and adopted, relaxes the input condition, and realizes a robust image processing, using the distance and direction of the coefficient vectors between the learning sample and the newly inputted image. The image transformation through one of the eigenspaces of the projections using the local relationship on the basis of this adopting ratio can represent any input image vector as an interpolation point having high linearity with respect to the learning image sample vector group, in the intermediate eigenspace through which the transformation is made, according to the characteristics of the projection utilizing the locality.

The projection utilizing the locality can determines a projective relationship ensuring a high reproducibility while reducing the number of dimensions.

This realizes the robust, precise image transformation; the reduction in the number of dimensions can satisfy demands to reduce the processing load, enhance the processing speed, and suppress the amount of memory.

DETAILED DESCRIPTION OF THE PREFERRED EMBODIMENTS

Figure 1:
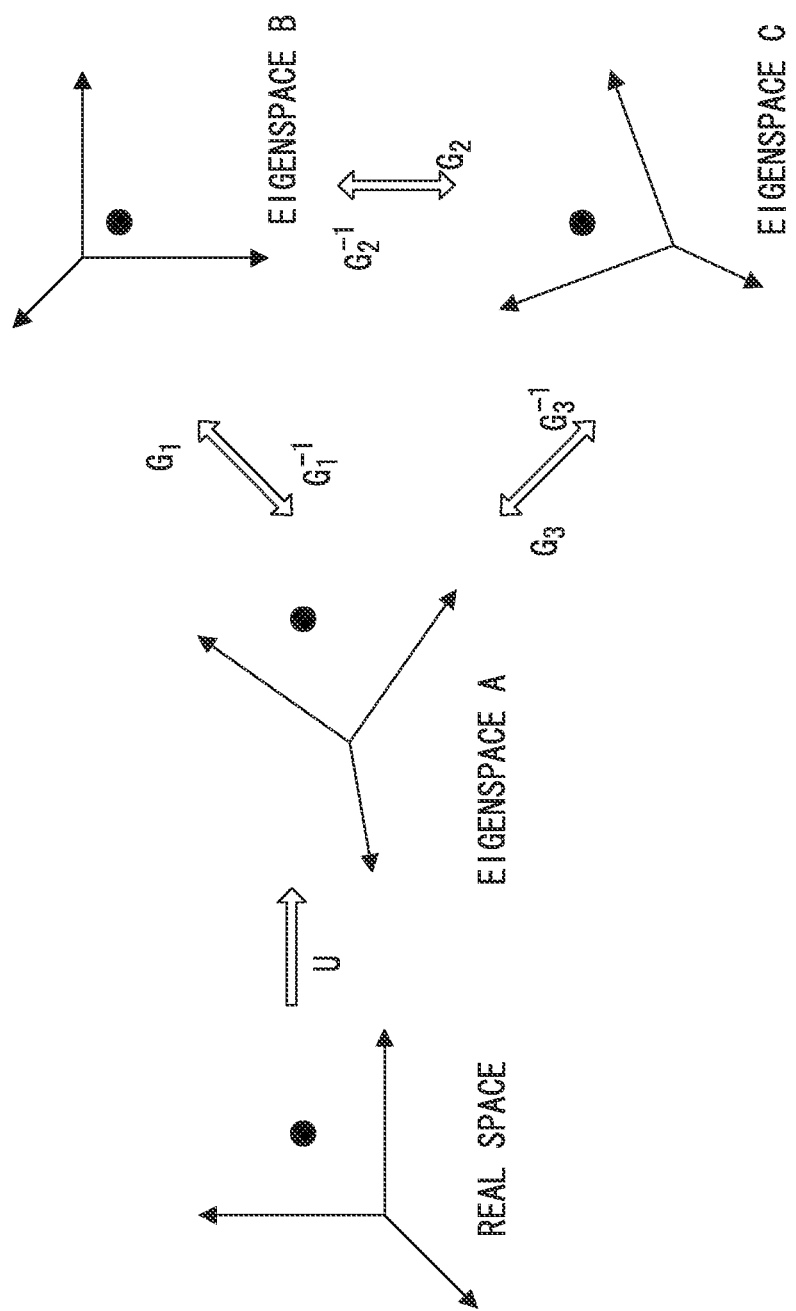
FIG. 1 is a conceptual diagram of a tensor projection.

Embodiments of the present invention will hereinafter be described in detail with reference to the accompanying drawings.

The present invention can be applied to various applications. Here, facial images of people will be dealt with, and descriptions will be made using examples of reconstructing a high quality image from a low quality image.

<Principle of Projective Transformation for Reconstructing from Low Quality Facial Image to High Quality Facial Image>

First, a principle of a projective transformation will be described. In a preparatory stage for reconstructing a high quality image from a low quality input image, facial image data of a plurality of people is preliminarily learned, and a function specifying a transformation relationship is acquired. This process is referred to as a learning step. A step of reconstructing a high quality output image from any input image (low image quality) using the transformation function acquired in the learning step is referred to as a reconstruction step.

(About Learning Image Set)

A learning image group, which includes pairs of low and high resolution images of the faces of a plurality of people (e.g., 60 people), is prepared as a learning image set. As to the learning image set to be used here, images reduced in resolution by reducing information under a certain condition such as by thinning out pixels of the high resolution learning images by a prescribed ratio are used as the low resolution learning images. The transformation function (tensor specifying the projection) is generated by preliminarily learning corresponding relationships between the pairs of the low resolution learning images generated by the information reduction and the original high resolution learning images corresponding thereto (images of the same person and the same contents).

The sizes (the numbers of pixels) and gradations, which represent concentration, of target images are not particularly limited. For instance, the description is made using image data where the number of pixels of the high resolution image (hereinafter may be referred to as "H image" for the sake of abbreviation) is 1280×960 pixels, the number of pixels of the low resolution image (hereinafter may be referred to as "L image" for the sake of abbreviation) is 640×480 pixels, and each pixel of both images has 8 bits and 0 to 255 gradation values (pixel values).

Note that conformity in input and output dimensions allows the input and output spaces to be processed in the same space (coordinate axes), facilitating computation. In the learning step of this example, the learning data of L images is enlarged by an appropriate method and used in order to match the number of pixels with that of the H image. Thus, the corresponding relationship (positional relationship) between the L images and H images, whose numbers of pixels are matched, is defined in one to one correspondence. Both images share the same number of dimensions and are capable of being processed as points (coefficient vectors) in the same coordinate space.

The learning image set can include images of various modalities. Here, for the sake of simplicity of the description, the orientation of face is the front, and the facial expression is a standard one ("normal"), or absence of expression. In this example, since the number of pixels in a single image is large, a single image is divided into squares using an areal unit including a prescribed numbers of pixels (e.g., 64×48 pixels); computational processing is performed on a plurality of these divided blocks (hereinafter referred to as "patches") with respect to each patch. In other words, the number of pixels in a patch×the number of patches (the number of division) is the number of entire objects to be processed using a single image.

Here, the description is made according to an example where 64×48 pixels is divided by unit (patch) of 8×8 pixels into 48 patches of 8×6. However, the size of the patch, the number of division and the manner of division are not particularly limited thereto. A mode of division with overlap of a prescribed amount of pixels between neighboring patches may be adopted; a mode of processing using a single image unit without patch division may also be adopted.

A variation of modalities and the number of dimensions of each modality in this embodiment using such a learning image set are listed in the following table (Table 1).

TABLE 1

| MODALITY NO. | MODALITY | NUMBER OF DIMENSIONS |
|---|---|---|
| No. 1 | PIXEL VALUE | 8 × 8 |
| No. 2 | RESOLUTION | 2 |
| No. 3 | PATCH POSITION | 48 |
| No. 4 | INDIVIDUAL DIFFERENCE | 60 |

Without limitation to the example in Table 1, further multiple modalities may be adopted. For instance, various types of modalities may be added (see Table 2), including ten patterns where the orientations of faces vary in ten steps in a region of "facing right-front-left", four patterns of facial expressions of the normal, smile, anger and scream, and five patterns where the directions of illumination vary in five steps by 45 degrees in a region "just in the right-front-just in the left".

TABLE 2

| MODALITY NO. | MODALITY | NUMBER OF DIMENSIONS |
|---|---|---|
| No. 1 | PIXEL VALUE | 8 × 8 |
| No. 2 | RESOLUTION | 2 |
| No. 3 | PATCH POSITION | 48 |
| No. 4 | INDIVIDUAL DIFFERENCE | 60 |
| No. 5 | ORIENTATION OF FACE | 10 |
| No. 6 | FACIAL EXPRESSION | 4 |
| No. 7 | ILLUMINATION DIRECTION | 5 |

As a matter of course, Tables 1 and 2 are exemplary ones. Without any limitation thereto, another modalities such as the human race, sex and age may further be added, or the modalities may be replaced with another modalities.

The number of types of modalities corresponds to the rank of a kernel tensor G specifying a projective relationship, which will be described later (a fourth rank kernel tensor, in a case of Table 1). The product of the numbers of dimensions of the modalities is the number of elements of the kernel tensor G. In the case of Table 1, the number of elements of the kernel tensor G (size) is 8×8×2×48×60.

In a case of Table 2, a kernel tensor whose rank in seven is represented. The number of elements is 8×8×2×48×60×10×4×5. Such addition of modalities increases the rank of the tensor and steeply increases the number of elements of the tensor according to the product of the numbers of dimensions. Accordingly, in view of suppression of increase in memory and reduction in processing time (reduction in processing load), it is desired to appropriately reduce the number of dimensions. This embodiment provides device that can achieve high reconstruction capability while achieving suppression of increase in memory and reduction in processing time because of reduction in the number of dimensions.

(Description of Tensor Projection)

FIG. 1 shows a conceptual diagram of a tensor projection. For the sake of convenience in illustration, the description will be made on a three-dimensional space here. The dimension may be extended to any finite dimensions (N dimensions). The tensor projection allows transition from a certain real space R to an eigenspace (also referred to as "characteristic space") A, and transition (projection) between a plurality of eigenspaces A, B and C.

In FIG. 1, the projective relationship from the real space R to the eigenspace A is represented by tensor U; the projective relationship between eigenspaces A and B is represented by one of tensors $G_1$ and $G_1^{-1}$. Likewise, the projective relationship between eigenspaces B and C is represented by one of tensors $G_2$ and $G_2^{-1}$; the projective relationship between eigenspaces C and A is represented by one of tensors $G_3$ and $G_3^{-1}$. The transformation route (projective route) across the plurality of eigenspaces can thus be designed, enabling data to be handled in various spaces.

Figure 2:
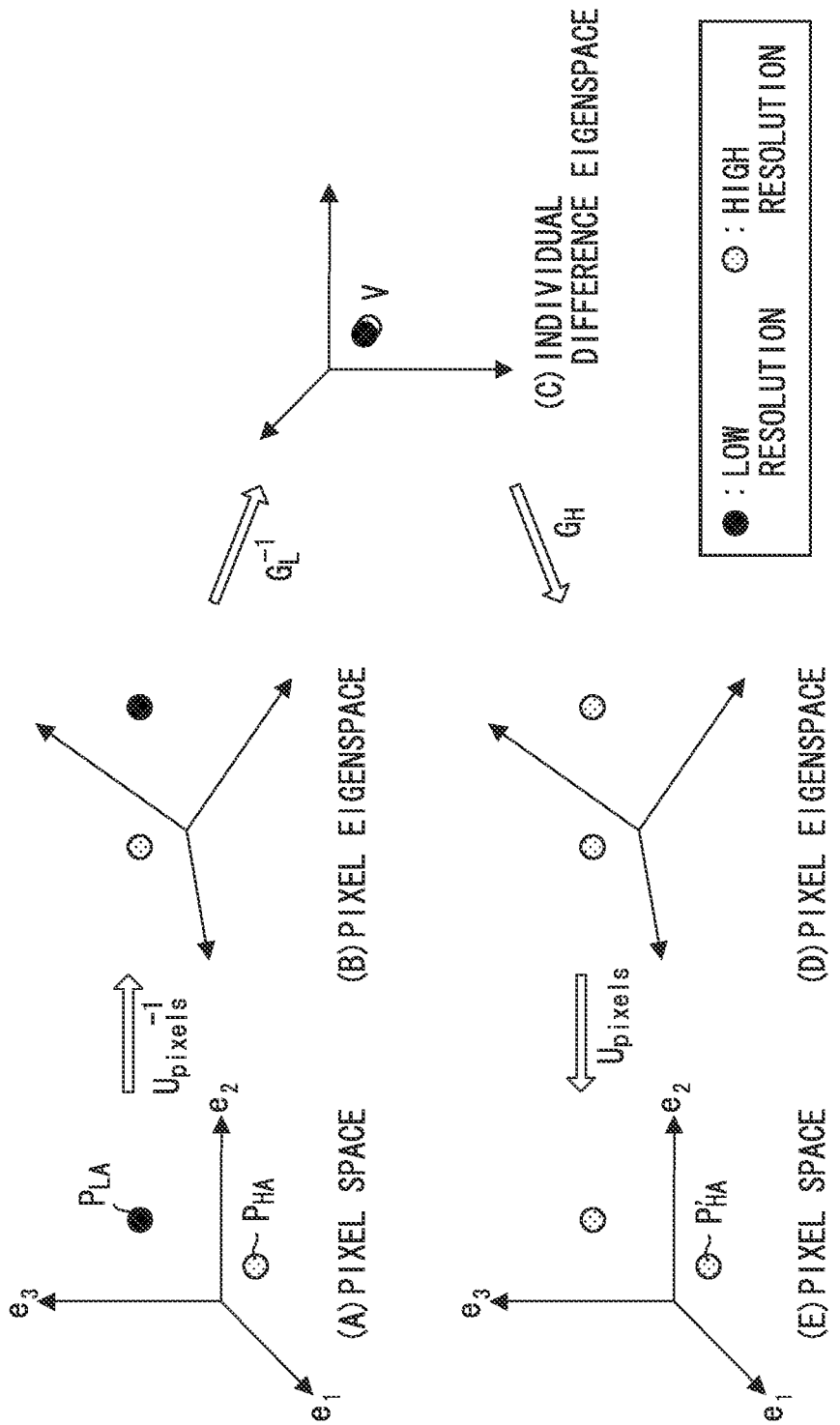
FIG. 2 shows a principle for applying the tensor projection to an image transformation of super-resolution.

FIG. 2 shows a principle for applying such a tensor projection to an image transformation of super-resolution.

Example of FIG. 2 diagrammatically shows a process of transforming (reconstructing) a low resolution image to a high resolution image using projection between a pixel real space, a pixel eigenspace and an individual difference (figure-characteristic) eigenspace.

As to the image data, each pixel thereof is assigned with a numerical value (pixel value) representing a gradation. The image data can be grasped as coefficient vectors in a multi-dimensional space whose bases are the axes representing gradation values (pixel value) for the respective pixel positions. For the sake of convenience in illustration, consideration is made on the three-dimensional model as shown in FIG. 2. For instance, low resolution facial image data of a certain person A is plotted as a certain point $P_{LA}$ in the pixel real space. More specifically, the coefficient vector $(x_1, x_2, x_3)$ of the low resolution facial image data of the person A has a certain value $(x_1)$ from 0 to 255 on the axis of the first basis element $e_1$. Likewise, the vector has certain values $(x_2)$ and $(x_3)$ from 0 to 255 on the axes of the second and third basis elements $e_2$ and $e_3$, respectively. The image data is thus represented as the certain point $P_{LA}$ in the pixel real space. Likewise, the high resolution facial data of the person A is plotted as a certain point $P_{HA}$ on the pixel real space.

The purpose of transformation here is to transform a certain point (e.g., the point $P_{LA}$ of the low resolution image) of a low resolution image in the pixel real space to a high resolution point ($P_{HA}'$).

As to the transformation process, first, the projection is made from the pixel real space R in (A) in FIG. 2 to the eigenspace A ((B) in FIG. 2) by a projective function $U_{pixels}^{-1}$ utilizing an eigen projective matrix $U_{pixels}$ of a linear projection, typified by the locality preserving projection (LPP). The axes (bases) of the pixel eigenspace A correspond to characteristic axes (eigenvector). This projection can be grasped as a rotation of a coordinate system which transforms the axes of the pixel real space R to the axes of the pixel eigenspace A.

Further, transformation is made from this pixel eigenspace A to the individual difference (figure-characteristic) eigenspace B ((C) in FIG. 2). A function specifying a corresponding relationship between the low resolution image and the individual difference eigenspace is used as the projection function $G_L^{-1}$ here. As shown in (C) in FIG. 2, a point of low resolution image and a point of the high resolution image pertaining to the same person can be plotted at substantially identical positions in the individual difference eigenspace. A projective function $G_H$ specifying a corresponding relationship between the high resolution image and the individual difference eigenspace is used for a reconstruction from the individual difference eigenspace to the pixel eigenspace A, utilizing this characteristics.

As shown in (D) in FIG. 2, after the reconstruction to the pixel eigenspace A by the function $G_H$ different from the function $G_L$, a reconstruction to the pixel real space A therefrom by the projective function $U_{pixels}$ utilizing the eigen projective matrix ((E) in FIG. 2). Thus, the L image can be transformed to the H image through the route of (C)→(D)→(E) in FIG. 2 utilizing substantial conformity between the L image point and H image point in the individual difference space.

More specifically, provided that V is an individual difference eigenspace coefficient vector in the individual difference eigenspace in (C) in FIG. 2, the high resolution pixel vector H in the pixel real space can be acquired according to the following equation, $$H=U_{pixels}G_H V.$$ [Expression 1]

On the other hand, the low resolution pixel vector L in the pixel real space as follows:

$$L=U_{pixels}G_L V.$$ [Expression 2]

Accordingly, when the high resolution image in the pixel real space is acquired by a reconstruction from the low resolution image (low resolution pixel vector L) in the pixel real space to the pixel eigenspace and then to the pixel real space through the pixel eigenspace to the individual difference eigenspace, the transformation can be made by the projection of the following equation, $$H=U_{pixels}G_H V=U_{pixels}G_H(U_{pixels}G_L)^{-1}L.$$ [Expression 3]

In this embodiment, the projective function ($U_{pixels}$) is acquired from the learning image set including a group of pairs of the low resolution images and the high resolution images, utilizing the locality preserving projection (LPP); on the basis thereof, the projective functions $G_L$ and $G_H$ are acquired such that the L image point and the H image point of the same person substantially match with each other.

The low resolution image can precisely be transformed to the high resolution image by a framework of the thus acquired projective functions ($U_{pixels}$, $G_L$ and $G_H$) and the projective route shown in FIG. 2.

In this embodiment, the description is made using the example of LPP projection. However, another projection method such as the principal component analysis (PCA) can be adopted, instead of the LPP projection for implementing the present invention.

<Overview of LPP Projection>

The processing procedures of the PLL projection will be generally described as follows.

(Procedure 1): A similarity matrix S representing whether similarity can be found or not between learning samples (round-robin) is acquitted.

(Procedure 2): Σ of each row of the similarity matrix S is acquired and the diagonal matrix D is acquired.

(Procedure 3): A Laplacian matrix: L=D−S is acquired.

(Procedure 4): The following generalized eigenvalue problem is solved.

$$X \cdot L \cdot X^T \cdot u = \lambda \cdot X \cdot D \cdot X^T \cdot u$$

For instance, transformation to an eigenvalue problem is made by [1] Cholesky resolution or [2] calculation of the inverse matrix for the general eigenvalue problem, and thereby the problem is solved.

(Procedure 5): The eigenvectors u corresponding to the eigenvalues are sorted in ascending order from the smallest eigenvalue λ and LPP projective matrix U is acquired.

<Overview of Processing>

The processing described in this example is configured so as to adopt both the tensor projection super-resolution process and the generalized super-resolution process (e.g., clustering method) and increase the adopting ratio of the generalized super-resolution process according to the degree of deviation in the input condition in the input image.

Figure 3:
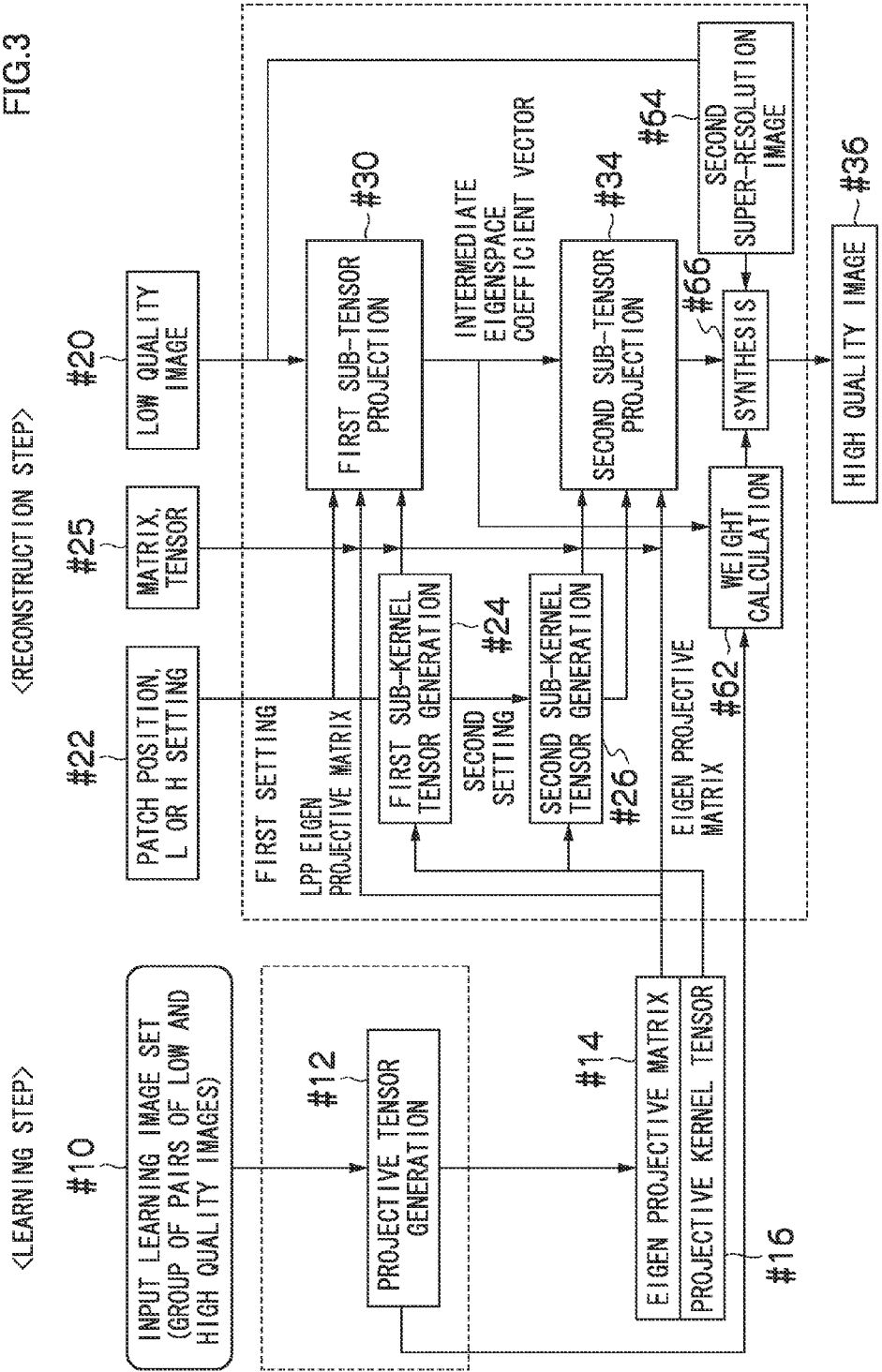
FIG. 3 is a block chart showing an overview of processing in an image processing apparatus according to an embodiment of the present invention.

FIG. 3 is a block chart showing an overview of processing in the embodiment of the present invention. As shown in the figure, the processing according to this embodiment can generally be divided into a learning step and a reconstruction step.

In the learning step, the learning image group (input learning image set) including pairs of low quality images and the high quality images is inputted (#10); a process for generating a projective tensor is performed by applying a projective method such as the locality preserving projection (LPP) to this image group (#12). Instead of the LPP projective tensor, the locally linear embedding (LLE), linear tangent-space alignment (LTSA) and the like can be adopted.

In the step of generating the projective tensor (#12), the eigen projective matrix is generated (#14), and a projective kernel tensor specifying the corresponding relationship between the low quality image and the intermediate eigenspace and the corresponding relationship between the high quality image and the intermediate eigenspace (#16).

The description will be made using the LPP projection as an example. The LPP performs the coordinate transformation so as to conserve a neighborhood (information of geometrical distance of the neighborhood value) of a local value of the samples in the original space (here, real space of the pixels). The coordinate axes are determined such that neighboring samples in the original space are also embedded in a neighboring manner in the projective destination space (eigenspace).

For instance, in the learning image set of Table 1, the H images and the L images of 60 people are plotted in the pixel real space for every patch position. Application of the LPP to the distribution of these 120 samples can acquire the characteristic axes focusing on the neighboring values in the distribution (neighborhood in change).

Thus, the LPP eigen projective matrix corresponding to the dimensions of the patch position (48 dimensions in Table 1) $U_j=\{U_1, U_2, U_3, \ldots, U_{48}\}$ can be acquired.

The LPP projective kernel tensor G, which includes the corresponding relationship between the L image and the individual difference eigenspace (tensor $GL_j=\{GL_1, GL_2, GL_3, \ldots, GL_{48}\}$) and the corresponding relationship between the H image and the individual difference eigenspace (tensor $GH_j=\{GH_1, GH_2, GH_3, \ldots, GH_{48}\}$), is generated using this LPP eigen projective matrix.

More specifically, the eigen projective matrices U are acquired from view points of the respective modalities, such as the pixel, resolution and patch position. The elements of the projective kernel tensor G are acquired using the U; a set thereof is acquired as the projective kernel tensor G.

In the LPP, the arrangement of the characteristic axes (array) is determined in ascending order from the smallest eigenvalue with stronger influence. Accordingly, use only of the influential higher-order characteristic axes can reduce the dimensions, thereby allowing the size of the kernel tensor to be significantly reduced.

In the calculation process, the entire eigen projective matrices U including those with small influences are calculated. In actual use at the reconstruction, the matrices with small influences are not used. Instead, some of those with stronger influence are used for reconstruction. The appropriate compression of dimensions allows the size of the projective kernel tensor to be appropriate with respect to the respective characteristic axes.

On the other hand, in the reconstruction step, the low quality image as the transformation source is inputted (#20), and information identifying the position of the patch to be processed and information specifying a distinction between the L image and the H image are provided (#22).

A first sub-kernel tensor (in the example of Table 1, $GL_j=\{GL_1, GL_2, GL_3, \ldots, GL_{48}\}$) corresponding to an L setting as a first setting is generated (#24), and a second sub-kernel tensor (in the example of Table 1, $GH_j=\{GH_1, GH_2, GH_3, \ldots, GH_{48}\}$) corresponding to an H setting as a second setting is generated (#26), from the projective kernel tensor G (#16) generated in the learning step.

The projective kernel tensor G (#16), which has been created based on the entire eigenvectors corresponding to the respective modalities, is an aggregate including projective elements pertaining to the entire modalities. Accordingly, it is required to extract elements to be used in the reconstruction process from among the tensor elements. For instance, determination of a condition that the eigenspace of the "individual difference" is used as the intermediate eigenspace (a space of turning point of the projective route) through which the projective route described in FIG. 2 goes, allows the sub-kernel tensors GL and GH corresponding thereto to be extracted. The step up to the generation of the sub-kernel tensors to be actually used may thus be included in the "learning step".

Figure 6:
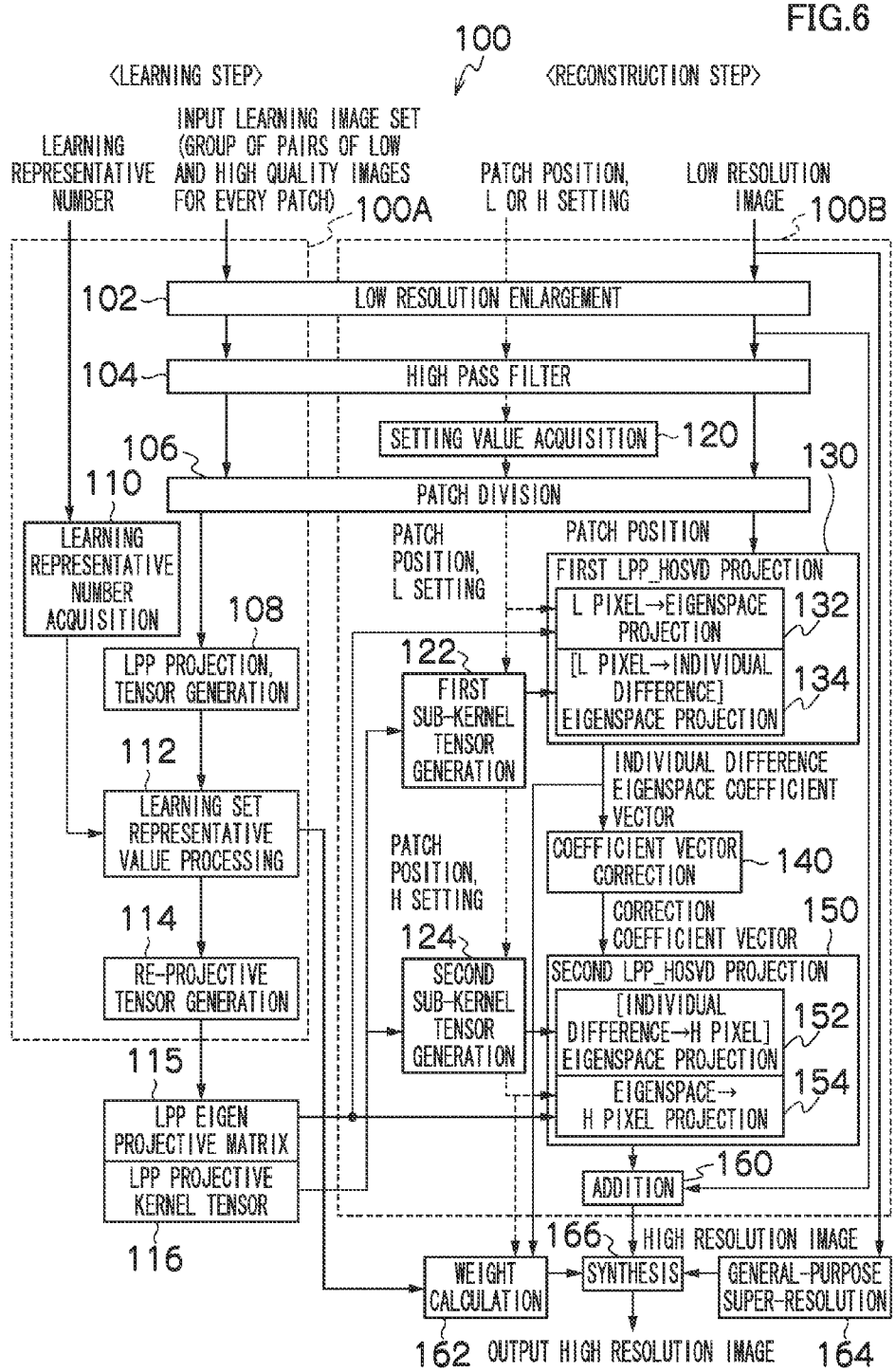
FIG. 6 is a block diagram showing the configuration of an image processing apparatus according to the embodiment of the present invention.

The inputted low quality image (#20) is divided into a plurality of image areas (corresponding to "divided image area" and "divided data area") in a patch division step (corresponds to a patch divider not shown in FIG. 3 and shown in FIG. 6 assigned with reference numeral 106). In this example, the image is divided into same sized square sections (blocks). One section, "square (block)", of the divided image is referred to as a "patch". The transformation (projection) process is performed in a patch unit.

The projection is performed on data of the patch-divided low quality image (#20) using the eigen projective matrix and the first sub-kernel tensor, while a patch position to be focused on is designated (#30), and thereby the intermediate eigenspace coefficient vector is calculated. The first sub-tensor projection step (#30) corresponds to the route of projection illustrated in (A)→(B)→(C) in FIG. 2.

The first sub-tensor projection step (#30) is performed on each patch position while the patch position to be focused on is changed, thereby acquiring the intermediate eigenspace coefficient vectors corresponding to the respective patch positions.

The patch positions calculated here are not necessarily the entire patch positions. The calculation may be made on a predetermined part of patch positions.

Next, the intermediate eigenspace coefficient vector is projected using the second sub-kernel tensor and the eigen projective matrix (#34) and the high quality image is acquired (#36). The second sub-tensor projective step (#34) corresponds to the projection of the route illustrated in (C)→(D)→(E) in FIG. 2.

On the other hand, the low quality image, which has been inputted in the input step shown accompanied with reference numeral #20, is subjected to the super-resolution processing in the generalized super-resolution (represented as "second super-resolution" in the figure) processing step, and the high quality image by the generalized super-resolution processing is acquired. The "generalized super-resolution (second super-resolution)" described here device a super-resolution processing different in method from the first and second LPP sub-tensor projection steps.

In a synthesis step (#66), the first super-resolution image acquired by the tensor projection super-resolution processing and the high quality image (second super-resolution image) acquired by the generalized super-resolution processing are combined with each other according to prescribed weighting, thereby synthesizing the high quality image (#36).

In the synthesis step, the first and second super-resolution images are weighted by prescribed weight coefficients. For instance, an input condition is preliminarily determined in the intermediate eigenspace (the figure-characteristic space shown in (C) in FIG. 2). The weight coefficient is calculated according to the degree of deviation of the prescribed input condition such that, when the degree of deviation of the input condition is small, the weight coefficient (adopting ratio) of the first super-resolution image is increased, and, when the degree of deviation of the input condition is large, the weight coefficient is decreased.

The weight coefficient is calculated in a weight coefficient calculation step (#62). A method of calculating the weight coefficient on the basis of a mutual relationship is exemplified; the mutual relationship is between the coefficient vector in the intermediate eigenspace in the learning image group generated in the projective tensor generation step and the intermediate eigenspace coefficient vector generated in the first LPP tensor projection step (#30).

The tensor projection super-resolution processing and the super-resolution processing by another method are thus used together. When the degree of deviation of the input condition is large, the super-resolution processing by another method is adopted and the problem of the tensor projection super-resolution processing that the larger the degree of deviation of the input condition, the further the reconstruction feature deteriorates can be resolved. This thereby enables the high quality image (#36 in FIG. 3) with preferable reconstruction feature to be acquired.

The processes in the first sub-tensor projection step (#30) and the second sub-tensor projection step (#34) in the reconstruction step are performed for each patch on the basis of information of the patch positions. On the operation of these projection steps, the information designating the distinction of whether the projection function is a matrix or a tensor (#25) is provided as shown in FIG. 3. The projection process using the eigen projective matrix and the projection process using the sub-kernel tensor are switched to each other according to the information.

The step of inputting the input learning image set (#10) in FIG. 3 and the information acquisition device for acquiring the data correspond to a "learning image acquisition device (step)". The step of generating the LPP projective tensor (#12) and the processing device thereof correspond to an "eigen projective matrix generation device (step)" and a "projective kernel tensor creation device (step)".

The step of generating the first sub-kernel tensor (#24) and the processing device thereof correspond to a "first sub-kernel tensor creation device (step)". The step of generating the second sub-kernel tensor (#26) and the processing device thereof correspond to a "second sub-kernel tensor creation device (step)".

The low quality image (#20) to be processed corresponds to "input image" and "input data". The high quality image (#36) acquired by the second LPP sub-tensor projection (#34) corresponds to "modified image" and "modified data". In a case of processing on a patch-by-patch basis by the patch division, the image to be processed on the patch-by-patch basis can be construed as "input image" and "modified image".

The first LPP sub-tensor projection step (#30) and processing device thereof correspond to "first sub-tensor projection device (projecting)". The second LPP sub-tensor projection step (#34) and processing device thereof correspond to "second sub-tensor projection device (projecting)".

The weight coefficient calculation step (#62) corresponds to "weight coefficient determination device (determining) and weight coefficient calculation device (calculating)". The generalized super-resolution processing step (second super-resolution: #64) corresponds to "high quality image processing device (processing)" and "transformation process device (processing)". The synthesizing step (#66) corresponds to "synthesis device (synthesizing)".

<Advantage of Using LPP Projection>

Figure 4:
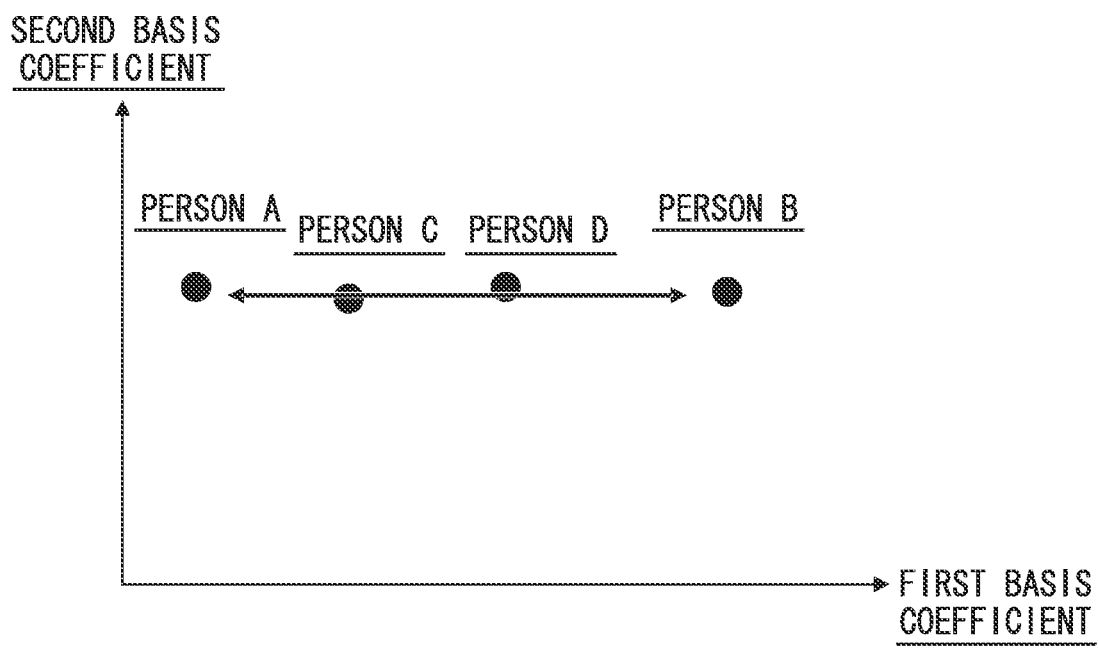
FIG. 4 illustrates that a change in an LPP eigenspace (here, an individual difference eigenspace) has characteristics similar to linearity.

FIG. 4 shows an example of a case where a change in a modality (here, the individual difference) in an LPP eigenspace has characteristics similar to linearity. For instance, when learning images of four people A, B, C and D are transformed by the LPP, the change (change in individual difference) from the person A to the person B represents a substantially linear change, which is generally smooth (continuous) on the individual difference eigenspace as shown in FIG. 4, while maintaining the local structure.

The transformation to the eigenspace of the LPP high order singular value decomposition (LPP_HOSVD) (n=2, 3, 4, ...) is thus performed. Accordingly, the change in the element of the modality corresponding to the eigenspace is allowed to approach to linearity (see FIG. 4). Any input image vector can be represented as an interpolation point having high linearity with respect to the group of vectors of the learning image samples.

That is, an unknown input image other than the learning image samples can preferably, approximately be represented using the vector group with the learning image samples in the LPP eigenspace. This point is an advantage of using the LPP projective transformation (Advantage 1).

Figure 5:
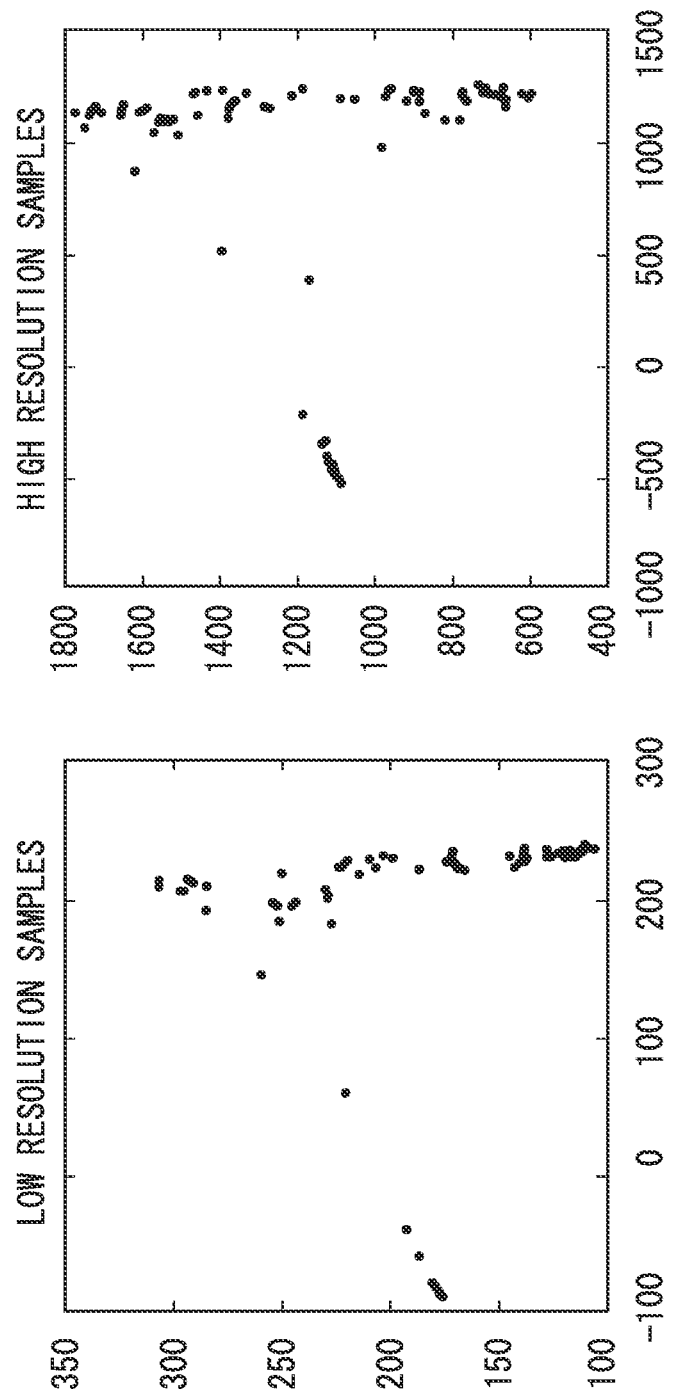
FIGS. 5A and 5B show an example of a representation of an LPP projective distribution of certain image samples onto a two-dimensional sub-space.

FIG. 5A shows a representation of a LPP projective distribution of low resolution image samples in a two-dimensional subspace; FIG. 5B shows a representation of a LPP projective distribution of high resolution image samples in a two-dimensional subspace (source: ZHUANG Yueting, ZHANG Jian, WU Fei, "Hallucinating faces: LPH super-resolution and neighbor reconstruction for residue compensation", Pattern Recogn, Vol. 40, No. 11, Pages 3178-3194 (2007)).

As shown in these distributions, the topology of the low resolution distribution of the learning image sample vector group in the LPP eigenspace (FIG. 5A) and the topology of the high resolution distribution (FIG. 5B) separately learn the eigenspace, and it is known that the correlation is high even after transformation.

The mutual projective relationship between both elements (low and high resolution) of the modality is further represented with the tensors ($G_L$ and $G_H$) of the multi-linear projection framework, utilizing such characteristics of the LPP, thereby exerting a novel advantageous effect allowing the transformation to become high precision (error to be reduced) (Advantage 2).

Synergetic effects of the Advantages 1 and 2 exert another novel effect that further improves the precision in projective relation, the input condition is relaxed and robustness is realized in comparison with the related art (Advantage 3).

The transformation by LPP_HOSVD (n=2, 3, 4, ...) to the eigenspace improves the correlation of the distribution of the learning image group and further reduces the dimensions of each rank (each modality), thereby allowing speedup of processing and memory saving (Advantage 4).

Example of Configuration of Specific Embodiment

A further practical embodiment including the procedures of the processing illustrated in FIG. 3 will hereinafter be described.

FIG. 6 is a block diagram showing the configuration of an image processing apparatus 100 according to an embodiment of the present invention. In this figure, in order to clarify the corresponding relationship with FIG. 3, the processing is divided into the learning step and the reconstruction step, and blocks of processing units which contribute to the processes in the respective steps are shown along the flow of processing.

As shown in FIG. 6, this image processing apparatus 100 includes a low resolution enlarging processor 102, a high pass filter 104, a patch divider 106, a LPP projective tensor generator 108, a learning representative number acquisition section 110, a learning set representative value processor 112, a re-projective tensor generator 114, setting value acquisition section 120, a first sub-kernel tensor generator 122, a second sub-kernel tensor generator 124, a first LPP_HOSVD projection processor 130, a coefficient vector correction processor 140, a second LPP_HOSVD projection processor 150, an adding section 160, a weight calculator 162, a general-purpose super-resolution processor 164 and a synthesizer 166. A device for performing the processing of each processor may be realized by a dedicated electric circuit (hardware) or software, or a combination thereof.

The first LPP_HOSVD projection processor 130, which is a device for performing the process of projection route illustrated in (A)→(B)→(C) in FIG. 2, includes a "L pixel→eigenspace projector 132" that projects the L image from the pixel real space to the pixel eigenspace, and a "[L pixel→individual difference] eigenspace projector 134" that projects the L image from the pixel eigenspace to the individual difference eigenspace, as shown in FIG. 6. The pixel value in the L image is referred to as the L pixel, and the pixel value in the H image is referred to as the H pixel.

The second LPP_HOSVD projection processor 150, which is a device for performing the process of projection route illustrated in (C)→(D)→(E) in FIG. 2, includes a "[individual difference→H pixel] eigenspace projector 152" that projects H image from the individual difference eigenspace to the pixel eigenspace, and a "eigenspace→H pixel projector 154" that projects the H image from the pixel eigenspace to the real space.

The details of each processor in FIG. 6 will hereinafter be described.

(Low Resolution Enlarging Processor)

The low resolution enlarging processor 102 performs a process of enlarging the input low resolution image to a prescribed size. The method of enlarging is not particularly limited; various methods, such as the bicubic, B spline, bilinear, nearest neighbor, may be adopted.

In the learning step, the low resolution image of the input learning image set is enlarged to of the number of pixels whose size is the same as that of the high resolution image. In the reconstruction step, the input low resolution image is enlarged to of the number of pixels whose size is the same as that of the output (in this example, the same size as that of the high resolution image of the learning image set). This is for the sake of matching the numbers of input and output dimensions, as described above.

(High Pass Filter)

The high pass filter 104 filters the input image so as to suppress the low frequencies. The unsharp mask, Laplacian, gradient and the like may be used as the filter. Most of influences due to variation in illumination in the facial image are in the low frequency region. Accordingly, this high pass filter 104 can suppress the low frequencies and eliminate the influences due to variation in illumination, thereby allowing the robustness against the variation in illumination to be improved.

Further, elimination of low frequency elements from the input image and limitation of the object to be processed by the projective transformation to high frequency elements from the entire frequencies allow the entire eigenspaces capable of being used for learning to be assigned with the high frequency elements. In this embodiment, which intends to reconstruct the high resolution output image from the low resolution input image, it is important to principally reconstruct the high frequency elements. In this embodiment, which applies the tensor projection having multi-linear projection framework illustrated in FIG. 2 to the reconstruction of the high frequency elements, provision only of high frequency information as the object of projective processing exerts a novel advantageous effect that allows compatibility between an advantageous effect capable of efficiently assigning the object to the eigenspace (the entire dynamic range can be used for processing high frequency components in the eigenspace), and an advantageous effect capable of reducing the influences due to variation in illumination at the input image.

If a modality of "direction of illumination" (variation in illumination) is added and a required learning image group is learned, a reconstruction process accommodating the variation in illumination according to the same transformation principle as that of FIG. 1 can be performed. However, this enlarges the size of the tensor, thereby increasing the processing load and the memory capacity.

With respect to this point, the configuration using the high pass filter 104 as with this embodiment eliminates addition of illumination variation modality (increase in tensor rank), and negates the need for an illumination condition detection process and for collecting and processing data for learning the reconstruction projection in consideration of the variation in illumination. This exerts an advantageous effect of avoiding increase in memory capacity and excessive increase in processing load.

According to the high frequency component extraction step using the high pass filter 140 in this example, it is sufficient to suppress at least the low frequency elements including an illumination variation factor, and the intermediate frequency components may be extracted together with the high frequency components. That is, the high frequency components of the input learning image set or the high and intermediate frequency components are extracted, and the learning image set where the low frequency components are suppressed can be acquired.

In the reconstruction step, the same process as the high frequency extraction step in the learning step is also applied. For instance, a process of extracting from the input image the same frequency components as those extracted from the learning image set is performed. That is, in the high frequency component extraction step in the reconstruction step, the same frequency components as of the learning image set as the basis of the eigen projective matrix and the projective kernel tensor can be extracted.

According to this embodiment, a highly precise and highly robust reconstruction with a smaller number of learning samples can be expected, because of the synergetic advantageous effect between the high pass filter 104 and the tensor LPP (LPP_HOSVD) projection.

As described above, this example has shown the process of extracting the high frequency components as an example of suppressing the low frequency components including the illumination variation factor. Instead, the intermediate frequency components may be extracted while the high frequency components are extracted.

This example has described the image processing for eliminating the image deterioration factor in the reconstruction image due to illumination variation which is included in the low frequency components in the input and output images. Such an image processing method can be applied to a technique other than the illumination variation.

For instance, for the sake of addressing the image deterioration factor included in the intermediate frequency region by suppressing the intermediate frequency region from the input image, high resolution processing (e.g., enlarging process) according to a method other than that of the tensor projection is used for the intermediate frequency region, high quality image processing according to the tensor projective method is used for the other frequency regions, and these two images generated by these high quality image processes may be added together, thereby enabling the image deterioration factor included in a prescribed frequency region to be eliminated from the output image.

(Patch Divider)

The patch divider 106 is a device for performing the patch dividing step, and divides the input image into squares like a chessboard. Both of the learning and reconstruction steps perform signal processing in units of patches. The patch-by-patch processing restricts the processing target to a local area in the image and in turn allows the projection target to be processed in the low dimensions, thereby realizing robustness against the high quality and variation in individual difference. Thus, the configuration including the patch dividing device is a preferable mode for implementing the present invention.

(LPP Projection Tensor Generator)

The LPP projective tensor generator 108 applies the locality preserving projection (LPP) to the input learning image set (group of pairs of the low and high resolution images) after the preprocess including the low resolution enlarging, high pass filter and patch division, and generates the LPP projective tensor.

The LPP performs coordinate transformation so as to conserve a neighborhood (information of geometrical distance of the neighborhood value) of a local value of a sample in the original linear space (here, real space of the pixels). The coordinate axes are determined such that neighboring samples in the original space are also embedded in a neighboring manner in the projective destination space (eigenspace).

That is, when the preprocessed input learning image set is provided, the LPP eigen projective matrix $U_{pixels}$ is generated by LPP based thereon. Next, the LPP projective kernel tensor G is generated as with the singular value decomposition (SVD).

Thus, the matrix M representing the image of the learning image set has been resolved into $M = U_1 \Sigma U_2$ and the matrices $U_1$ and $U_2$ have been acquired as the LPP eigen projective matrices. Accordingly, $\Sigma$ (=G) is acquired by the matrix operation.

The principle of "LPP local conservation projection" acquires the axis (characteristic axis) where the samples with similar values are close to each other, consequently conserves the local structure, and utilizes the distance between the neighboring sample values. Similarity according to which the samples with similar values have greater one and the samples with different values have smaller one is introduced; the projection to make the samples with a great similarity close to each other, is performed. The LPP is used for the sake of reducing the linear dimensions while maintaining the local neighborhood, and has characteristics that conserves the local geometry and can readily perform projection only by linear transformation. Note that it is not general that the LPP has the orthogonal bases. However, an orthogonal LPP has also been proposed. It is preferable to use the orthogonal LPP.

<Calculation of Orthogonal LPP>

Provided that the orthogonal matrix D and the Laplacian matrix L have been acquired by the LPP algorithm, the orthogonal LPP projective matrix $W_{OLPP} = \{u_1, \ldots, u_r\}$ will be acquired according to the following procedures. The number of dimensions r is smaller than or equal to the original number of dimensions.

(Step 1): First, let an eigenvector corresponding to the smallest eigenvalue of a matrix $(XDX^t)^{-1} XLX^t$ be $u_1$.

(Step 2): Next, acquire the k-th eigenvector. More specifically, let the eigenvector corresponding to the smallest eigenvalue of the matrix $M^{(k)}$ represented as [Expression 4] be $u_k$.

$$M^{(k)} = \{I - (XDX^t)^{-1} A^{(k-1)} [B^{(k-1)}]^{-1} [A^{(k-1)}]^t\} (XDX^t)^{-1} (XLX^t) \quad \text{[Expression 4]}$$

where
$A^{(k-1)} = \{u_1, \ldots, u_{k-1}\}$
$B^{(k-1)} = [A^{(k-1)}]^t (XDX^t)^{-1} A^{(k-1)}$.

The processing of step 2 is repeated from k=2 to r (to n in a case without compression of dimensions; to r in a case with compression of dimensions) and each eigenvector is acquired. Thus, the orthogonal LPP projective matrix $W_{OLPP} = \{u_1, \ldots, u_r\}$ is acquired.

<Comparison with Principal Component Analysis (PCA)>

In contrast to the LPP, the principal component analysis (PCA) is the maximization of the global variance, and has a principal object to reduce the number of linear dimensions while conserving the global distribution. The PCA has characteristics of maintaining the global geometry and readily performing projection only by linear transformation, and the orthogonal bases.

Figure 7:
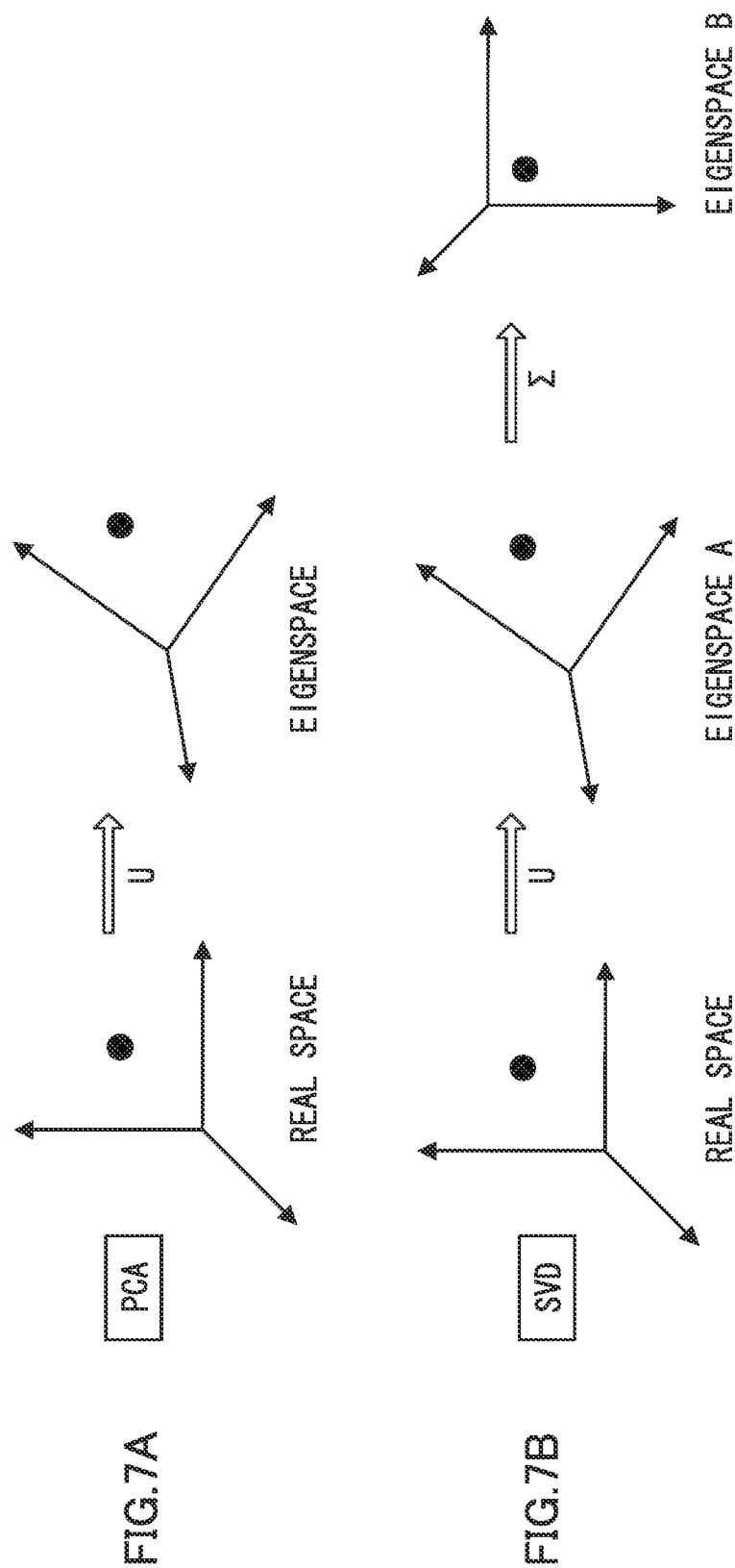
FIG. 7A is a conceptual diagram showing a projection by the principal component analysis (PCA)
FIG. 7B is a conceptual diagram showing a projection by the singular value decomposition (SVD)

As shown in FIG. 7A, such PCA only provides the projective function between the real spatial vector and the eigen (characteristic) spatial vector. On the other hand, as shown in FIG. 7B, the singular value decomposition (SVD) further provides the projective function $\Sigma$ between a vector in the eigenspace A and a vector in the eigenspace B, in addition to the projective function U between the real spatial vector and the eigen (characteristic) spatial vector. That is, the SVD corresponds to resolved representation of the characteristic vector in the PCA.

The matrix SVD is a method of resolving any matrix M into $M = U \Sigma V^*$. Here, U is an output normalized orthogonal vector, V is an input normalized orthogonal vector, $\Sigma$ is the diagonal output matrix of σi, and $V^*$ is an adjoint matrix of V. That is, the V projective eigenspace and the U projective eigenspace are uniquely and linearly associated with each other in a σi (>0)-fold manner on each i. The matrix SVD is made multi-dimensional (multi-modality), or tensor, and the tensor SVD (TSVD) is acquired. The technique described in the JIA Kui GONG Shaogang "Generalized Face Super-Resolution" IEEE Transactions of Image Processing Vol. 17, No. 6, June 2008 Page. 873-886 (2008) utilizes the TSVD.

In contrast to this, the tensor LPP (LPP_HOSVD (n=2, 3, 4, . . . )) in this embodiment is the LPP made multi-dimensional (multi-modality), and a tensor representation of the LPP. According to a description exemplifying the learning image set of Table 1, H and L images of 60 people are plotted in the pixel real space on each patch position, the LPP is applied to the distribution of 120 points, thereby acquiring the characteristic axes focusing on the neighboring values (close in variation) in the distribution.

Note that, in this embodiment, a learning image set including a group of pairs of low and high quality images of more than 60 people (e.g. 200 people) is used in the first learning stage, for the sake of finally determining the projective function from the samples of 60 people, in view of selecting suitable 60 people.

A temporally provisional LPP eigen projective matrix $U_j = \{U_1, U_2, U_3, \ldots, U_{48}\}$ corresponding to the dimensions of the patch position (48 dimensions in the case of Table 1) is thus acquired. The provisional kernel tensor G specifying the transformation between the pixel eigenspace and the individual difference eigenspace with respect to the L and H images is generated by the tensor singular value division using this provisional LPP eigen projective matrix $U_j$.

This provisional kernel tensor G includes a sub-kernel tensor $GL_S = \{G_{L1}, G_{L2}, G_{L3}, \ldots, G_{L48}\}$ associating the pixel (L pixel) in the low resolution image with the individual difference eigenspace, and a sub-kernel tensor $GH_j = \{G_{H1}, G_{H2}, G_{H3}, \ldots, G_{H48}\}$ associating the pixel (H pixel) in the high resolution image with the individual difference eigenspace.

(Learning Representative Number Acquiring Section)

As described above, in this embodiment, the learning images are narrowed down in order to select appropriate samples when the projective function is determined Here, the number of pairs of the learning images finally used (the number of the samples of people, in this case) is referred to as the "learning representative number". The information of the learning representative number is acquired from the outside.

The learning representative number acquisition section 110 in FIG. 6 is a device for acquiring the learning representative number from the outside.

(Learning Set Representative Value Processor)

The learning set representative value processor 112 performs a process of acquiring an individual difference eigenspace coefficient vector group from the preprocessed input learning image set (at least one of the low resolution images and the high resolution images). This process is the same as that of the first LPP_HOSVD projection processor 130 in the reconstruction step, which is the process up to the L pixel→the eigen spatial projection (the process by reference numeral 132) and [L pixel→individual difference] eigen spatial projection (the process by reference numeral 134), on the input learning image set, and acquires the coefficient vector in the individual difference eigenspace.

This process corresponds to acquisition of the projection point in the individual difference eigenspace with respect to each image of the input learning image set. According to this, the neighborhood between sample points in the individual eigenspace can be grasped.

On the basis of the distribution of the points in this individual difference eigenspace, according to the learning representative number N acquired in the learning representative number acquisition section 110, N of representative individual difference eigen spatial coefficient vectors (representative vector) are acquired. The representative vectors may be acquired by the k-means method, EM algorithm, variational Bayesian method, Markov chain Monte Carlo method or the like. Instead, combination of these methods may be adopted. For instance, initial candidates are acquired by the k-means method, and the representative vectors are finally acquired by the EM algorithm, thereby allowing the vectors to be precisely acquired in a relatively short time period.

Since the representative values are thus acquired, similar sample points (points in the neighborhood in the individual eigenspace) are reduced into (replaced with) the representative vectors. The representative vector group in the individual difference eigenspace having thus been acquired may be used as they are. Instead, a mode is preferable to adopt the nearest N samples in the preprocessed input learning image set on each vector in the acquired representative vector group. In the former, the representative vectors have been synthesized from the sample points. On the other hand, in the latter, the actual sample points are adopted, thereby allowing blurriness because of the synthesis of the representative vectors to be avoided.

Since the representative values are thus acquired, the similar sample points (points in the neighborhood in the individual difference eigenspace) are represented by the representative values, thereby reducing redundancy of the learning image set.

(Re-Projective Tensor Generator)

The re-projective tensor generator 114 performs the same processing as that of the LPP projective tensor generator 108 on the N representative learning images set acquired in the learning set representative value processor 112, and re-generates the LPP eigen projective matrix and the LPP projective kernel tensor. The LPP eigen projective matrix ($U_{pixels}$) 115 and the LPP projective kernel tensor (G) 116 to be used in the reconstruction step, which will be described later, are thus acquired on the basis of the representative learning image set.

In FIG. 6, the LPP projective tensor generator 108 and the re-projective tensor generator 114 are shown in the separate blocks. Instead, a configuration using the same processing block for these generators and causing the processes to loop, can be adopted.

Figure 8:
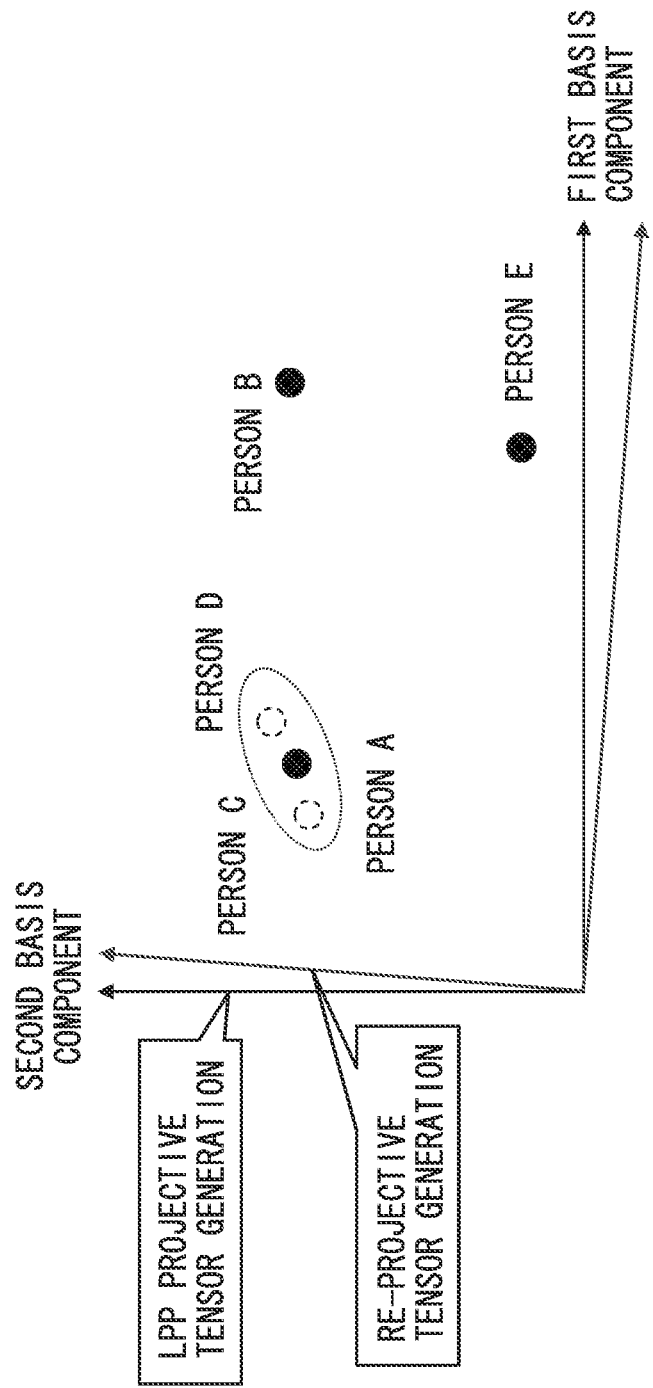
FIG. 8 is a conceptual diagram showing an advantageous effect of eliminating redundancy by acquiring representatives from a learning set.

FIG. 8 is a conceptual diagram schematically showing a mode of eliminating the redundancy of the learning set by the processing of acquiring representatives from a learning set. Here, for the sake of simplicity of the description, the number of learning samples is "5", and the illustration is made in the two-dimensional space. When facial image data of five people A to E has the distribution as shown in FIG. 8 in the individual difference eigenspace as a result of the process (the first time) in the LPP projective tensor generator 108, the samples of three people A, C and D in a relatively close positional relationship are represented by the person C as a representative value, and the samples of people A and D are deleted.

On the basis of the data of three people B, C and E, the re-projective tensor generator 114 then re-calculates the LPP eigen projective matrix $U_{pixels}$ and the LPP projective kernel tensor G. The redundancy of the learning image set is thus eliminated by the process of acquiring representatives from the learning set, thereby enabling the dimensions of each rank of the projective tensor to be reduced while maintaining reconstruction performance and robustness. This can contribute to suppression of increase in memory and speedup of the processing.

Next, the processors operating in the reconstruction step will be described.

The low resolution enlarging processor 102, the low resolution enlarging processor a high pass filter 104 and the patch divider 106 illustrated in FIG. 6 <learning step> are also used in the reconstruction step for the input image (low resolution image) in an analogous fashion. More specifically, in the reconstruction step, "L pixel→eigenspace projection" (reference numeral 132), "[L pixel→individual difference] eigenspace projection" (reference numeral 134), "[individual difference→H pixel] eigenspace projection" (reference numeral 152) and "eigenspace→H pixel projection" (reference numeral 154) are performed on the high pass components of the input image in a patch-by-patch manner.

(Setting Value Acquisition Section)

The setting value acquisition section 120 is a device for acquiring information about the position of patch to be processed and information designating the setting of L and H from the outside, and for providing the information for the "first sub-kernel tensor generator 122", "second sub-kernel tensor generator 124", "L pixel→eigenspace projector 132" and "eigenspace→H pixel projector 154".

Instead of acquiring the information from outside, the patch position of the image after patch division may be associated with the first sub-kernel tensor generator 122 and the second sub-kernel tensor generator 124, which may in turn be provided for the "first sub-kernel tensor generator 122", "second sub-kernel tensor generator 124", "L pixel→eigenspace projector 132" and "eigenspace→H pixel projector 154".

This device may be performed in the learning step together with the "first sub-kernel tensor generator 122" and "second sub-kernel tensor generator 124".

(First Sub-Kernel Tensor Generator)

The first sub-kernel tensor generator 122 generates sub-kernel tensor $G_L$ for the low resolution from the LPP projective kernel tensor 116 pertaining to the output of the re-projective tensor generator 114, by providing the patch position outputted from the setting value acquisition section 120 and the condition of L setting. This device may be performed in the learning step. Instead of or in addition to a mode of storing and saving the LPP projective kernel tensor 116, the sub-kernel tensor $G_L$ may be generated in the learning step, and stored and saved. This mode requires a memory for storing the sub-kernel tensor. However, this mode has an advantage of reducing the processing time of reconstruction step.

(L Pixel→Eigenspace Projector)

The "L pixel→eigenspace projector 132" in the first LPP_HOSVD projection processor 130 acquires the LPP eigen projective matrix ($U_{pixels}$) 115 on the basis of the patch position provided by the setting value acquisition section 120, and performs the process of $U_{pixels}^{-1}$ projection to the pixel eigenspace illustrated in (A)→(B) in FIG. 2 on the output image from the patch divider 106. $U_{pixels}^{-1}$ represents the inverse matrix of $U_{pixels}$.

([L pixel→individual difference] eigenspace projection)

In FIG. 6, the [L pixel→individual difference] eigenspace projector 134 subsequent to the "L pixel→eigenspace projector 132" acquires the corresponding projective tensor $G_L$ from the first sub-kernel tensor generator 122, performs the process of $G_L^{-1}$ projection to the individual difference eigenspace illustrated in (B)→(C) in FIG. 2 on the output from "L pixel→eigenspace projector 132" and acquires the individual difference eigenspace coefficient vector.

(Coefficient Vector Correction Processor)

The coefficient vector correction processor 140, which is device for performing the coefficient vector correction step, generates the correction coefficient vector group to be provided for the [individual difference→H pixel] eigenspace projector 152 in the second LPP_HOSVD projection processor 150 using the individual difference eigenspace coefficient vector group whose number is that of the patches acquired by the [L pixel→individual difference] eigenspace projector 134 in FIG. 6.

The characteristics of the tensor projection having the multi-linearity projection framework are utilized for this correction process. More specifically, as shown in FIG. 2, if the learned LPP eigen projective matrix and the LPP projective kernel tensor are used as the characteristics of the tensor projection, the pixel vectors of the patch group into which the facial image of the same person (e.g., the facial image of person A) is divided substantially converge to a point in the individual difference eigenspace. Accordingly, the transformation on the same rank in the tensor space allows the high mutual correlation between patches to be utilized.

Use of these characteristics allows the presence or absence of the partial concealment (a situation where a part of the face is concealed with glasses, a mask, an edge of an automatic door or a door) in the facial image to be determined, and enables the deterioration in reconstruction because of the partial concealment to be suppressed. Some specific examples will hereinafter be described.

Example of Reconstructing Face where Concealment Object is Eliminated Concerning Concealing Region in Face The pixel vector of the patch where the concealment object exist becomes a point at a position apart from the region, to which the other pixel vectors of a patch without any concealment object converge, in the individual difference eigenspace. In this case, the pixel vector of the patch with the concealment object can be corrected to a vector without any concealment object (correction coefficient vector).

Example A-1-1

The noise (influence owing to a partial concealment object such as glasses, a mask and a door) in the individual difference eigenspace coefficient vector group is eliminated using the representative value, such as the average value, median, maximum value, and minimum value, of the coefficient vector group of the patch group pertaining to the same person in the individual eigenspace, as a value of the correction coefficient vector group.

Example A-1-2

The noise may further be eliminated using the average value, median, maximum value, minimum value or the like as a value of a corrected coefficient vector group centered at the representative value, such as such as the average value, median, maximum value, and minimum value, in a histogram of the coefficient vector group of the patch group pertaining to the same person in the individual difference eigenspace, for instance concerning the individual difference eigenspace coefficient vector group being a region of variance σ or a region of 2σ.

Example of Reconstruction for Concealment Object (Glasses, Mask, etc.) by Detecting Concealing Region A mode of transforming a region where a concealment object exist by a tensor dedicated therefor when the region is detected, may be adopted.

Example A-2-1

The relative positions of glasses (upper, horizontally oriented) and a mask (lower, middle) on the face have substantially been grasped in advance. Accordingly, the individual difference eigenspace coefficient vector group of the patches in the area concerned and the representative value of the individual difference eigenspace coefficient vector group of the patches in the entire face (or the facial area except for the concealment candidate area) are compared with each other. If the similarity is detected (the distance is short), it is detected that the probability without concealment is high. On the other hand, the distance between both is long, it is detected that the probability of presence of a concealment object is high.

Figure 9:
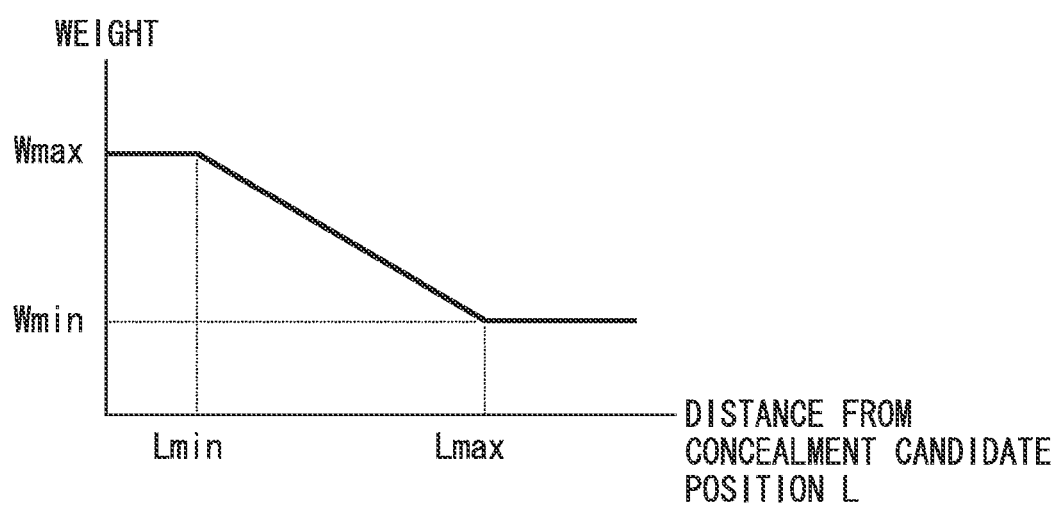
FIG. 9 is a diagram showing an example of a weight specified in relation to a distance from a concealment candidate position.

In the patch positional boundary of the area, the representative value may be acquired in a weighted manner with the weight as shown in FIG. 9 or the weight as represented by a function, such as $\alpha/x$, $\alpha/x^2$ and $\exp(-\alpha/x)$ (where x: the distance form the concealment candidate position).

The representative value thus weighted according to the patch position is to consider uncertainty of the size of the concealment object. For instance, since the sizes of glasses vary, there are a case where the glasses reaches to the adjacent patches and a case where the glasses does not reaches thereto according to the sizes of the glasses. With consideration of probability, the nearer the area disposed with respect to the center position of the eye, the higher the influence owing to the glasses becomes; the farther the area is disposed (the closer to the periphery), the lower the influence becomes. Accordingly, the degree of influence of such a concealment object is determined as a function of distance from the center position of the eye. A device for acquiring the weight includes a mode of processing based on a prescribed function and a mode of using a preliminarily stored lookup table (LUT).

If the area with a high probability of presence of the concealment object is detected, the reconstruction (reconstruction utilizing the tensor projection) according to a method of the present invention concerning the concealment object (glasses, a mask, etc.) with respect to the concealment object area is performed.

Example A-2-2

In Example A-2-1, the concealment object is detected focusing on the distance with the representative value. Instead, the concealment object may be detected on the basis of the spread of distribution of the coefficient vector group. More specifically, as another example of the Example A-2-1, a mode of detecting that the probability of presence of the concealment is high if the distribution of the individual difference eigenspace coefficient vector group in a patch of the corresponding to an area of a concealment candidate spread can be adopted. Instead, it may be determined that the probability of presence of concealment is high if the distribution of a concealment candidate area spread beyond the distribution in the entire face.

Example A-2-3

As another example, a mode that preliminarily acquires the correct distribution profile of the individual difference eigenspace coefficient vector group (image not included in the learning set) may be adopted. In this case, it is detected that the probability without concealment is high if the distribution profile of the individual difference eigenspace coefficient vector group is similar to the preliminary distribution profile.

Example of Reconstruction According to Different Method from Present Invention by Detecting Concealment Area Example A-3-1

A mode may be adopted that performs detection as with "Example A-2-1" and reconstruction on the concealment object area by another transformation method such as bicubic or the "general-purpose super-resolution processor 164" (see FIG. 6).

Example of Reconstruction Estimating Coefficient Vector Outside of Specific Area from Specific Area in Face Example A-4-1

The correction coefficient vector group in the entire face may be acquired, with respect to the pixel vectors in the patch group into which the facial image of the same person has been divided, from the individual difference eigenspace coefficient vector group in the patches in a part of the face (e.g., each area of the eyes, nose and mouth), using high correlation in the individual eigenspace.

Example A-4-1-1

For instance, the representative value, such as the average value, median, maximum value and minimum value, of the individual difference eigenspace coefficient vector group of a part of the face is used as the value of the correction coefficient vector group in the entire face.

Example A-4-1-2

Instead of "Example A-4-1-1", the distribution of the individual difference eigenspace coefficient vector group in respect to a plurality of patches in a center part in the face is acquired. Next, extrapolation estimation is performed according to the distribution, and the correction coefficient vector group outside of the center part is acquired. For instance, the distribution of the coefficient vector group in nine patches of 3×3 in the center part of the face is acquired, and the coefficient vector at a position out of the nine patches is acquired by extrapolation estimation according to the distribution.

Example A-4-1-3

The distribution of individual difference eigenspace coefficient vector group is acquired only in the patches thinned out in the horizontal and vertical directions in the face. Next, the distribution is interpolated, and the correction coefficient vector group is acquired in the patches where the individual difference eigenspace coefficient vector is not acquired. For instance, the distribution of coefficient vectors are acquired only on the patch positions with even numbers, and the vectors of the rest of the patches with odd numbers are acquired by interpolation.

According to the "Example A-4-1" to "Example A-4-1-3", the number of processes in the [L pixel→individual difference] eigenspace projector 134 are reduced from the first sub-kernel tensor generator 122 as illustrated in FIG. 6, thereby enabling the speed of the processes to be enhanced.

Example A-Common-1

The correction coefficient vector group in the patches to be processed and the patches therearound may be applied with the low pass filter (e.g., average filter). Such a mode exerts an advantageous effect of spatially smoothing the acquired correction coefficient vector group and eliminating the noise components. Instead of the average filter, the maximum value, minimum value or median filter may be applied.

(Second Sub-Kernel Tensor Generator)

The second sub-kernel tensor generator 124 generates the sub-kernel tensor $G_H$ from LPP projective kernel tensor 116 by providing the patch position of the output from the setting value acquisition section 120 and a condition of H setting.

The device may be performed in the learning step, instead of a mode of processing in the reconstruction step as in FIG. 6. Preliminary generation of the sub-kernel tensor $G_H$ in the learning step can reduce the processing time of the reconstruction step. However, this requires a memory to store the sub-kernel tensor $G_H$.

([Individual Difference→H Pixel] Eigenspace Projector)

The [individual difference→H pixel] eigenspace projector 152 acquires $G_H$ from the second sub-kernel tensor generator 124, and performs the $G_H$ projection illustrated in (C)→(D) in FIG. 2 on the correction coefficient vector of the output of the coefficient vector correction processor 140.

(Eigenspace→H Pixel Projector)

The eigenspace→H pixel projector 154 acquires the LPP eigen projective matrix $U_{pixels}$ on the basis of the patch position from the setting value acquisition section 120, performs the $U_{pixels}$ projection illustrated in (D)→(E) in FIG. 2 on the coefficient vector of the output of the [individual difference→H pixel] eigenspace projector 152, and thereby acquires the high resolution image.

(Adding Section)

The adding section 160 outputs the sum between the input (reconstruction information of the high frequency components) from the eigenspace→H pixel projector 154 and the input (original enlarged low resolution image) from the low resolution enlarging processor 102. The adding section 160 adds up and integrates what is for entire patches and generates one facial image (high resolution image).

The image processing as described in this example enables the output image, where information of the high frequency region not included in the input image is reconstructed, to be acquired. More specifically, the high frequency components, which are higher than or equal to Nyquist frequency components in the input image enlarged in the low resolution enlarging processor 102, is reconstructed, and the reconstruction is added to the original low resolution enlarged image and the high resolution image is acquired.

Figure 10A:
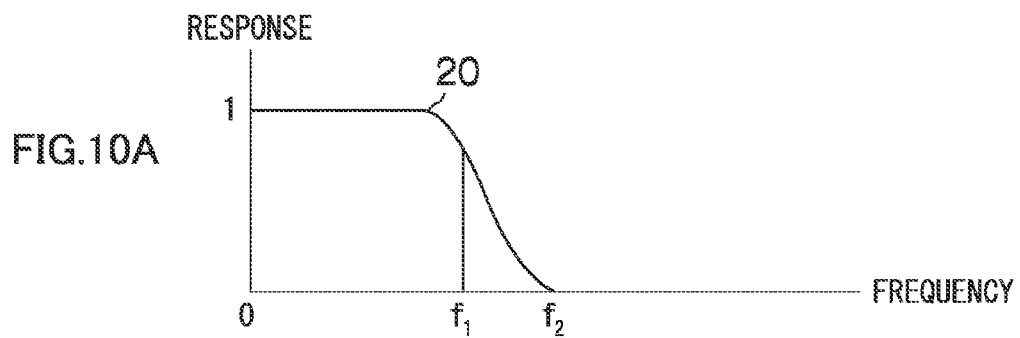
FIG. 10A is a diagram showing frequency characteristics of an input image.

Characteristics assigned with reference numeral 20 and shown in FIG. 10A illustrate a relationship (frequency characteristics of the input image) between the spatial frequency (frequency) of the input image (corresponding to the "low quality image #20" in FIG. 3) and the response (gain). As shown in FIG. 10A, the input image has spatial frequencies up to $f_2$; the low frequency region (e.g., the frequency region lower than $f_1$) includes the illumination variation factor.

Figure 10B:
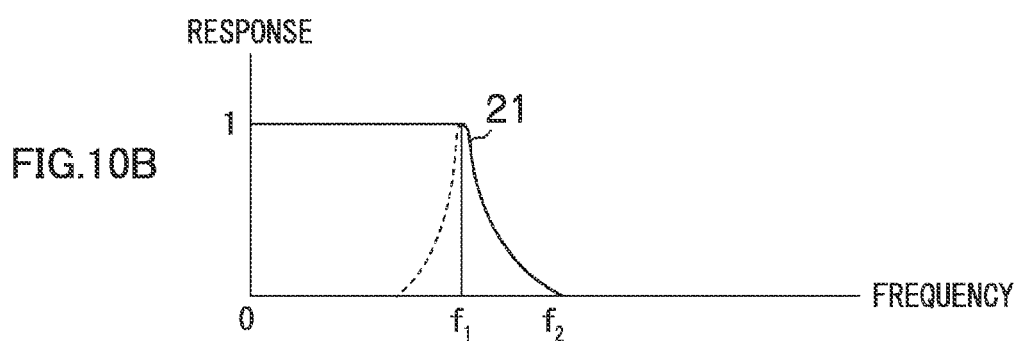
FIG. 10B is a diagram showing frequency characteristics of the input image after passage through a high pass filter.

Characteristics assigned with reference numeral 21 and shown in FIG. 10B is the frequency characteristics of the low frequency component suppression image where the high frequency component has been extracted from the input image in the high pass filter 104. Here, a process of cutting off the frequency components lower than $f_1$ has been applied to the input image having the frequency characteristics shown in FIG. 10A.

When the low frequency component suppression image having the frequency characteristics assigned with reference numeral 20 and shown in FIG. 10B is generated, the projection processes in the first and second LPP_HOSVD projection processors 130 and 150 are performed on the low frequency component suppression image, and the projection image including higher frequency components (higher region reconstruction image), which is not included in the low frequency component suppression image (high frequency components in the input image), is acquired.

Figure 10C:
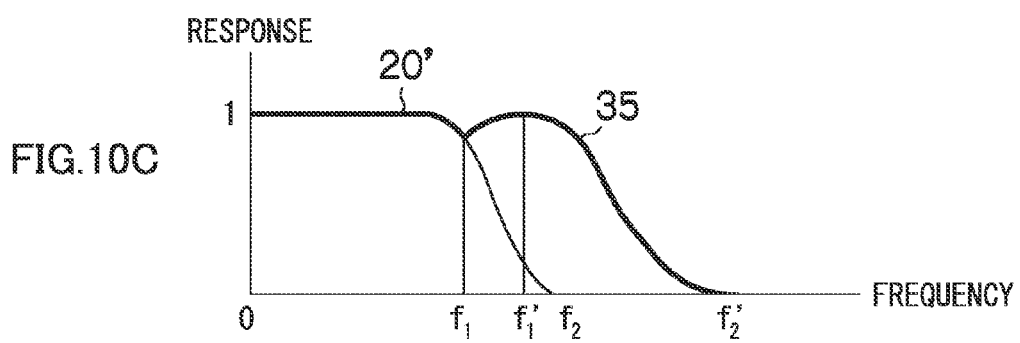
FIG. 10C is a diagram showing frequency characteristics of an output image.

A part indicated by reference numeral 35 in FIG. 10C corresponds to the reconstructed projection image. As shown in FIG. 6, the enlarged image, to which the enlarging processing for enlarging the inputted low resolution image to a prescribed size (the number of pixels) has been applied in the low resolution enlarging processor 102, is generated. An example of frequency characteristics of the enlarged image is as what is assigned with reference numeral 20' and shown in FIG. 10C.

In the adding section 160 in FIG. 6, a process of adding the enlarged image acquired from the low resolution enlarging processor 102 and the projection image (higher region reconstruction image) generated by the tensor projection is performed. As shown in FIG. 10C, a reconstruction image (corresponding to the "high quality image #36" in FIG. 3), having been made into high image quality with a frequency band into which reference numerals 20' and 35 are synthesized, is generated.

As shown in FIG. 10C, in the enlarged image (20') into which the input image is enlarged, the response at the frequency region higher than or equal to $f_1$ is decreased (deterioration of reconstruction). However, addition of the projective image (35) ensures a prescribed response (reconstruction) even in the frequency region $f_2$ to $f_2'$. That is, the image processing according to this example can represent a frequency region $f_2$ to $f_2'$, which is not represented in the input image, in the reconstructed output image.

Frequency $f_1'$ in FIG. 10C represents a frequency corresponding to the threshold $f_1$ in the input image. A method of setting the frequency $f_1'$ on the basis of the Nyquist frequency in the sampling theorem is exemplified. More specifically, the high frequency component extraction process is performed on the input image using the frequency $f_1$ corresponding to a frequency a little lower than the Nyquist frequency as the threshold. This enables the image deterioration factor included in the low frequency components in the input image to be eliminated, thereby allowing the preferable high quality image to be reconstructed.

The frequency region extracted from the input image (and learning image set) may be a so-called cut off frequency (frequency whose response is −3 dB). Instead, the region may be appropriately set according to the input image or the output image.

A configuration may be adopted that, when the enlarged image from the low resolution enlarging processor 102 and the projective image (the reconstruction image acquired from "eigenspace→H pixel projector 154") acquired by the tensor projection are added to each other, the original low resolution enlarged image is subjected to a prescribed filter processing and subsequently reconstruction information of high frequency components are added thereto.

A mode is also preferable that, when the enlarged image from the low resolution enlarging processor 102 and the projective image (the reconstruction image acquired from "eigenspace→H pixel projector 154") acquired by the tensor projection are added to each other, the images be weighted using a weight coefficient determined using reliability of the projection image as an indicator and subsequently added to each other.

For instance, when the reconstruction reliability of the high quality processing by the tensor projection is high, the projection image is positively used. When the reconstruction reliability is low, the weight coefficient may be determined so as to increase the adopting ratio of the enlarged image. It is further preferable that the weight coefficient be capable of being determined in consideration of the frequency characteristics.

The high resolution image is thus acquired from the adding section 160, as described above. Further, when the correction process in the coefficient vector correction processor 140 is heavy, the weighted addition is performed such that the influence of the high resolution image acquired from the "eigenspace→H pixel projector 154" is small.

An example of the configuration to perform the process will hereinafter be described.

The configuration includes, in addition to the super-resolution processing device utilizing the LPP projective tensor (reference symbols 100A in FIGS. 6 and 100B), a super-resolution processing device using another algorithm ("general-purpose super-resolution processor 164" in FIG. 6) different therefrom, a weight calculator 162 and synthesizer 166. The general-purpose super-resolution processor 164, the weight calculator 162 and the synthesizer 166 correspond to the generalized super-resolution process (#64), the weight coefficient calculation step (#62) and the synthesis step (#66) in FIG. 3.

(General-Purpose Super-Resolution Processor)

The general-purpose super-resolution processor 164 enlarges the inputted low resolution image into the same size as the output in a super-resolution manner.

The enlarging method is not specifically limited. For instance, clustering method (Atkins, C. B.; Bouman, C. A.; Allebach, J. P., "Optimal image scaling using pixel classification", IEEE, Image Processing, 2001. Proceedings. 2001 International Conference on Volume 3, Issue, 2001 Page(s): 864-867 vol. 3) may be used.

The characteristics of the clustering method are that combination of a plurality of models allows the super-resolution of a variation of patterns to be supported because of adoption of mixed model.

As a processing device, the following mixed Gaussian model is provided.

$$x = \Sigma(Ai \cdot z + Bi) \cdot wi(y - \mu i, \pi i) \quad \text{[Expression 5]}$$

where z: low resolution image, x: high resolution image, $Ai$, $Bi$, $\mu i$ and $\pi i$ are determined on learning, and the probability $wi$ as the weight is dynamically acquired by the dimensional vector y of the difference between the unknown pixel and the circumference thereof on reconstruction.

For instance, $Ai$, $Bi$, $\mu i$ and $\pi i$ are acquired as follows.

First, the dimensional vectors of the differences (cluster vector) are classified by acquiring each center of gravity of 100 classes using K-means, and an initial distribution condition is created.

Next, updates are repeatedly made using the EM algorithm. The likelihood function is maximized under the current conditional probability, and the next conditional probability is acquired. The estimation of the conditional probability is performed in the E step. The maximization of the likelihood function using the estimated value in the E step is the M step. The loop processing of the E step and the M step are performed until the output of the likelihood function is stabilized. For instance, 10,000 times of learning are performed for learning 100 thousand pixels and 100 classes (convergence condition is $e^{-10}$).

The enlarging method described with respect to the low resolution enlarging processor 102 may be used as another enlarging method in the general-purpose super-resolution processor 164. More specifically the "general-purpose super-resolution processing" here is a concept including image processing other than super-resolution processing using the projective tensor, such as enlarging processing for enlarging the size of the low quality image as the input image into the same size as of the high quality image.

(Weight Calculator)

The weight calculator 162 is a device for acquiring the weight w1 to be used in the synthesizer 166 so as to adjust, by increasing and decreasing, the adoption ratio of the general-purpose super-resolution method in the general-purpose super-resolution processor 164 according to the degree of deviation of the input condition. The weight w1 is determined such that the lower the degree of deviation of the input condition, the adoption ratio of the general-purpose super-resolution method is decreased, and the higher the degree of deviation of the input condition, the adoption ratio of the general-purpose super-resolution method is increased.

For instance, methods of calculating the weight coefficient includes a method of calculating the weight coefficient on the basis of the correlation relationship between the coefficient vector of the learning image group (here, those made to be representative values in the learning set representative value processor 112,) in the individual difference eigenspace and the individual difference eigenspace coefficient vector generated in the first LPP_HOSVD projection processor 130 with respect to input image.

The tensor projection super-resolution processing and the super-resolution processing by another method are thus used together. When the degree of deviation of the input condition is large, the super-resolution processing by another method is adopted and the problem of the tensor projection super-resolution processing that the larger the degree of deviation of the input condition, the further the reconstruction feature deteriorates can be resolved. This thereby enables the high quality image with preferable reconstruction feature to be acquired.

A specific calculation example in the weight calculator 162 will hereinafter described. Here, an operational equation ([Expression 7]), which will be described later, in the synthesizer 166 indicates that the smaller the value of the weight w1, the higher the adoption ratio (1−w1) of the general-purpose super-resolution method becomes.

Example B-1-1

The tensor projection super-resolution device (reference symbols 100A and 100B in FIG. 6) having already been described has characteristics that the farther the individual difference eigenspace coefficient vector is from the coefficient vector of the learning set in the individual difference eigenspace, the further the reconstruction feature deteriorates (characteristics [1]).

Figure 11A:
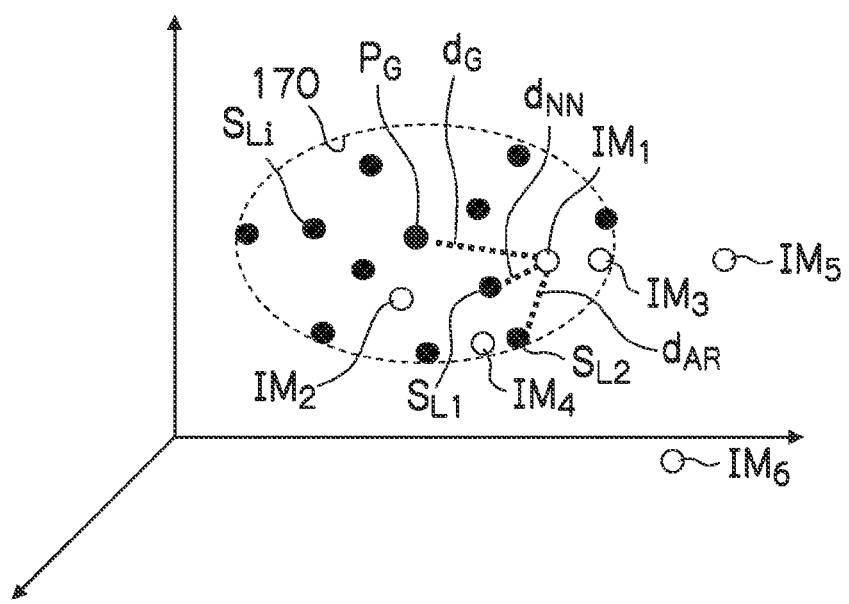
FIG. 11A is a conceptual diagram showing a relationship between a learning image vector group and an unknown image vector in a individual difference eigenspace.

FIG. 11A is a conceptual diagram representing the characteristics W. In FIG. 11A, the eigenspace of the tensor is represented as a three-dimensional space; the learning image vectors are represented as small points $SL_1, SL_2, \ldots, SL_i$. The outer edge of the distribution area of the learning image group is represented as reference numeral 170; the center of gravity $P_G$ of the learning image vector is represented as black dot.

Unknown image vectors $IM_1$, $IM_2$, . . . outside of the learning image vector are represented as white circles.

The distance is determined from the neighborhood of the unknown image vector with respect to the learning image vector group, the distance to the learning image vector (the nearest neighbor, center of gravity, circumferential boundary point), and determination of inside or outside of the sample group (class).

The unknown image vector indicated by reference symbol $IM_1$ in FIG. 11A is inside of the learning set (sample group). The distance to the nearest neighbor is $d_{NN}$, the distance to the center of gravity $P_G$ is $d_G$, and the distance from the circumferential boundary point $d_{AR}$ are comprehensively evaluated (for instance, an evaluation value is calculated using an evaluation function of a linear combination of these distances), and it is determined that the distance between the learning image sample and the input image is relatively short.

It is also determined that the distance of reference symbol $IM_2$ to the learning image sample is short. These unknown image vectors are reconstructed in a very preferable manner.

Reference symbols $IM_3$ and $IM_4$ exist inside of the class of the sample group. The distances thereof are a little longer than those of reference symbols $IM_1$ and $IM_2$. The distances between reference symbols $IM_3$ and $IM_4$ can be evaluated as in "a little near" level. Reference symbols $IM_3$ and $IM_4$ can also be reconstructed in a relatively preferable manner.

Reference symbols $IM_5$ and $IM_6$ exist outside of the class of the sample group. The distances thereof to the learning set are long. The reconstruction features are reduced when these unknown image vector $IM_5$ and $IM_6$ are reconstructed. Thus, the shorter the distance to the learning set is, the better the reconstruction can be performed. There is a tendency that the longer the distance is, the worse in reconstruction feature becomes.

The weight w1 will be determined as follows, using such characteristics [1].

The processes up to the "[L pixel→individual difference] eigenspace projector 134" in the reconstruction step are performed on the representative learning set acquired in the learning set representative value processor 112, and the representative individual difference eigenspace coefficient vector group is preliminarily acquired.

Figure 11B:
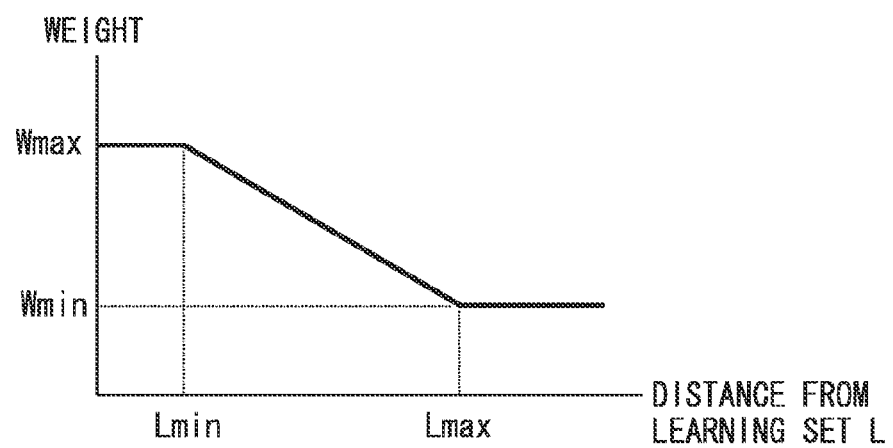
FIG. 11B is a diagram showing an example of a weight specified in relation to a distance from the learning set.

The shortest distance between the representative individual difference eigenspace coefficient vector group and the individual difference eigenspace coefficient vector group acquired in the "[L pixel→individual difference] eigenspace projector 134" is acquired on the basis of the patch position from the setting value acquisition section 120. The w1 is acquired using the functions, such as LUT shown in FIG. 11B, $\beta 1/x$, $\beta 1/x^2$, $\exp(-\beta 1x)$.

Example B-1-2

The more similar the directions of the coefficient vector in the learning set and the individual difference eigenspace coefficient vector are, the larger w1 is determined.

Example B-2-1

The tensor projection super-resolution device (reference symbols 100A and 100B in FIG. 4) having been described has characteristics that the wider the "distribution where the number of patches is the number of the sample" of the individual difference eigenspace coefficient vector spreads (dispersed) in the individual coefficient eigenspace, the worse the reconstruction feature become (characteristics [2]).

Utilizing the characteristics [2], when the distance between the coefficient vector in the representative learning set and the individual difference eigenspace coefficient vector in each patch or the distribution of the direction with respect to the patch sample is longer or wider, the weight w1 is specified smaller. For instance, a lookup table indicating the corresponding relationship between the distribution spread and the weight w1 may preliminarily be created. Instead, this corresponding relationship may be calculated using the function specifying the same relationship.

According to this mode, the degree of reliability of the method according to the present invention is evaluated using the tensor in the individual difference eigenspace (individual eigenspace in (C) in FIG. 2) in comparison with the tensor in the pixel eigenspace (image eigenspace in (B) in FIG. 2). Accordingly, use of the characteristics [1] of the tensor projection enables the all patches to be evaluated using the same indicator (the all patches substantially converge to a point), thereby exerting a novel advantageous effect that allows the evaluation to be performed using the distribution spread as the reliability standard. Therefore, the weight calculation precision is improved.

Example B-2-2

In the distribution for the patch sample of "Example B-2-1", the smaller the number of patch samples (or the farther from the representative value), the smaller w1 is specified. That is, the weight is changed according to the frequency on the histogram.

This case exerts an advantageous effect capable of controlling the weight in a patch-by-patch manner.

Example B-3

In the distribution for the patch sample of "Example B-2-1", the more similar the distribution profile is, the larger the weight may be specified. For instance, the weight is changed according to whether the distribution profiles of the distribution of the person A grasped in the learning step and the distribution of the input image (unknown image) are similar to each other or not.

Example B-Common-1

The following configuration may be adopted in common to "Example B-1-1", "Example B-1-2", "Example B-2-1", "Example B-2-2" and "Example B-3", having been described above. For instance, in "Example B-1-1" and "Example B-1-2", the correct appropriateness determination indicator of the individual patch of each individual (e.g., in the face of the person A) is further considered on each representative individual difference vector as the learning sample. The distance of the individual patch from the representative value of the distribution for the patch sample is utilized as the determination indicator. The longer the distance from the representative value is, the farther the vector is estimated to be apart from the correct one. More specifically, wp having similar characteristics as with FIGS. 11A and 11B, $\beta 2/x$, $\beta 2/x^2$, $\exp(-\beta 2x)$ or the like is acquired, and w1'=w1·wp may be provided for the synthesizer 166.

According to such a mode, the reliability of the method according to the present invention is evaluated in the tensor individual difference eigenspace (individual eigenspace in (C) in FIG. 2), in comparison with the tensor pixel eigenspace (image eigenspace in (B) in FIG. 2), thereby all the patches to be evaluated with reference to the same indicator (all the patch converges to a substantially single point) with use of the characteristics [1] of the tensor projection. Accordingly, this exerts a novel advantageous effect that the learning sample which has been defined as temporal correct one itself is also included in consideration and evaluation can be performed. Therefore, weight calculation precision is increased.

Example B-Common-2

The average, median, maximum, minimum and the like may be used as the representative value in common to "Example B-1-1", "Example B-1-2", "Example B-2-1", "Example B-2-2" and "Example B-3", which have been described above.

Example B-Common-3

The variance, standard deviation and the like may be used as the distribution spread (dispersion) in common to "Example B-1-1", "Example B-1-2", "Example B-2-1", "Example B-2-2" and "Example B-3", which have been described above.

Example B-Common-4

The shorter the distance between the representative value, such as the center of gravity of the learning set and circumferential boundary point, and the individual difference eigenspace coefficient vector is or the more similar the direction is, the larger w1 becomes. According to such a mode, objects to be calculated including the distance and direction can be decreased, thereby enabling the speed of processing to be enhanced.

Example B-Common-5

The Euclidean distance, Mahalanobis distance, KL distance and the like may be used for calculation of the "distance" in each example having been described above.

Example B-Common-6

The vector angle, inner product, outer product and the like may be used for calculation of the "direction" in each example having been described above.

Example B-Common-7

In the "learning step" illustrated in FIG. 3, the relationship between the distance, direction, representative value, distribution spread, or distribution profile and a reconstruction error is defined as correct/incorrect set. The reconstruction error is the difference between the image reconstructed using the projective function acquired from the learning image set and the correct image, and for instance, represented by mean square error with the correct/incorrect image or PSNR (peak signal-to-noise ratio).

The relationship between at least one of the "distance, direction, representative value, distribution spread and distribution profile" and the "reconstruction error", and the relationship between the "reconstruction error" and the "weight w1" is defined with the LUT, function or the like.

In the "reconstruction step", the "weight w1" is acquired using the LUT or the function from at least one of similarities between the "distance, direction, representative value, distribution spread and distribution profile" of the "learning step" and those of the "reconstruction step".

The specific method for acquiring the "weight w1" from at least one of similarities of the "distances, directions, representative values, distribution spreads and distribution profiles" will hereinafter be exemplified.

<Processing in Learning Step>

The relationship between at least one of the "distance, direction, representative value, distribution spread and distribution profile" and the "reconstruction error" is acquired. For instance, it is acquired as "characteristics of distance-reconstruction error". It may be specified as characteristics with reliability probability proportional to the frequency.

<Processing in Reconstruction Step>

The "distance, direction, representative value, distribution spread and distribution profile" acquired in the nearest "learning step" is selected from the "distances, directions, representative values, distribution spreads and distribution profiles" acquired in the "reconstruction step" illustrated in FIG. 6, and the corresponding "reconstruction error" is acquired.

Next, the "weight" is acquired according to the relationship of the following equation ([Expression 6]) on the basis of the selected "reconstruction error". Here, the smaller the "reconstruction error" is, the larger the "weight" is specified.

Weight $w1 = b0 + b1 \times$(Reconstruction Error)   [Expression 6]

A nonlinear function may be defined, instead of the linear function represented in [Expression 6], and the weight may be acquired.

Example B-Common-8

The function specifying the correlation between at least one of the "distance, direction, representative value, distribution spread and distribution profile" of the correct/incorrect set in the individual difference eigenspace in the "Example B-Common-7" and the "weight" may be the (regularized) least squares method, multiple regression analysis, SVM (regression), AdaBoost (regression), Nonparametric Bayesian Method, maximum likelihood estimation method, EM algorithm, variational Bayesian method, Markov chain Monte Carlo method, and the coefficients b0 and b1 in [Expression 6] may be acquired.

Example B-Common-9

In the above examples ("Example B-1-1" to "Example B-Common-8"), a low pass (average) filter may further be applied to the weights of the patch to be processed and the patches therearound. This mode exerts advantageous effects of spatially smoothing the acquired weight and eliminating noise. The maximum value, minimum value, or median filter may be applied.

The above "Example B-Common-1 to 9" methods may be applied to weighting in the coefficient vector correction processor 140, which has been described above.

As described above, in the configuration that utilizes another system of an image transformation device (here, general-purpose super-resolution) according to the degree of deviation of the input image to the learning image set (degree of deviation of the input condition), use of the representative value of the learning image set, when utilizing the positional relationship of the coefficient vector in the eigenspace, exerts an advantageous effect that enables the function of another system to effectively be functioned.

(Synthesizer)

The synthesizer 166 of FIG. 6 synthesizes or selects the image (input image 1) provided from the adding section 160 and the image (input image 2) provided from the general-purpose super-resolution processor 164 according to the weight less than or equal to that acquired in the weight calculator 162.

Output high resolution image=$\Sigma(wi \cdot Ii) = wi \cdot I1 + w2 \cdot I2$,   [Expression 7]

where w1 represent the weight w1 of the output I1 from the adding section 160, w2 represents the weight $w2 = 1 - w1$ of the output I2 from the general-purpose super-resolution processor 164.

The image processing system including the above configuration can acquire the high quality image from the low quality image. The permissible range for the input condition is wide, and robust and high quality processing can be realized.

One or more high quality processors according to another method may be provided in addition to the general-purpose super-resolution processor 164, and these may selectively be used or synthesis with appropriate weighting may be performed.

On the other hand, there is a possibility that the reliability of the super-resolution reconstruction processing becomes significantly low according to the condition of input image. A case may be considered that it is preferable to output an image utilizing the information on the original input image, instead of outputting a deteriorated image with low reliability. Accordingly, a processor for simply enlarging the input image may be provided instead of or together with the general-purpose super-resolution processor 164, the image (image without application of the super-resolution reconstruction processing) enlarged in the enlarging processor may be supplied to the synthesizer 166.

Variation 1 of Embodiment

Figure 12:
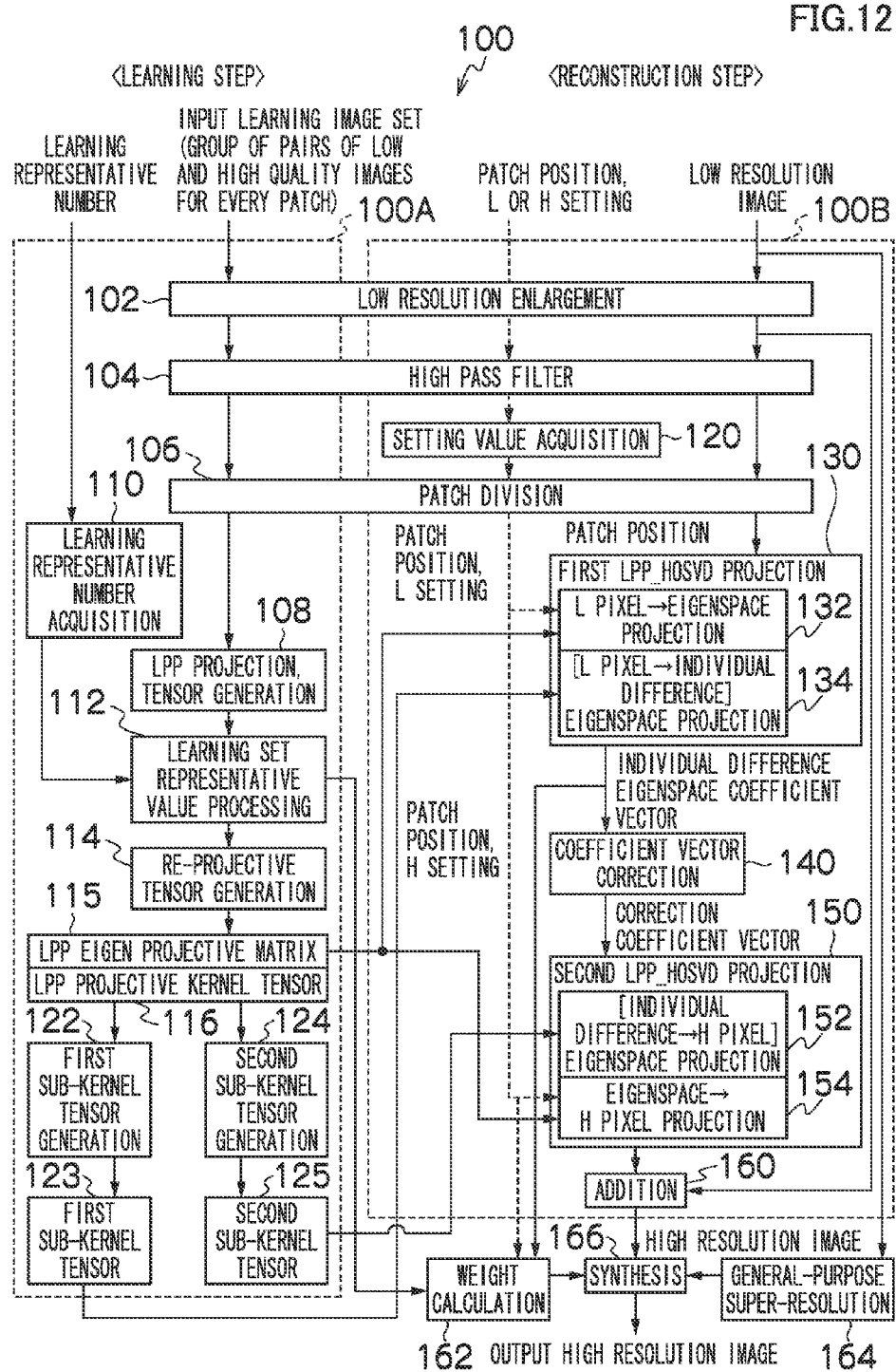
FIG. 12 is a block diagram showing a configuration of an image processing apparatus according to another embodiment of the present invention.

FIG. 12 is a block diagram showing another embodiment. In FIG. 12, the elements having the identical or similar configurations to those in FIG. 6 will be assigned with the same symbols; the description thereof will be omitted.

The mode shown in FIG. 12 generates the first and second sub-kernel tensors 123 and 125 and stores and saves the tensors in a storing device such as a memory, in the learning step.

The LPP eigen projective matrix U and the projective kernel tensor G (further, the first and second sub-kernel tensors 123 and 125) can repeatedly be used in subsequent processes, if created once and saved. Accordingly, it is preferable to parametrize the matrices and tensors for each learning image set and to specify the appropriate projective matrices and tensors again according to the contents of the input image in the reconstruction step.

For instance, projective transformation sets, such as the set of the projective matrices and tensors generated on the basis of the learning image set of the faces of Japanese people and the set of the projective matrices and tensors generated on the basis of the learning image set of the faces of people in the West, are parameterized in a country-by-country and region-by-region basis, and switched as necessary and used.

Further, the set of the projective matrices and the tensors may be switched according to usage of the process, without limitation to the process of super-resolution reconstruction of the face image. For instance, the learning image sets are switched according to the usage, such as for endoscope images, vehicle images and the like, the LPP eigen projective matrix U and the projective kernel tensor G (further, the first and second sub-kernel tensors 123 and 125) are generated, and the generated projective matrices and the tensors are stored and accumulated in a nonvolatile memory, magnetic disk or another storing device. The corresponding projective matrix and tensor are read according to usage and specified, thereby enabling various image processes to be performed using the same algorithm.

Variation 2 of Embodiment

FIGS. 6 and 12 show the configurations capable of performing the learning step and the reconstruction step in the single image processing apparatus. However, separate configurations of apparatuses, which include an image processing apparatus for performing the learning step and an image processing apparatus for performing the reconstruction step, can be adopted. In this case, it is preferable that an image processing apparatus for performing the reconstruction step has a configuration capable of acquiring information on projective relationship (eigen projective matrix and projective tensor) having separately been created from the outside. A media interface or a communication interface supporting an optical disk or another removable storing media may be applied as such information acquiring device.

Variation 3 of Embodiment

In the above embodiment, LPP is exemplified as the projection utilizing the local relationship. Instead of the LPP, various manifold learning methods, which include the locally linear embedding (LLE), linear tangent-space alignment (LTSA) isomap, Laplacian eigenmaps (LE), neighborhood preserving embedding (NPE), may be applied.

The technique of acquiring the representative learning image group according to the present invention is not limited to the projection utilizing the local relationship. However, the technique may be applied to the tensor singular value decomposition (TSVD).

Variation 4 of Embodiment

In the embodiment illustrated in FIG. 6, the condition is specified with the modalities of patches and resolution as known element with respect to the four types of modalities described in Table 1, the projection route from the pixel real space through the pixel eigenspace and the individual difference eigenspace has been designed focusing on the modalities of the "pixel value" and "individual difference", for the sake of simplicity of the description. However, the design of the projection route is not limited to this example when the present invention is implemented. Various eigenspaces can be selected as the eigenspace through which the projective route goes, according to variation in modality.

Variation 5 of Embodiment

The original image to be transformed, which is inputted into the reconstruction step, may be an image area partially cut off (extracted) from a certain image in a stage before entrance into the processes illustrated in FIGS. 6 and 12. For instance, a process of extracting the part of face of a person from the original image is performed, and the extracted facial image area can be processed as the input image data in the reconstruction step.

A processing device for replacing the extracted area with the output high resolution image after reconstruction and for performing a synthesizing process of embedding the image in the original image may be added. In such a case, the enlarging factor is adjusted to support the final output image size (size of background to be synthesized).

<Another Application>

The learning image set is changed as follows, and it can be applied to "object", "modality" and "image processing". Accordingly, the scope to which the present invention is applied is not limited to the above embodiments.

The image to be the "object" may include a part of a human body such as a head or hands or an area including at least a part of a living body other than the human body, in addition to the face. Note that the living body includes a specific tissue, such as blood vessels, being in the living body. When the image processing technique according to the present invention is applied to an endoscope system, a tumor tissue in the living body may also be included in a concept of "living body" and can become the "object".

The object is not limited to the living body. Money, cards such as a cash card, vehicles, license plates of vehicles, characters on a document scanned by a scanning apparatus such as a copier, diagrams, tables, photographs and the like can be the objects.

The "modalities" may include the orientation, size, position and illuminating condition of a subject. Further, the modalities may include the human race, age and sex as the types of subjects. As to the attributes of the subject images, the facial expression of an imaged person, gesture of the imaged person, orientation of the imaged person, wearing objects worn by the imaged person, may be exemplified as "modalities". The wearing objects include glasses, sunglasses, a mask, a hat, and the like.

The "image processing" to which the present invention can be applied include a reduction process where turning components are reduced, multicolor processing, multi-gradation, noise reduction, reduction in artifact such as block noise and mosquito noise, reduction in burring, sharpening, high frame rate processing, wide dynamic range processing, color shade correction, distortion aberration correction, projection processes such as coding, in addition to super-resolution processing. For instance, in a case of the noise reduction, a image with noise (corresponding to "low quality image") and a image without noise (corresponding to "high quality image") are recognized as a pair, and the projective relationship therebetween is learned.

The present invention can be applied not only to still images but also frame images (or field images) constituting moving images in the same manner.

<Application to Monitoring System>

Figure 13:
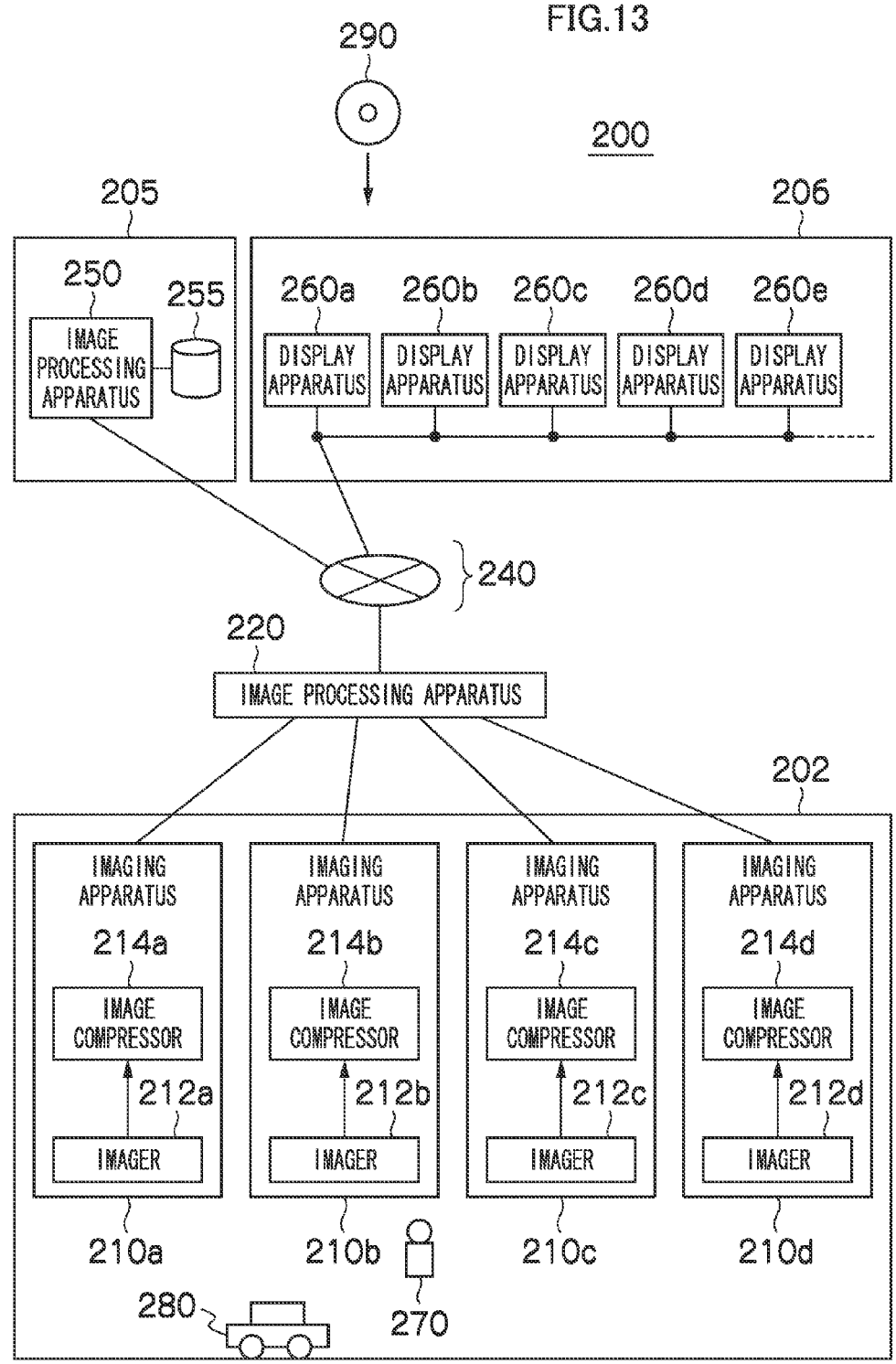
FIG. 13 is a configuration diagram showing an example of the image processing apparatus according to the embodiment of the present invention.

FIG. 13 shows an example of an image processing system 200 according to an embodiment of the present invention. The image processing system 200, which will hereinafter be described, can function for instance as a monitoring system.

The image processing system 200 includes a plurality of imaging apparatuses 210a to 210d that take images of a monitoring object space 202; an image processing apparatus 220 that processes the taken image taken by the imaging apparatuses 210a to 210d; a communication network 240; an image processing apparatus 250; an image database (DB) 255; and a plurality of display apparatuses 260a to 260e. The image processing apparatus 250 can be provided at another space 205 (e.g., a place far from the monitoring object space 202) different from the monitoring object space 202. The display apparatuses 260a to 260e can provided at another space 206 different from the monitoring object space 202 or the space 205 where the image processing apparatus 250 is provided.

The imaging apparatus 210a includes an imager 212a and an image compressor 214a. The imager 212a takes a plurality of images by consecutively taking images of the monitoring object space 202. The taken images acquired by the imager 212a may be taken images in the RAW format. The image compressor 214a applies synchronization processing to the taken images in the RAW format taken by the imager 212a, compresses moving images including the plurality of taken images acquired by the synchronization processing according to a coding system such as the MPEG coding or the like and generates moving image data. The imaging apparatus 210a outputs the generated moving image data to the image processing apparatus 220.

The other imaging apparatuses 210a, 210c and 210d have the similar configuration to that of the imaging apparatus 210a. The moving image data generated by the imaging apparatuses 210a to 210d is transmitted to the image processing apparatus 220. In the following description, the imaging apparatuses 210a to 210d may collectively be referred to as an imaging apparatus 210. Likewise, the display apparatuses 260a to 260e may collectively be referred to as a display apparatus 260. In the following description, emission of characters, such as suffix letters added to the symbols assigned to similar elements, subsequent to numerical symbols may collectively refer to what is indicated by the numerical symbols.

The image processing apparatus 220 acquires moving images by decoding the moving image data acquired from the imaging apparatus 210. The image processing apparatus 220 detects a plurality of characteristic area with different types of characteristics, including an area where an image of a person 270 is taken and an area where an image of a mobile object 280 such as a vehicle is taken, from the plurality of taken images included the acquired moving images. The image processing apparatus 220 compresses the characteristic areas in the image by a degree of compression according to the type of characteristics, while compressing the areas other than the characteristic areas by a degree of compression higher than that by which the characteristic areas in the image are compressed.

The image processing apparatus 220 generates characteristic area information including information specifying the characteristic area detected from the taken image. The characteristic area information may be text data including the positions of the characteristic areas, the sizes of the characteristic areas, the number of the characteristic areas, and identification information identifying the taken image whose characteristic areas have been detected, or data where the text data has been subjected to compression, encryption and the like. The image processing apparatus 220 attaches the generated characteristic area information to the compressed moving image data and transmits the information and images to the image processing apparatus 250 via the communication network 240.

The image processing apparatus 250 receives the compressed moving image data associated with the characteristic area information from the image processing apparatus 220. The image processing apparatus 250 causes the image DB 255 to store the compressed moving image data in relation to the characteristic area information associated with the compressed moving image data. The image DB 255 may store the compressed moving image data in a nonvolatile storing medium such as a hard disk. The image DB 255 thus stores the compressed taken images.

The image processing apparatus 250 reads the compressed moving image data and the characteristic area information from the image DB 255 responsive to the request by the display apparatus 260, decompresses the read compressed moving image data using the accompanying characteristic area information, generates moving images for display, and transmits the moving images to the display apparatus 260 via the communication network 240. The display apparatus 260 includes a user interface capable of receiving an input of image search condition, is capable of transmitting various types of requests to the image processing apparatus 250, and displays the moving images for display received from the image processing apparatus 250.

The image processing apparatus 250 can identify the taken images satisfying the various search conditions and the characteristic areas thereof, on the basis of the positions of the characteristic areas, the sizes of the characteristic areas, the number of the characteristic areas included in the characteristic area information, instead of or in addition to the display of the moving images. The image processing apparatus 250 may decode the identified taken images and provide the images for the display apparatus 260, thereby causing the display apparatus 260 to display the images satisfying the search conditions pertaining to the request.

The image processing apparatus 250 may decompresses the compressed moving image data acquired from the image processing apparatus 220 using the characteristic area information corresponding thereto and generate the moving images for display, and then cause the image DB 255 to store the moving images. Here, the image processing apparatus 250 may cause the image DB 255 to store the moving images for display in relation to the characteristic area information. According to such a mode, the image processing apparatus 250 can read the moving images for display (already decompressed) from the image DB 255 responsive to the request by the display apparatus 260, and transmit the moving images together with the characteristic area information to the display apparatus 260.

Instead of the mode that the decompressed moving images for display is provided by the image processing apparatus 250 for the display apparatus 260, the compressed moving image data may be decompressed in the display apparatus 260 and the images for display may be generated. That is, the display apparatus 260 may receive the characteristic area information and the compressed moving image data from the image processing apparatus 250 or the image processing apparatus 220. In this mode, when the display apparatus 260 decodes the received compressed moving image data and causes the display apparatus 260 to display the moving images, the characteristic areas in the taken image acquired by the decoding may be simply enlarged and displayed by the display apparatus 260.

Further, the display apparatus 260 may determine the image quality of each characteristic area according to the processing capacity of the display apparatus 260, and apply high quality processing to the characteristic area in the image according to the determined image quality. The display apparatus 260 may replace the characteristic area in the image displayed by the display apparatus 260 with the characteristic area in the image having been subjected to the high quality processing, and display the replaced image. A super-resolution processing device utilizing the tensor projection of the present invention may be utilized as a processing device for the high quality processing when the replacement display is performed. That is, the image processing apparatus to which the present invention is applied can be mounted in the display apparatus 260.

Since the image processing system 200 of this example stores the information indicating the characteristic area in relation to the moving images, the system can immediately retrieve and locate the taken image group satisfying a prescribed condition concerning the moving images. Since the image processing system 200 of this example can decode only the taken image group satisfying the prescribed condition, the system can immediately display a part of the moving images satisfying the prescribed condition responsive to an indication of reproduction.

A recording medium 290 shown in FIG. 13 is stored with programs for the image processing apparatuses 220 and 250 and the display apparatus 260. The programs stored on the recording medium 290 are provided for electronic information processing apparatuses such as computers which function as the image processing apparatuses 250 and 220 and the display apparatus 260 according to this embodiment. CPUs included in the computers operate according to the contents of the programs and control each part of the computers. The programs executed by the CPUs cause the computers to function as the image processing apparatuses 220 and 250 and the display apparatus 260 and the like, which are described in relation to FIG. 13 and figures thereafter.

Optical recording media such as a DVD or a PD, magnetic-optical recording media such as an MO or an MD, magnetic recording media such as a tape medium or a hard disk device, a semiconductor memory, a magnetic memory and the like can be exemplified, as well as a CD-ROM. A storing device such as a hard disk or a RAM provided in a server system connected to a dedicated communication network or the Internet can be function as the recording medium 290.

Hereinafter, an example of the configuration of the image processing apparatuses 220 and 250 and the display apparatus 260 of the image processing system 200 of this example will further be described in detail.

[Description of Image Processing Apparatus 220]

Figure 14:
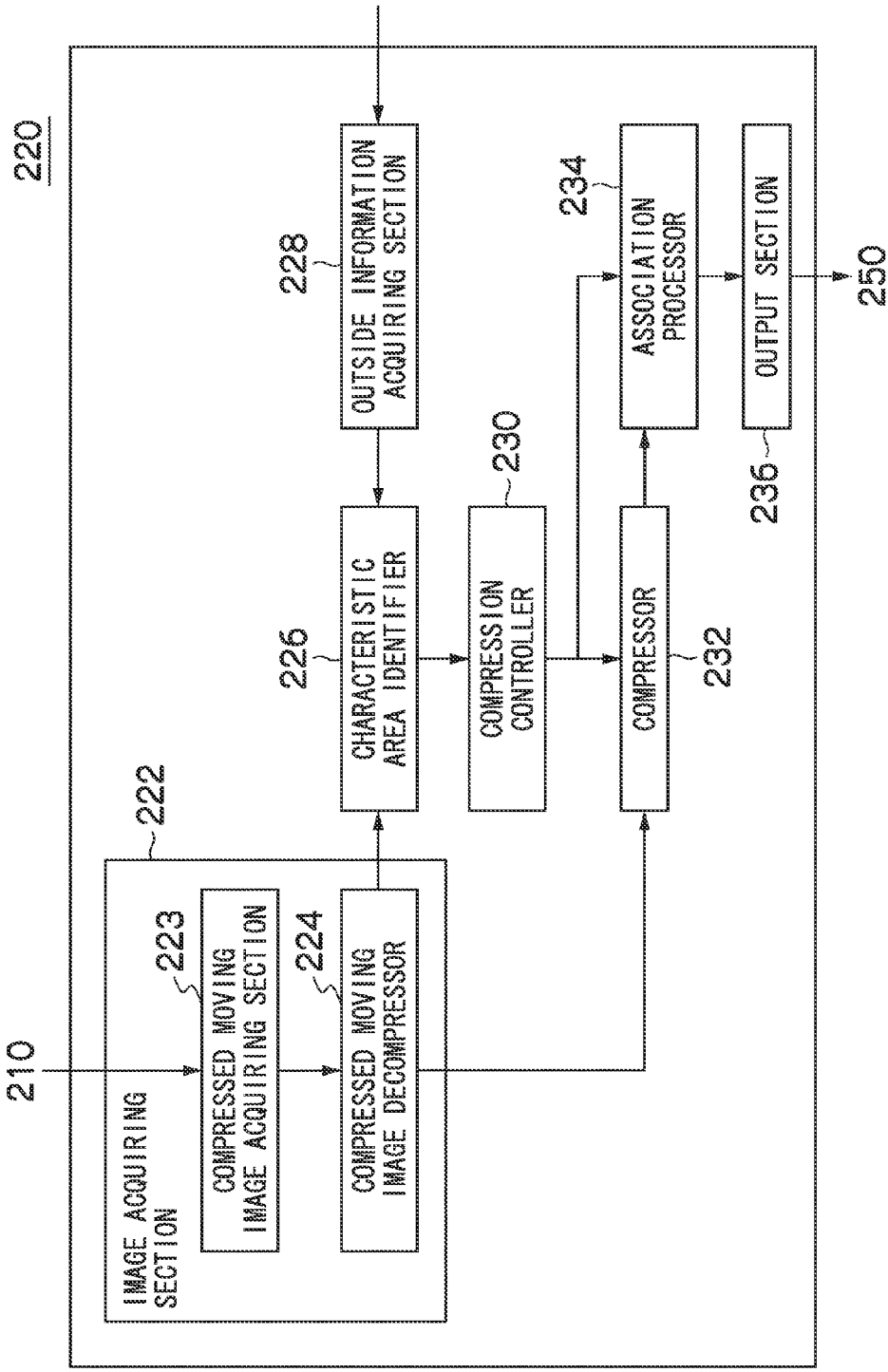
FIG. 14 is a block diagram showing an example of a configuration of the image processing apparatus 220 in FIG. 13.

FIG. 14 shows an example of the block configuration of the image processing apparatus 220. The image processing apparatus 220 includes an image acquiring section 222, a characteristic area identifier 226, an outside information acquiring section 228, a compression controller 230, a compressor 232, an association processor 234, and output section 236. The image acquiring section 222 includes compressed moving image acquiring section 223 and a compressed moving image decompressor 224.

The compressed moving image acquiring section 223 acquires the coded moving image data generated by the imaging apparatus 210 (see FIG. 13). The compressed moving image decompressor 224 generates the plurality of taken images included in the moving images by decompressing the moving image data acquired by the compressed moving image acquiring section 223. More specifically, the compressed moving image decompressor 224 decodes the coded moving image data acquired by the compressed moving image acquiring section 223, and extracts the plurality of taken images included in the moving images. The taken images included in the moving images may be frame images or field images.

The plurality of taken images acquired by the compressed moving image decompressor 224 are provided for the characteristic area identifier 226 and the compressor 232. The characteristic area identifier 226 detects the characteristic areas from the moving images including the plurality of taken images. More specifically, the characteristic area identifier 226 detects the characteristic areas from each of the plurality of taken images.

For instance, the characteristic area identifier 226 detects an image area varying in the contents of image in the moving images as the characteristic area. More specifically, the characteristic area identifier 226 may detect an image area including a moving object as the characteristic area. The characteristic area identifier 226 can detect the plurality of characteristic areas which are different in type from the respective taken images.

The types of characteristics may be types classified with reference to an indicator of types of objects such as a person and a moving object. The types of objects may be determined on the basis of the profiles of the objects or the degree of matching in color of the objects. Thus, the characteristic area identifier 226 may detect the plurality of characteristic areas different in type of the included object from the plurality of taken images.

Example 1 of Characteristic Area Detection Method

For instance, the characteristic area identifier 226 may extract the object matching with a predetermined profile pattern by at least a predetermined degree of matching from the plurality of taken images, and detect areas in the taken images including the extracted object as the characteristics areas of the same characteristic type. A plurality of the profile patterns may be determined according to the respective characteristics patterns. A profile pattern of a person may be exemplified as an example of the facial profile pattern. Different facial patterns may be specified for the respective persons. According to this, the characteristic area identifier 226 can detect the different areas including the different persons as the different characteristic areas, respectively.

The characteristic area identifier 226 can detect a part of a human body such as the head of a person or a hand of the person or a area including at least a part of a living body other than a human body as the characteristic area, as well as the face of a person.

In cases of processing an image in the living body, such as a case where a configuration similar to the image processing system 200 is applied to an endoscope system, a specific tissue existing in the living body, such as blood vessels, or a tumor tissue in the living body may be specified as an object. The characteristic area identifier 226 may detect, as well as the living body, area where an image of money, cards such as a cash card, vehicles, or license plates of vehicles is taken as the characteristic area.

Example 2 of Characteristic Area Detection Method

The characteristic area identifier 226 may detect the characteristic area on the basis a result of learning by for instance a machine learning described in Japanese Patent Application Laid-Open No. 2007-188419 (e.g., AdaBoost), as well as a pattern matching by a template matching and the like. For instance, characteristics of an amount of image characteristics extracted from an image of a predetermined subject are learned using the amount of image characteristics extracted from the image of the predetermined subject and an amount of image characteristics extracted from an image of a subject other than the predetermined subject. The characteristic area identifier 226 may then detect an area where an amount of image characteristics matching with the learned characteristics has been extracted as the characteristic area.

The characteristic area can be detected by various methods, not limited to the Examples 1 and 2. The characteristic area identifier 226 detects a plurality of characteristic areas by an appropriate method from the plurality of taken images included in each of the plurality of moving images. The characteristic area identifier 226 then provides information indicating the detected characteristic area for the compression controller 230. The information indicating the characteristic area may include coordinate information of the characteristic area indicating the position of the characteristic area, type information indicating the type of the characteristic area, and information identifying the moving image where the characteristic area has been detected.

The compression controller 230 controls a compression process of moving image by the compressor 232 on the basis of the information indicating the characteristic area acquired from the characteristic area identifier 226. The compressor 232 compresses the taken images by the different degrees of compression for the characteristic area in the taken image and the areas other than the characteristic area in the taken image, under the control of the compression controller 230. For instance, the compressor 232 compresses the taken image while reducing the resolution of the areas other than the characteristic area in comparison with that of the characteristic area in the taken images including the moving image.

The compressor 232 thus compresses the image areas in the taken images according to the degrees of importance of the respective image areas.

When the characteristic area identifier 226 detects a plurality of characteristic areas, the compressor 232 may compresses parts of image in the plurality of characteristic areas in the taken image by degrees of compression according to the types of characteristics of the respective characteristics areas. For instance, the compressor 232 may reduce the resolutions of the parts of image in the plurality of characteristic areas to predetermined resolutions specified according to the types of the characteristics of the respective characteristic areas.

The association processor 234 associates the information identifying the characteristic area detected from the taken image with the taken image. More specifically, the association processor 234 associates the information identifying the characteristic area detected from the taken image with the compressed moving image including the taken image as the moving image component image. The output section 236 outputs the compressed moving image data associated by the association processor 234 with the information identifying the characteristic area, to the image processing apparatus 250.

The outside information acquiring section 228 acquires data to be used for a process that the characteristic area identifier 226 identifies the characteristic area, from the outside of the image processing apparatus 220. The characteristic area identifier 226 identifies the characteristic area using the data acquired by the outside information acquiring section 228. The data acquired by the outside information acquiring section 228 will be described in relation to a parameter storage 650 shown later in FIG. 15.

Example of Configuration of Characteristic Area Identifier 226

Figure 15:
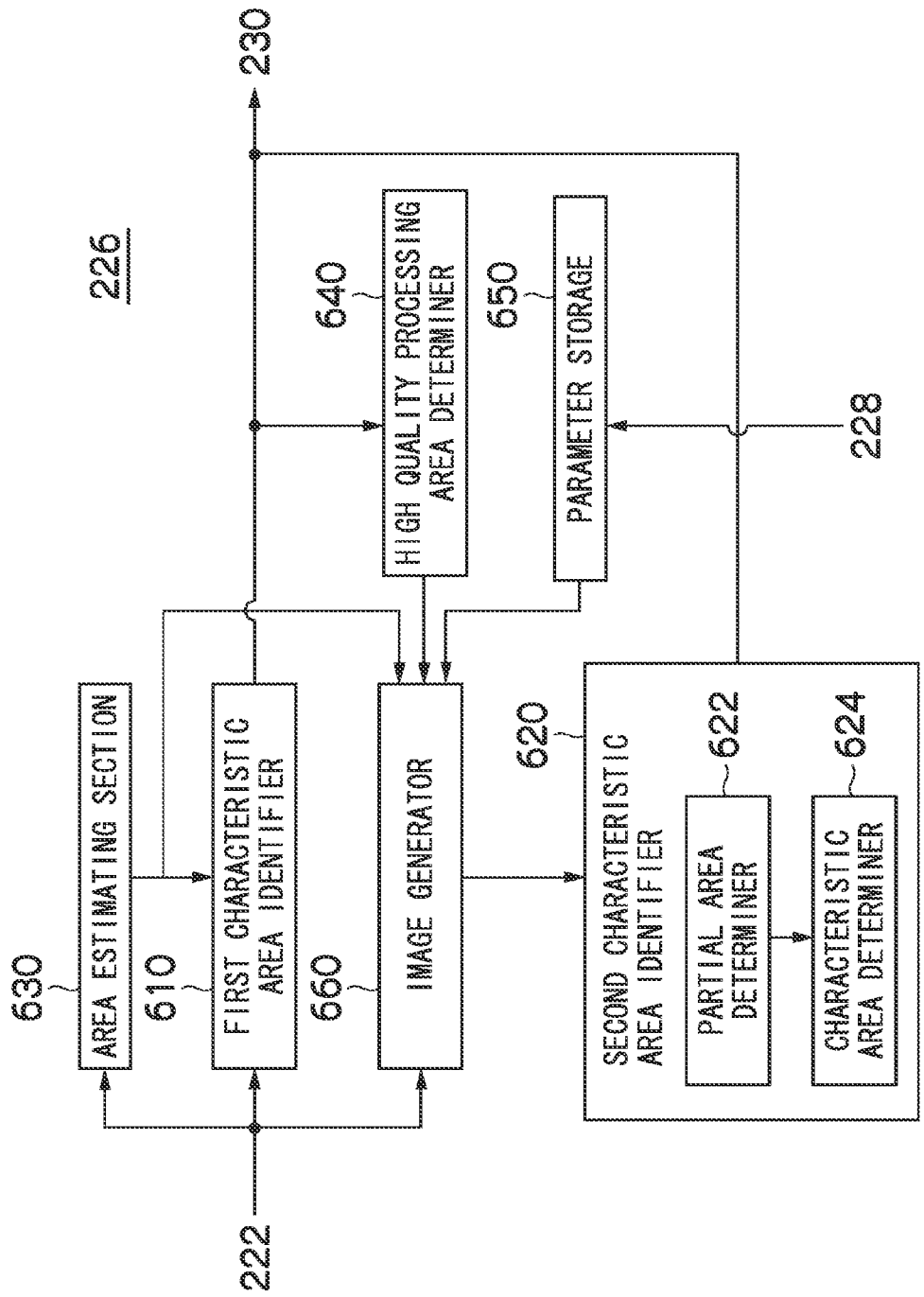
FIG. 15 is a block diagram showing an example of a configuration of a characteristic area identifier 226 in FIG. 14.

FIG. 15 shows an example of the block configuration of the characteristic area identifier 226. The characteristic area identifier 226 includes a first characteristic area identifier 610, a second characteristic area identifier 620, an area estimating section 630, a high quality processing area determiner 640, a parameter storage 650, and an image generator 660. The second characteristic area identifier 620 includes a partial area determiner 622 and a characteristic area determiner 624.

The first characteristic area identifier 610 acquires the taken image, which is the moving image component image included in the moving image, from the image acquiring section 222, and identifies the characteristic area from the acquired taken image. The first characteristic area identifier 610 may identify the characteristic area from the taken image by detecting the characteristic area using the detection method exemplified in the "Examples 1 and 2 of Characteristic Area Detection Method", having been described.

The image generator 660 generates the high quality image where areas having higher possibility of being identified as the characteristic areas have been made to be high quality among areas which are not identified as the characteristic areas (corresponding to a "first characteristic area") by the first characteristic area identifier 610, from the taken image. A super-resolution image processing device utilizing the tensor projection of the present invention may be utilized as a device for generating the high quality image in the image generator 660.

The second characteristic area identifier 620 searches the characteristic area (corresponding to a "second characteristic area") over the high quality image generated by the image generator 660. The characteristic areas identified by the first and second characteristic area identifiers 610 and 620 are provided as the characteristic areas identified by the characteristic area identifier 226 for the compression controller 230.

The second characteristic area identifier 620 may search the characteristic area in a further detailed manner than the first characteristic area identifier 610 on the basis of the high quality image acquired from the image generator 660. For instance, A detector capable of performing detection in a precision higher than that for identifying the characteristic area by the first characteristic area identifier 610 may be mounted as the second characteristic area identifier 620. That is, the detector capable of performing detection in the precision higher than that of the detector mounted as the first characteristic area identifier 610 may be mounted as the second characteristic area identifier 620.

As in another mode, the second characteristic area identifier 620 may search the characteristic area in a more detailed manner than the first characteristic area identifier 610 from the same input image (image not subjected to high quality processing) to be inputted into the first characteristic area identifier 610.

The image generator 660 may generate the high quality image where the area with high possibility of being identified as the characteristic area has been made into high image quality with precedence among areas not to be identified as the characteristic areas by the first characteristic area identifier 610, from the taken image. The image generator 660 may generate the high quality image by image processing on the taken image.

After the first characteristic area identifier 610 identifies the characteristic area, the image generator 660 may generate a high quality image where areas with higher possibility of being identified as the characteristic areas are made into high image quality among areas which are not identified as the characteristic areas by the first characteristic area identifier 610, from the taken image. The "areas not to be identified as the characteristic areas by the first characteristic area identifier 610" may be areas have not been identified as the characteristic area by the first characteristic area identifier 610 at a stage where identification has been made by the first characteristic area identifier 610. In this case, the second characteristic area identifier 620 searches the characteristic areas again.

Further, the "areas not to be identified as the characteristic areas by the first characteristic area identifier 610" may be areas estimated not to be identified by the first characteristic area identifier 610 at a stage where identification has not been made yet by the first characteristic area identifier 610. For instance, in a case where the first characteristic area identifier 610 detects areas satisfying a predetermined condition as the characteristic areas, the "areas not to be identified as the characteristic areas by the first characteristic area identifier 610" may be areas that do not satisfy the condition. The image generator 660 may generate the high quality image at a stage where the first characteristic area identifier 610 has not identified the characteristic areas yet.

In this block diagram (FIG. 15), the first and second characteristic area identifiers 610 and 620 are illustrated as different functional blocks. However, it is a matter of cause that the identifiers can be implemented as a single functional element. For instance, the first and second characteristic area identifiers 610 and 620 can share at least a part of hardware elements such as electric circuits for characteristic area detection and software elements for characteristic area detection.

In the above description, a case has been exemplified that the image generator 660 generates the image made into high image quality from the input image. The image generator 660 may generate an image with higher quality than that of the image as the object of the characteristic area identifying process by the first characteristic area identifier 610, and provide the image for the second characteristic area identifier 620. For instance, when the first characteristic area identifier 610 applies a prescribed image processing to the input image and identifies the characteristic area, the image generator 660 may generate the image with higher quality than that of the image acquired by the image processing and provide the image for the second characteristic area identifier 620.

The high quality image generated by the image generator 660 may be an image with higher quality than that used by the first characteristic area identifier 610 for the characteristic area identifying process, and includes both of the image with higher quality than that of the input image and the image with lower quality than that of the input image. The image generator 660 generates the high quality image where the area having not been identified as the characteristic area by the first characteristic area identifier 610 is changed into a quality according to possibility of being identified as the characteristic area, from the input image. The image generator 660 may generated the high quality image with the quality according to the possibility of being identified as the characteristic area.

The area estimating section 630 estimates an area to be identified as the characteristic area in the taken image. For instance, when the characteristic area identifier 226 is to identify a moving object area in the moving image as the characteristic area, the area estimating section 630 estimates the area where the moving object exists in the moving image. For instance, the area estimating section 630 estimates the position where the moving object exists, on the basis of the positions of the moving object extracted from any one or more taken images, which are elements constituting the moving image, included in the same moving image, and the timing when the other taken image has been taken. The area estimating section 630 may estimate a prescribed size of area including the estimated position as the area where the moving object exists in the moving image.

In this case, the first characteristic area identifier 610 identifies the moving object areas as the characteristic area from the areas in the taken image estimated by the area estimating section 630. The image generator 660 may then generate the high quality image where the areas having not been identified as the moving object area by the first characteristic area identifier 610 have been made into higher image quality among the areas estimated by the area estimating section 630.

This increases possibility of extracting the moving object by re-searching when the moving object has not been detected among areas with possibility that the moving object exists. Thus, the possibility of failure to detect the characteristic area in the characteristic area identifier 226 can be decreased.

The partial area determiner 622 determines whether one or more partial area of image existing at a predetermined position in a specific image area satisfy a predetermined condition or not. The characteristic area determiner 624 determines whether a specific image area is the characteristic area or not on the basis of the result determined by the partial area determiner 622. For instance, in the case where a determination is made of whether the specific image area is the characteristic area or not, the partial area determiner 622 determines whether each of different partial areas in the specific image area satisfies the predetermined condition or not. The characteristic area determiner 624 determines that the specific image area is the characteristic area when the number of partial areas on which negative determination results have been acquired is less than a predetermined number.

In a case where a determination of whether the specific image area is the characteristic area or not is performed and the second characteristic area identifier 620 determines one or more partial areas existing at the predetermined position in the specific image area, the image generator 660, when generating the high quality image where the specific image area is made into high image quality, may make the one or more partial areas into high image quality. This can make only the area effective for the characteristic area detection process into high image quality, thereby allowing the amount of processing for re-detecting the characteristic area to be reduced.

The high quality processing area determiner 640 determines the area to be made into high image quality by the image generator 660. More specifically, the lower the possibility that the area is determined as the characteristic area, the wider the area to be made by the image generator 660 into high image quality that the high quality processing area determiner 640 determines. The image generator 660 generates the high quality image where the area determined by the high quality processing area determiner 640 has been made into higher quality. This enables the possibility of extracting the moving object by re-searching to be improved, thereby allowing the possibility of failure of detecting the characteristic area in characteristic area identifier 226 to be reduced.

The parameter storage 650 stores the image processing parameter used for the sake of making the image into high image quality, in relation to the amount of characteristics extracted from the image. The image generator 660 generates the high quality image where the object area to be made into high image quality has been made into high image quality, in relation to the amount of characteristics matching with the amount of characteristics extracted from the object area to be made into high image quality, using the image processing parameter stored in the parameter storage 650. The parameter storage 650 may store the image processing parameter calculated according to the learning using a plurality of images where the amount of characteristics similar to each other is extracted as teacher images, in relation to the amounts of characteristics representing the similar amounts of characteristics.

The image processing parameter may be image data including a spatial frequency component in a higher frequency region, which should be added to image data to be made into high image quality. Further, the image processing parameter may be exemplified by a vector, matrix, tensor, n-th-dimensional mixed normal distribution, n-th-dimensional mixed multinomial distribution and the like for converting data representing a high quality image into input data, when pixel value data of a plurality pixels or data of the plurality amounts of characteristics are used as input data. Here, it is provided that n is an integer not less than one. The image processing parameter will be described later in relation to operation of the image processing apparatus 250.

The outside information acquiring section 228 shown in FIG. 13 acquires at least one of the image processing parameter stored in the parameter storage 650 (shown in FIG. 15) and the amount of characteristics, from the outside. The parameter storage 650 stores at least one of the image processing parameter and the amount of characteristics acquired by the outside information acquiring section 228.

Figure 16:
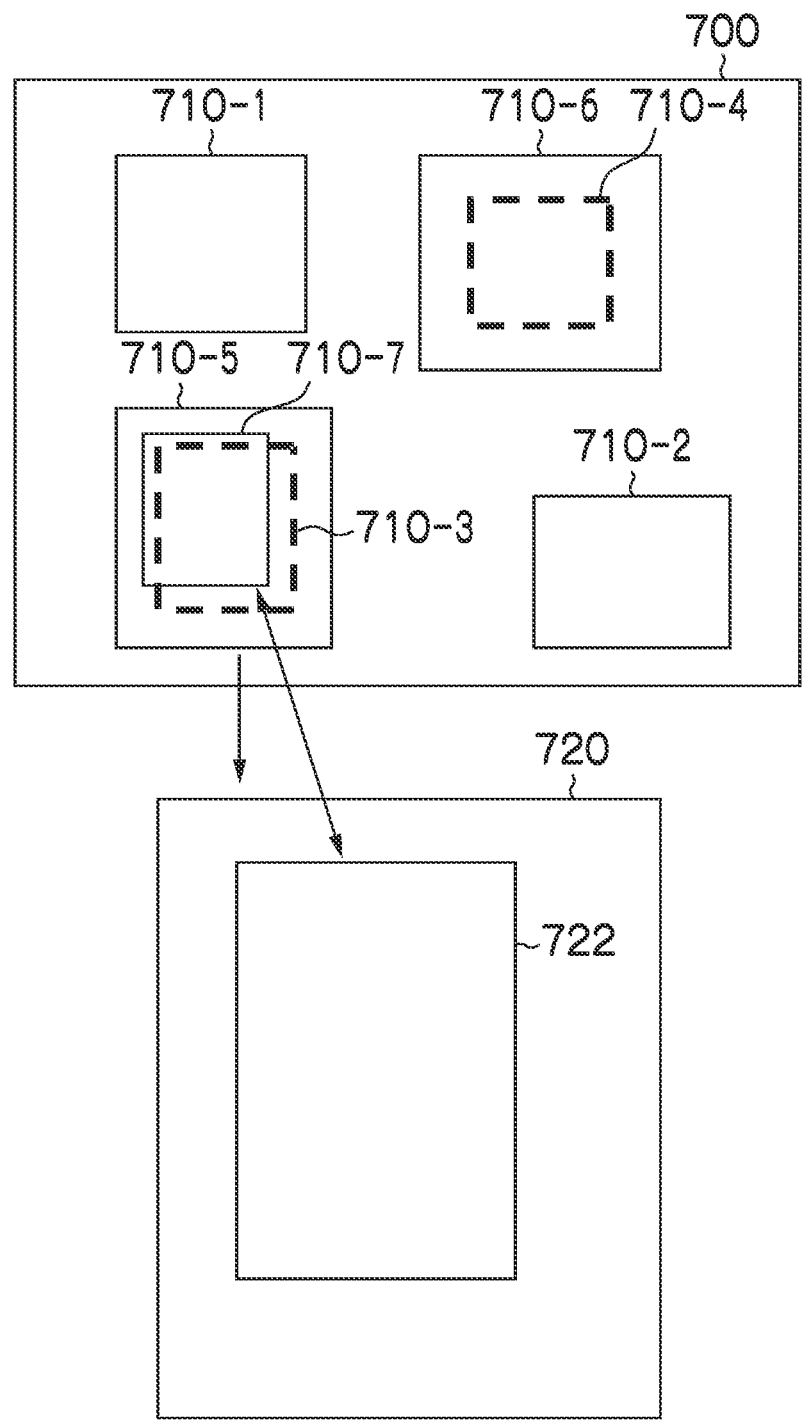
FIG. 16 illustrates an example of a process of identifying the characteristic area in the image.

FIG. 16 shows an example of an identification processing on the characteristic area in the characteristic area identifier 226. Here, a processing of identifying the characteristic area in a taken image 700 is described.

The first characteristic area identifier 610 (see FIG. 15) calculates degrees of matching with the prescribed condition with respect to a plurality of image areas of the taken image 700 as shown in FIG. 16. The first characteristic area identifier 610 then identifies areas 710-1 and 710-2 whose degrees of matching with the prescribed condition in the taken image is larger than a first threshold as the characteristic areas.

The high quality processing area determiner 640 (see FIG. 15) selects areas 710-3 and 710-4 (see FIG. 16), whose degrees of matching with the predetermined condition in the taken image are greater than a second threshold less than or equal to the first threshold. The high quality processing area determiner 640 then determines an area 710-5, which includes the area 710-3 and has a size according to the degree of matching of the area 710-3 with respect to the condition as an object area to be made into high image quality by the image generator 660. The high quality processing area determiner 640 further determines an area 710-6, which includes the area 710-4 and has a size according to the degree of matching of the area 710-4 with respect to the condition as an object area to be made into high image quality by the image generator 660.

In the example in FIG. 16, a smaller degree of matching is calculated for the area 710-4 than the area 710-3. Accordingly, the high quality processing area determiner 640 determines the area 710-6, which has been enlarged by a larger enlarging factor from the area 710-4, as the object area to be made into high image quality by the image generator 660 (FIG. 15). The high quality processing area determiner 640 thus determines the area having been acquired by enlarging the area whose degree of matching is greater than the predetermined second threshold by the enlarging factor according to the degree of matching, as the object area to be made into high image quality by the image generator 660.

The second characteristic area identifier 620 (see FIG. 15) searches the characteristic area from images in the high-quality-processed areas 710-5 and 710-6 having been made into high image quality (see FIG. 16). The second characteristic area identifier 620 may search the area satisfying the condition from images in the high-quality-processed areas 710-5 and 710-6 according to the similar process to that of the first characteristic area identifier 610. Here, it is provided that the second characteristic area identifier 620 determines that an area 722 satisfies the condition in an image 720 in the high-quality-processed area 710-5. In this case the characteristic area identifier 226 identifies an area 710-7 corresponding to the area 722 in the image 720 as the characteristic area, in addition to the areas 710-1 and 710-2 identified by the first characteristic area identifier 610.

The image generator 660 (see FIG. 15) generates a high-quality-processed image where an area with higher degree of matching with the prescribed condition has been made into higher quality, from the taken image, among the areas having not identified as the characteristic areas by the first characteristic area identifier 610. More specifically, the image generator 660 generates the high quality image where the area with a higher degree of matching with the predetermined condition than a second threshold has been made into higher quality from among the areas having not identified as the characteristic areas by the first characteristic area identifier 610. This can improve possibility that the characteristic area is extracted from the areas with high possibility of being the characteristic areas, thereby allowing the possibility of failure to detect the characteristic area to be reduced.

As described above, areas other than the area identified as the characteristic area by the first characteristic area identifier 610 and the area to be made into high image quality are determined as non-characteristic areas, which are not the characteristic areas. The value of the first threshold may be set to be greater than a predetermined value so as to identify the possibility that the area other than the characteristic area is identified as the characteristic area, on the basis of the identification result of the characteristic area by the first and second characteristic area identifiers 610 and 620, a preliminary test result or a test result after the fact. This can reduce the possibility that the non-characteristic area is included in the area identified as the characteristic area by the first characteristic area identifier 610. A degree of matching close to the first threshold can be calculated also for the non-characteristic area. However, setting of the first threshold as described above can reduce the possibility that such an area is mistakenly detected as the characteristic area.

The value of the second threshold may be set such that the degree of matching calculated from the characteristic area is greater than or equal to the second threshold, on the basis of the identification result of the characteristic area by the first and second characteristic area identifiers 610 and 620, a preliminary test result or a test result after the fact. This can reduce the possibility that the characteristic area is included in the areas where the degree of matching less than or equal to the second threshold has been calculated. The degree of matching close to the second threshold can be calculated for the characteristic area. Setting of the second threshold as described above can reduce the possibility of regarding such an area as the non-characteristic area.

On the other hand, there is a possibility that the characteristic area is included in the area where the degree of matching greater than the second threshold and less than or equal to the first threshold is calculated because of setting of the first and second thresholds. In the characteristic area identifier 226, the second characteristic area identifier 620 searches the characteristic area after the high quality processing with respect to such an area. Accordingly, the characteristic area and the non-characteristic area can appropriately be separated, which thereby reduce both the possibility of failure to detect the characteristic area and the possibility of mistakenly detecting the non-characteristic area as the characteristic area. Thus, the characteristic area identifier 226 can provide a characteristic detector having high sensitivity and specificity.

The image generator 660 may generate a high quality image where at least a part of an image area of the input image has been made into high image quality of a high quality processing precision appropriate for the mentioned conditions, in addition to determine whether performing the high quality processing or not in consideration of the relationship between the degree of matching and the thresholds as described above. In this case, the high quality processing precision may be specified by a continuous function or a discontinuous function as appropriate.

Figure 17:
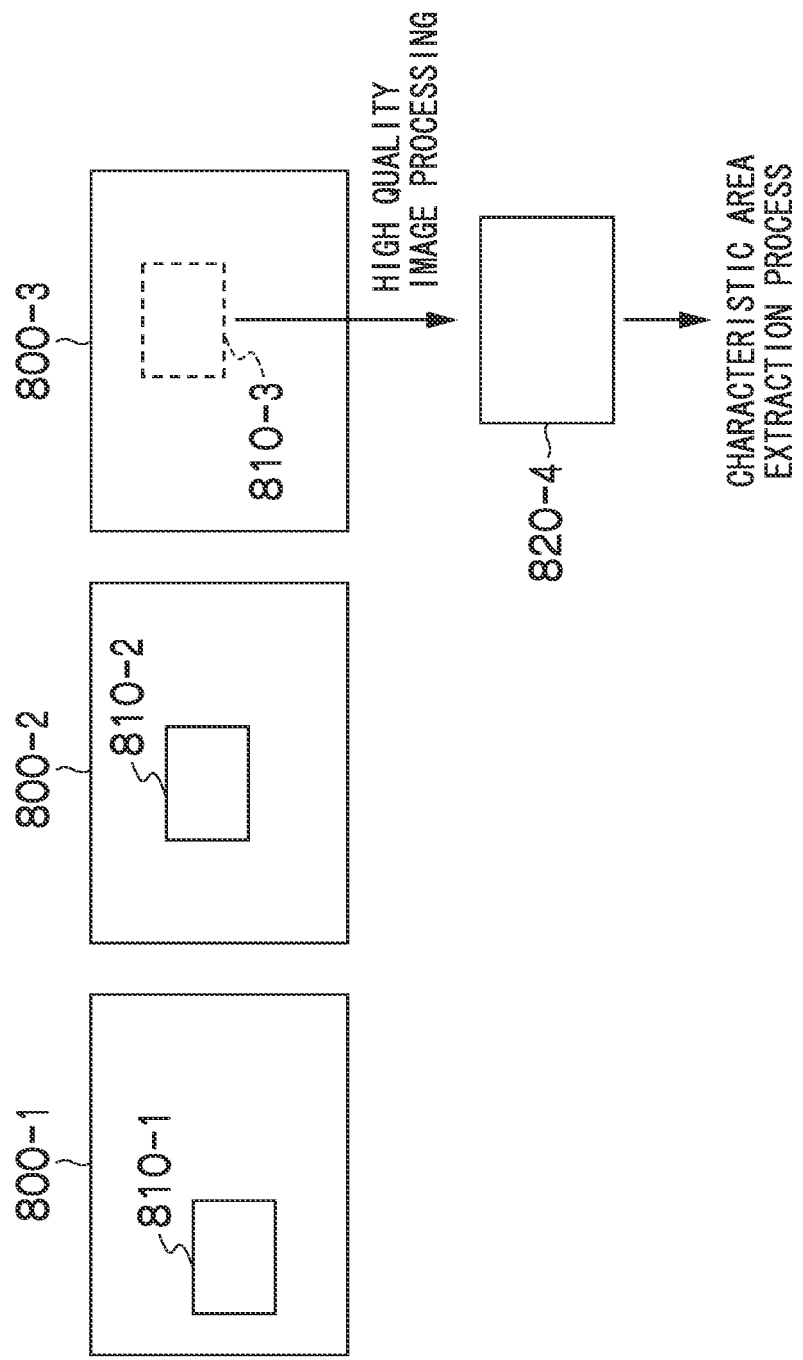
FIG. 17 illustrates another example of a process of identifying the characteristic area in the image.

FIG. 17 shows another example of the identification processing on the characteristic area in the characteristic area identifier 226. Here, an example of a process in the characteristic area identifier 226 when identifying the moving object area from the moving image as the characteristic areas is particularly shown.

It is provided that areas 810-1 and 810-2 are identified by the first and second characteristic area identifiers 610 and 620 (see FIG. 15) as the characteristic areas in taken images 800-1 and 800-2, respectively, as shown in FIG. 17. Here, it is provided that objects imaged from the same subject exist in the areas 810-1 and 810-2.

In this case, the area estimating section 630 (see FIG. 15) determines an area 810-3 where the object of the same subject should exist in a taken image 800-3 (FIG. 17), on the basis of the positions of the areas 810-1 and 810-2 in the respective images, the timings when the taken images 800-1 and 800-2 have been taken, and the timings when the image 800-3 has been taken. For instance, the area estimating section 630 calculates the velocity of the moving object in the image area from the positions of the areas 810-1 and 810-2 in the respective images and the timings when the taken images 800-1 and 800-2 have been taken, and determines the area 810-3 where the object of the same subject should exist on the basis of the calculated velocity, the position of the area 810-2 and the time interval between the timing when the taken image 800-2 has been taken and the timing when the taken image 800-3 has been taken.

The first characteristic area identifier 610 (see FIG. 15) searches the moving object in the area 810-3 (FIG. 17). When the first characteristic area identifier 610 has not detected the moving object in the area 810-3, the image generator 660 generates a high quality image 820-4 (FIG. 17) where the area 810-3 has been made into high image quality. The second characteristic area identifier 620 searches the moving object in the high quality image 820-4. This can improves the possibility of extracting the moving object in the area with high possibility of detecting the moving object, and can thereby decrease the possibility of failure to detect the moving image.

The image generator 660 (see FIG. 15) may generate the high quality image 820-4 where a center part of the area 810-3 has further been made into higher quality. This can reduce the degree of high quality processing for the area with low possibility of existence of the moving object. This can reduce the amount of processing required for the high quality processing compound to the case of strong, uniform high quality processing of the entire image.

Figure 18:
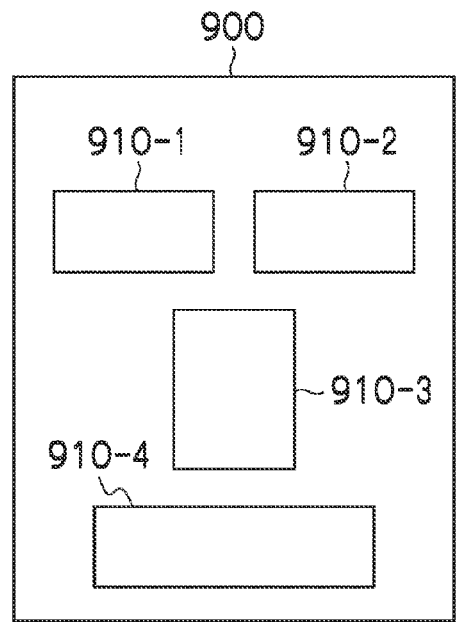
FIG. 18 illustrates an example of a process determining the characteristic area by a second characteristic area identifier 620 in FIG. 15.

FIG. 18 shows an example of determination processing of the characteristic area by the second characteristic area identifier 620 illustrated in FIG. 15. The second characteristic area identifier 620 extract the amount of characteristics from the partial area 910-1 to 910-4 having prescribed positional relationships with respect to each other in the image area 900 when determining whether the specific image area 900 is the characteristic area or not. Here, the second characteristic area identifier 620 extracts a prescribed type of amounts of characteristics from the partial areas 910 according to the respective position of the partial area 910 in the image area 900.

The second characteristic area identifier 620 calculates the degree of matching extracted from the image of the partial area 910 according to a predetermined condition for each partial area 910. The second characteristic area identifier 620 determines whether the image area 900 is the characteristic area or not on the basis of the degree of matching calculated for each partial area 910. The second characteristic area identifier 620 may determine that the image area 900 is the characteristic area when the weighted sum of the degrees of matching is greater than a predetermined value. The second characteristic area identifier 620 may determine that the image area 900 is the characteristic area when the number of partial areas 910 where the degrees of matching greater than a predetermined value is calculated is greater than a predetermined value.

The processes from the extraction of the amount of characteristics to the calculation of the degree of matching can be implemented using an image filter. The processes can be implemented as a weak identifier. The position of the partial area 910 may be specified according to the type of the object to be extracted as the characteristic area. For instance, when an area including an object of a human face is to be detected as the characteristic area, the partial area 910 may be specified at a position where the determination capability is higher than a predetermined value for the object of the human face. The highness of the determination capability may mean that the probability that the determination result for the object of the human face is true is high, and the probability that the determination result for the object other than the human face is false is high.

Here, the image generator 660 (see FIG. 15) does not make areas other than the partial area 910 into high image quality. However the image generator only makes the partial area 910 into high image quality. As described above, the second characteristic area identifier 620 extracts the characteristic area from the high-quality-processed image, and determines whether the image area 900 is the characteristic area or not. This can improve the probability of detecting the characteristic area while limiting the image area to be made into high image quality, thereby can detect the characteristic area at high speed and high probability. In the above description, the process of determining the characteristic area in the second characteristic area identifier 620 has been described. However, it may be determined whether it is the characteristic area or not according to the same process also for the first characteristic area identifier 610.

The processes in the first and second characteristic area identifiers 610 and 620 can be implemented using a plurality of weak identifiers. A description will hereinafter be made with an example of a case of implementation using the total number N of weak identifiers. In the first characteristic area identifier 610, it is determined whether an area is the characteristic area or not using Nf of weak identifiers. The degree of matching is calculated on the basis of the determination result. The area whose degree of matching is greater than the first threshold is determined as the characteristic area, as described above. The area whose degree of matching is less than or equal to the second threshold is determined as the non-characteristic area.

The area whose degree of matching is less than or equal to the first threshold and greater than the second threshold is made into high image quality by the image generator 660. In the second characteristic area identifier 620, it is determined whether the high-quality-processed image is the characteristic area or not using the Nf of weak identifiers used by the first characteristic area identifier 610 and Nb of weak identifiers other than the Nf of weak identifiers. For instance, it may be determined whether the areas are characteristic areas or not on the basis of the degrees of matching calculated by the respective Nf+Nb of weak identifiers.

A plurality of areas specified according to a result of comparison between a third threshold, which is smaller than the first threshold and larger than the second threshold, and the degree of matching may be identified according to different processes among areas having not been identified as the characteristic areas by the first characteristic area identifier 610. For instance, areas where degrees of matching greater than the third threshold are calculated are not made into high image quality by the image generator 660. Instead, it may be determined whether the areas are the characteristic areas or not by the Nf+Nb of weak identifiers in the second characteristic area identifier 620. On the other hand, areas where degrees of matching smaller than or equivalent to the third threshold are calculated may be made into high image quality by the image generator 660. It may be identified whether the areas are the characteristic areas or not by the Nf+Nb of weak identifiers in the second characteristic area identifier 620.

The number Nb of the weak identifiers used for the processes in the second characteristic area identifier 620 may be adjusted according to the degrees of matching. For instance, the smaller the degree of matching is, the greater number of weak identifiers used for determining whether the areas are the characteristic areas or not in the second characteristic area identifier 620.

As described above, the lower the degree of matching is, the more detailedly the second characteristic area identifier 620 searches the characteristic area from the image-modified image. Configurations according to the AdaBoost may be exemplified as the configurations of the weak identifiers of at least one of the first and second characteristic area identifiers 610 and 620.

The first and second characteristic area identifiers 610 and 620 may detect the characteristic areas from the low quality image group configured by multi-resolution processing representation. In this case, the image generator 660 may generate the low resolution image group by performing precise multi-resolution processing in the first characteristic area identifier 610. A reduction process according to the bi-cubic convolution can be exemplified as the multi-resolution processing in the first characteristic area identifier 610.

A preliminary learning reduction process may be exemplified as the multi-resolution processing in the second characteristic area identifier 620. The second characteristic area identifier 620 may generate the low resolution image group from the input image using an image processing parameter acquired by learning using an actual size image and a target resolution image. A target resolution image with smaller turning noise is preferably used for learning. For instance, an image taken by different imaging apparatuses including the different number of imaging elements can be used for learning.

The image processing method using the tensor projection according to the present invention can be applied as the high quality processing described in relation to FIGS. 15 to 18. More specifically, the image generator 660 may use the image processing technique for high quality processing according to the present invention exemplified in FIGS. 1 to 12, when generating the high quality image where the area with higher possibility of being identified as the characteristic area is made into high image quality.

The high quality processing is not limited to the process for making an area into high resolution. Instead, a multi-gradation processing for increasing the number of gradations and multi-color processing for increasing the number of colors can be exemplified as the high quality processing. The image processing method using tensor projection according to the present invention can be applied to these processes.

When the taken image to be an object of the high quality processing is a moving image component image (a frame image or a field image), the image may be made into high image quality using the pixel values of another taken image, in the high quality processing, such as high resolution processing, multicolor processing, multi-gradation, noise reduction, reduction in artifact including block noise and mosquito noise, reduction in burring, sharpening, high frame rate processing. For instance, the high quality processing is performed using a difference between imaging positions of a moving object because of a difference in imaging timing. That is, the image generator 660 may generate the high quality image using the taken image, which is a moving image component image included in a moving image and another moving image component image included in the moving image.

Processes described in Japanese Patent Application Laid-Open No. 2008-167949, Japanese Patent Application Laid-Open No. 2008-167950, Japanese Patent Application Laid-Open No. 2008-167948 and Japanese Patent Application Laid-Open No. 2008-229161 can be exemplified as the noise reduction processes, as well as the process using a plurality of moving image component images. For instance, the image generator 660 can reduce noise using the preliminary learning result using images with a more amount of noise and images with less amount of noise. Images taken in a small amount of light is used for the preliminary learning as described in Japanese Patent Application Laid-Open No. 2008-167949; when decreasing the amount of noise in an image taken in visible light as in this embodiment, images taken in less amount of ambient light can be used for preliminary learning instead. As to the sharpening process, a process using a larger size of filter and a process of sharpening in more directions can be exemplified as a more precise sharpening process.

Example of Configuration of Compressor 232

Figure 19:
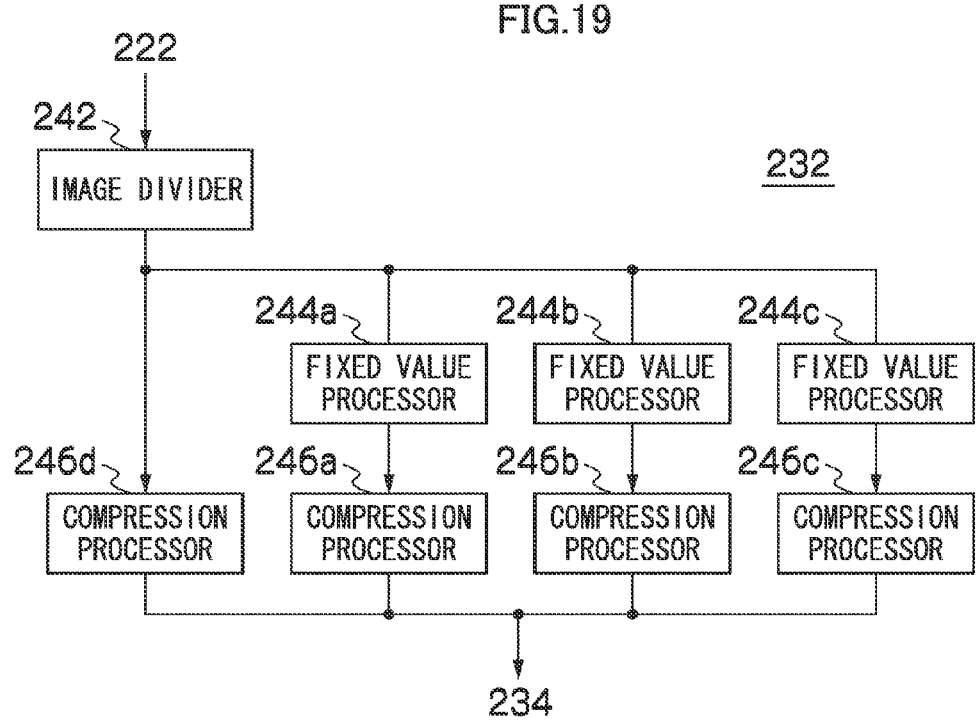
FIG. 19 is a block diagram showing an example of a configuration of a compressor 232 in FIG. 14.

FIG. 19 shows an example of a block diagram of the compressor 232 illustrated in FIG. 14. The compressor 232 includes an image divider 242, a plurality of fixed value processors 244a to 244c (hereinafter, sometimes collectively referred to as a fixed value processor 244), and a plurality of compression processors 246a to 246c (hereinafter, sometimes collectively referred to as a compression processor 246).

The image divider 242 acquires a plurality of taken images from the image acquiring section 222. The image divider 242 divides the plurality of taken images into the characteristic areas and background area other than the characteristic area. More specifically, the image divider 242 divides the plurality of taken images into the plurality of the characteristic areas and the background area other than the characteristic area. The compression processor 246 compresses a characteristic area image, or an image in the characteristic area, and a background area image, or an image in the background area, in different degrees of compression. More specifically, the compression processor 246 compresses the characteristic area moving image including the plurality of characteristic area images and the back ground area moving image including the plurality of background images in the different degrees of compression.

Further specifically, the image divider 242 generates the characteristic area moving images according to the respective types of characteristics by dividing the plurality of taken images. As to each of characteristic area images of the plurality of characteristic area moving images generated for the respective types of characteristics, the fixed value processor 244 makes pixel values in areas other than the types of characteristics areas fixed.

More specifically, the fixed value processor 244 makes the pixel values in the areas other than the characteristic areas be a predetermined pixel value. The compression processors 246a to 246c compresses the plurality of characteristic area moving images according to a coding format such as the MPEG with respect to the types of characteristics.

The fixed value processors 244a to 244c fixed-value-processes a first, second and third types of characteristic area moving images, respectively. The compression processors 246a to 246c compress the first, second and third types of characteristic area moving images, which have been fixed-value-processed by the fixed value processors 244a to 244c, respectively.

The compression processors 246a to 246c compress the characteristic area moving images in degrees of compression predetermined according to the types of the characteristics. For instance, the compression processor 246 may convert the characteristic area moving images into moving images with predetermined different resolutions according to the characteristic types of the characteristic area, and compress the converted characteristic area moving images. In addition to that, the compression processor 246 may compress the characteristic area moving images using different quantized parameters predetermined according to the characteristic types, when compressing the characteristic area moving images according to the MPEG coding.

The compression processor 246d compresses the background area moving image. The compression processor 246d may compress the background moving image in degree of compression higher than any one of degrees of compression by the compression processors 246a to 246c. The characteristic area moving images and the background moving images compressed by the compression processors 246 are provided for the association processor 234 (see FIG. 14).

As described in FIG. 19, the areas other than the characteristic areas are fixed-value-processed by the fixed value processors 244. Accordingly, when the compression processor 246 performs predictive coding according to the MPEG coding and the like, the amount of difference with the predictive image can significantly be reduced in areas other than the characteristic areas. This allows the compressor 232 to compress the characteristic area moving image in higher degree of compression.

According to the configuration in FIG. 19, the plurality of compression processors 246 included in the compressor 232 compress the plurality of characteristic area images and the background image. However, in another mode, the compressor 232 may include a single compression processor 246, which may compress the plurality of characteristic area images and the background image in different degrees of compression. For instance, a plurality of characteristic area images and background images may sequentially be provided for the single compression processor 246 in a time division manner; the single compression processor 246 may sequentially compress the plurality of characteristic area images and the background image in different degrees of compression.

Instead, the single compression processor 246 may quantize image information of the plurality of characteristic areas and image information of the background information using different quantization coefficients, thereby compressing the plurality of characteristic area images and the background image in different degrees of compression. Further, images where the plurality of characteristic area images and the background image are converted into different qualities may be provided for the single compression processor 246, which may compress the plurality of characteristic area images and the background image. In a mode where the single compression processor 246 quantizes areas using different quantization coefficients according to the respective areas, or a mode where the single compression processor 246 compresses the images converted into different qualities according to the respective areas, as described above, the single compression processor 246 may compresses the entire image, and may compress the image divided by the image divider 242, as illustrated in this figure. When the single compression processor 246 compresses the entire image, it is not required to perform the division process by the image divider 242 and the fixed-value-processing by the fixed value processor 244. Accordingly, the compressor 232 is not required to include the image divider 242 and the fixed value processor 244.

Example 2 of Configuration of Compressor 232

Figure 20:
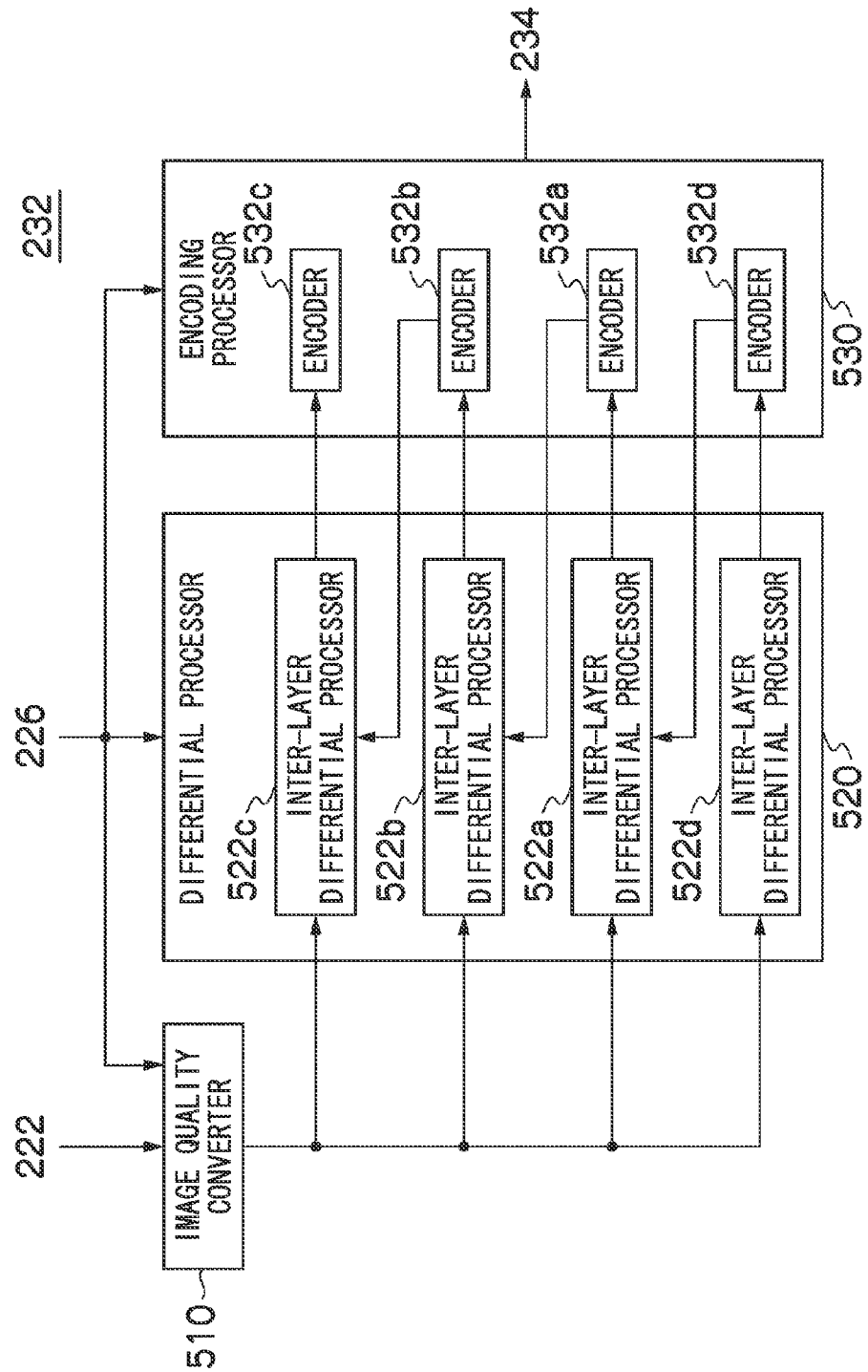
FIG. 20 is a block diagram showing another example of the configuration of the compressor 232.

FIG. 20 shows another example of a block diagram of the compressor 232 illustrated in FIG. 14. The compressor 232 according to this configuration compresses the plurality of taken images using a spatially scalable coding process according to the characteristic types.

The compressor 232 shown in FIG. 20 includes an image quality converter 510, a differential processor 520 and an encoding processor 530. The differential processor 520 includes a plurality of inter-layer differential processors 522a to 522d (hereinafter, collectively referred to as the inter-layer differential processor 522). The encoding processor 530 includes a plurality of encoders 532a to 532d (hereinafter referred to as the encoder 532).

The image quality converter 510 acquires a plurality of taken images from the image acquiring section 222. The image quality converter 510 also acquires the information identifying the characteristic area and the information identifying the characteristic type of the characteristic area detected by the characteristic area identifier 226. The image quality converter 510 generates the taken images whose number is the number of the characteristic types of the characteristic areas by copying the taken image. The image quality converter 510 converts the generated taken images into resolution qualities according to the characteristic types.

For instance, the image quality converter 510 generates the taken image converted into a resolution according to the background area (hereinafter referred to as a low resolution image), the taken image converted into a first resolution according to a first characteristic type (hereinafter referred to as a first resolution image), the taken image converted into a second resolution according to a second characteristic type (hereinafter referred to as a second resolution image), and the taken image converted into a third resolution according to a third characteristic type (hereinafter referred to as a third resolution image). Here, it is provided that the resolution of the first resolution image is higher than that of the low resolution image, the resolution of the second resolution image is higher than that of the first resolution image, and the resolution of the third resolution image is higher than that of the second resolution image.

The image quality converter 510 then provides the low resolution image, first resolution image, second resolution image and third resolution image for the inter-layer differential processors 522d, 522a, 522b and 522c, respectively. The image quality converter 510 provides the moving images for the inter-layer differential processors 522 by performing the image resolution converting on the plurality of taken images.

The image quality converter 510 may convert the frame rates of the moving images to be provided for the inter-layer differential processors 522 according to the characteristic types of the characteristic areas. For instance, the image quality converter 510 may provide the inter-layer differential processor 522d with the moving image with lower frame rate than that to be provided for the inter-layer differential processor 522a. The image quality converter 510 may provide the inter-layer differential processor 522a with the moving image with lower frame rate than that to be provided for the inter-layer differential processor 522b. The image quality converter 510 may provide the inter-layer differential processor 522b with the moving image with lower frame rate than that to be provided for the inter-layer differential processor 522c. The image quality converter 510 may convert the frame rates of the moving image to be provided for the inter-layer differential processors 522 by thinning out the taken images according to the characteristic types of the characteristic areas.

The inter-layer differential processor 522d and the encoder 532d predictively code the background area moving image including the plurality of low resolution images. More specifically, the inter-layer differential processor 522 generates a differential image between the low resolution image and a predictive image generated from another low resolution image. The encoder 532d quantizes a converting coefficient acquired by converting the differential image into spatial frequency components, and encoding the quantized converting coefficient by the entropy coding or the like. Such a predictive coding may be performed on each partial area in the low resolution image.

The inter-layer differential processor 522a predictively codes the first characteristic area moving image including the plurality of first resolution images provided by the image quality converter 510. Likewise, the inter-layer differential processors 522b and 522c predictively code the second and third characteristic area moving images including the pluralities of second and third resolution images, respectively. Specific operations of the inter-layer differential processors 522a and the encoder 532a will hereinafter be described.

The inter-layer differential processor 522a decodes the first resolution image having encoded by the encoder 532d, and enlarges the decoded image to an image with the same resolution as the first resolution. The inter-layer differential processor 522a then generates a differential image between the enlarged image and the low resolution image. Here, the inter-layer differential processor 522a makes the differential value in the background area 0. The encoder 532a encodes the differential image, as with the encoder 532d. The encoding processes by the inter-layer differential processor 522a and the encoder 532A may be applied on each partial area in the first resolution image.

In a case where the inter-layer differential processor 522a encodes the first resolution image, the processor compares the amount of codes predicted when encoding the differential image concerning the low resolution image and the amount of codes predicted when encoding the differential image concerning the predictive image generated from the another first resolution image with each other. When the amount of codes of the latter is small, the inter-layer differential processor 522a generates the differential image with the predictive image generated from another first resolution image. When it is predicted that the amount of codes will be smaller in a case of encoding without taking the difference concerning the low resolution image or the predicted image, the inter-layer differential processor 522a is not required to take the difference concerning to the low resolution image or the predictive image.

The inter-layer differential processor 522a is not required to make the differential value in the background area 0. In this case, the encoder 532a may make data about differential information in areas other than the characteristic areas after encoding 0. For instance, the encoder 532a may make the converting coefficient after conversion into the frequency components 0. Motion vector information when the inter-layer differential processor 522d performs the predictive coding is provided for the inter-layer differential processor 522a. The inter-layer differential processor 522a may calculate the motion vector for the predictive image using the motion vector information provided by the inter-layer differential processor 522d.

Operations of the inter-layer differential processor 522b and the encoder 532b are substantially identical to those of the inter-layer differential processor 522a and the encoder 532a except for encoding the second resolution image and of sometimes taking the difference concerning the first resolution image having been encoded by the encoder 532a when encoding the second resolution image; the description thereof will be omitted. Likewise, operations of the inter-layer differential processor 522c and the encoder 532c are substantially identical to those of the inter-layer differential processor 522a and the encoder 532a except for encoding the third resolution image and of sometimes taking the difference concerning the second resolution image having been encoded by the encoder 532b when encoding the third resolution image; the description thereof will be omitted.

As described above, the image quality converter 510 generates the low quality characteristic area image, whose image quality is low, and the high quality characteristic area image, whose image resolution is higher than that of the low quality image at least in the characteristic areas, from the plurality of taken images. The differential processor 520 generates the image in the characteristic area in the characteristic area image, and the characteristic area differential image indicating the differential image concerning the characteristic area image in the low quality image. The encoding processor 530 encodes the characteristic area differential image and the low quality image.

The image quality converter 510 generates the low quality image where the plurality of taken images having been reduced in resolution. The differential processor 520 generates the characteristic area differential image between the image in the characteristic area in the characteristic area image and the image where the image in the characteristic area in the low quality image has been enlarged. The differential processor 520 also generates the characteristic area differential image having the spatial frequency components, into which the difference between the characteristic area image and the enlarged image in the characteristic area has been converted into the spatial frequency area, where the amount of data of the spatial frequency components in areas other than the characteristic areas is reduced.

As described above, the compressor 232 hierarchically performs encoding by encoding the difference of the images between the plurality of layers with different resolutions. It is clear also from this that the compression system by the compressor 232 of this configuration includes the compression system according to the H.264/SVC. When the image processing apparatus 250 decompresses the thus hierarchically compressed moving image, the taken image with the original resolution can be generated by decoding the moving image data in each layer, and by adding the taken image decoded in the layer where the difference has been taken, for areas having been inter-layer-differentially encoded.

[Description of Image Processing Apparatus 250]

Figure 21:
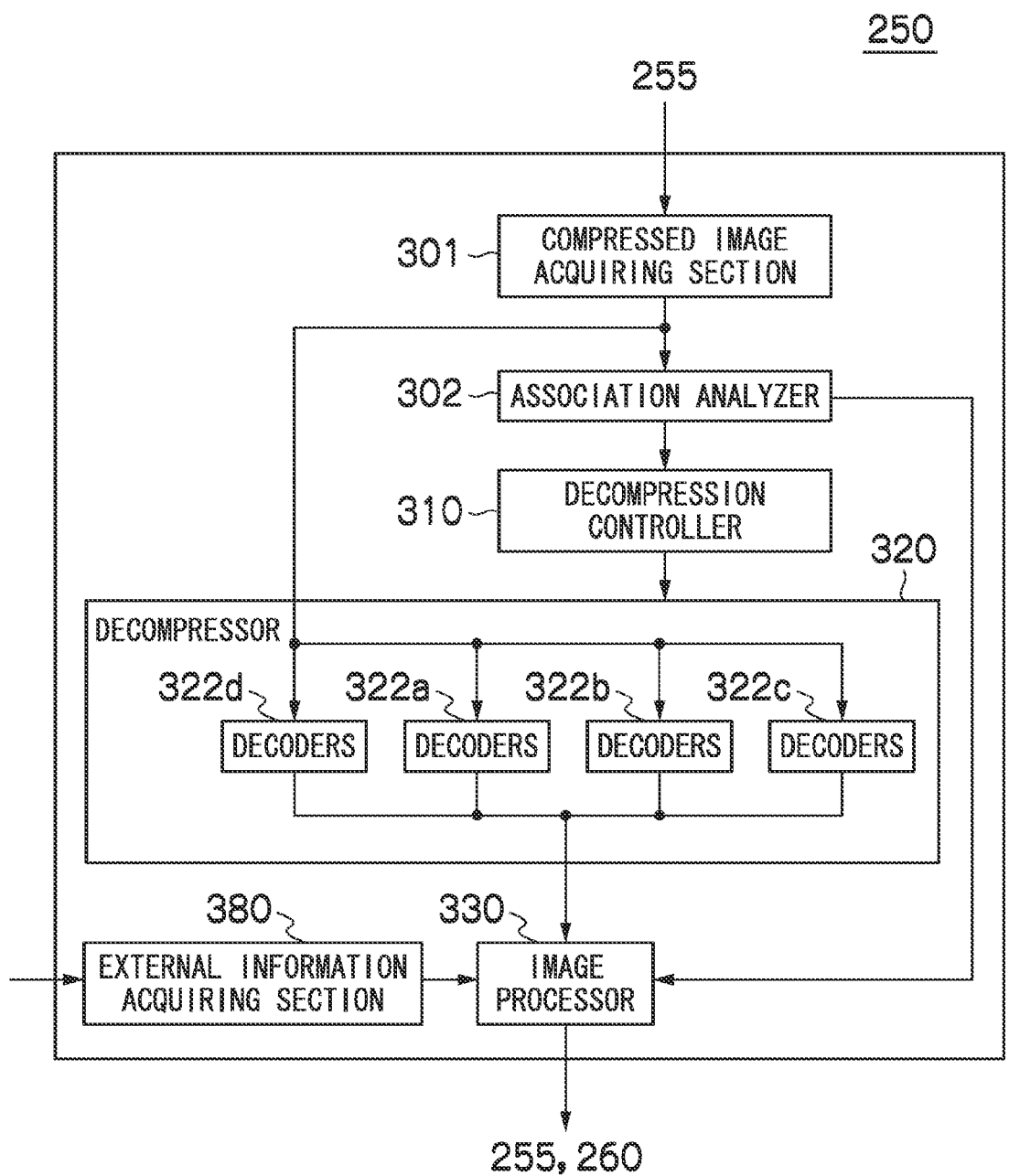
FIG. 21 is a block diagram showing an example of a configuration of an image processing apparatus 250 in FIG. 13.

FIG. 21 shows an example of a block configuration of the image processing apparatus 250 shown in FIG. 13. As shown in FIG. 21, the image processing apparatus 250 includes a compressed image acquiring section 301, an association analyzer 302, a decompression controller 310, a decompressor 320, an external information acquiring section 380 and an image processor 330. The decompressor 320 includes a plurality of decoders 322a to 322a (hereinafter, collectively referred to as the decoder 322).

The compressed image acquiring section 301 acquires the compressed moving image compressed by the image processing apparatus 250. More specifically, the compressed image acquiring section 301 acquires the compressed image including the plurality of characteristic area moving images and back ground area moving images. Furthermore specifically, the compressed image acquiring section 301 acquires the compressed moving image to which characteristic area information is attached.

The association analyzer 302 separates the compressed moving image into the plurality of characteristic area moving images and the background area moving image, and provides the decompressor 320 with the plurality of characteristic area moving images and the background area moving image. The association analyzer 302 analyzes the characteristic area information, and provides the position and the type of the characteristic area for the decompression controller 310 and the image processor 330.

The decompression controller 310 controls a decompression process by the decompressor 320 according to the position of the characteristic area and the type of the characteristics acquired from the association analyzer 302. For instance, the decompression controller 310 causes the decompressor 320 to decompress each area of the moving image indicated by the compressed moving images according to the compression system using which the compressor 232 has compressed each area in the moving image according to the position of the characteristic area and the type of characteristics.

The decoder 322 decodes one of the coded character area moving images and the background area moving image. More specifically, the decoders 322a, 322b, 322c and 322d decodes the first, second and third characteristic area moving image and the background area image, respectively.

The image processor 330 synthesizes the plurality of characteristic area moving images and the background area moving image decompressed by the decompressor 320 into a single moving image. More specifically, the image processor 330 synthesizes the taken images included in the background area moving image and the characteristic area images in the taken images included in the plurality of characteristic area moving images into the single display moving image. The image processor 330 may also generate a display moving image where the characteristic area has been made a higher quality than the background area. The super-resolution image processing device using the tensor projection of the present invention can be utilized for the high quality transforming processes.

The image processor 330 outputs the characteristic area information and the display moving image acquired from the association analyzer 302 to the display apparatus 260 or the image DB 255 (see FIG. 13). The image DB 255 may records the positions of the characteristic areas, the types of the characteristics of the characteristic areas and the number of characteristic areas indicated by the characteristic area information in relation to information for identifying the taken image included in the display moving image in a nonvolatile recording medium such as a hard disc.

The external information acquiring section 380 acquires the data used for the image processing in the image processor 330 from the outside of the image processing apparatus 250. The image processor 330 performs the image processing using the data acquired by the external information acquiring section 380. The data acquired by the external information acquiring section 380 will be described in relation to FIG. 22.

Example of Configuration of Image Processor 330

Figure 22:
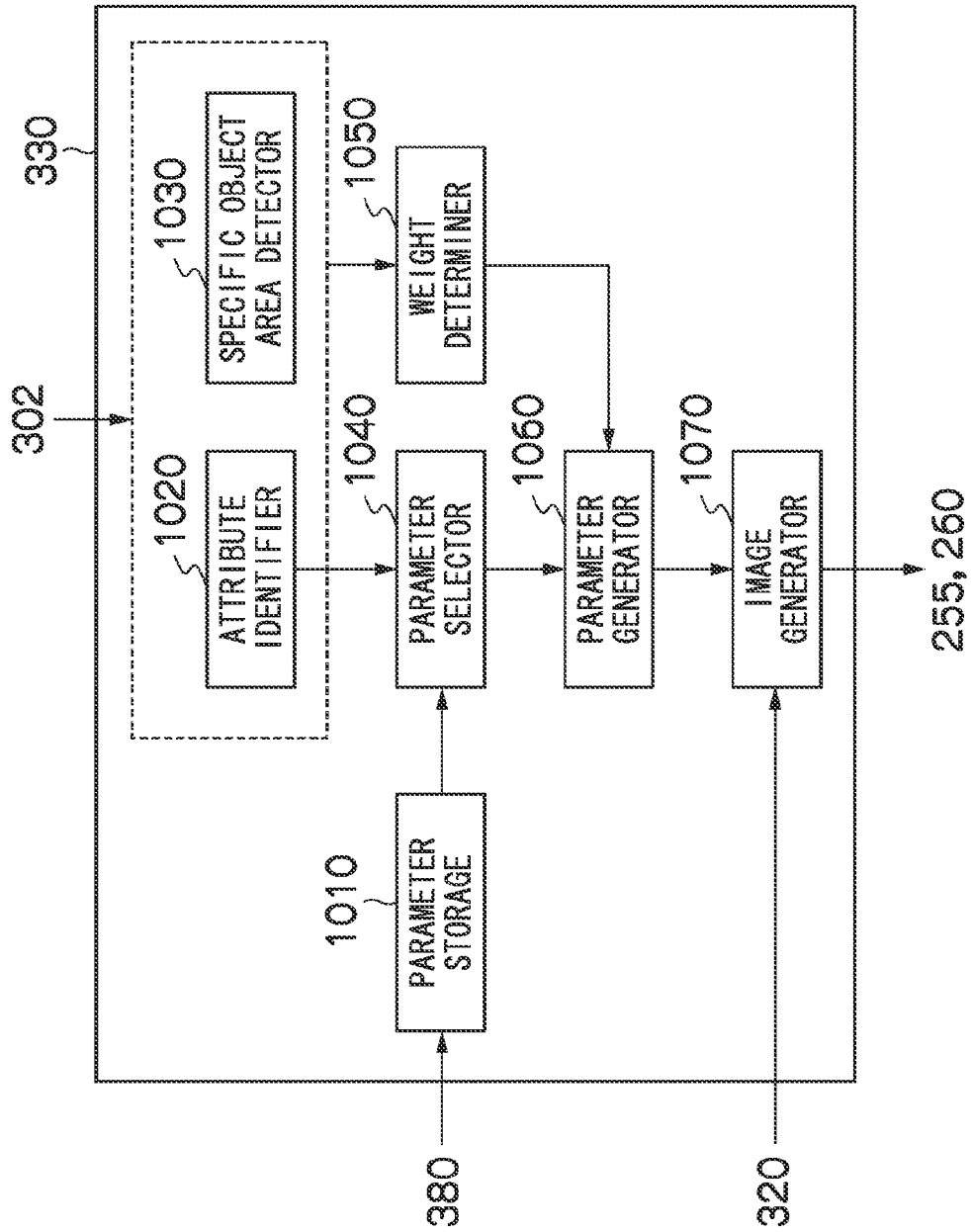
FIG. 22 is a block diagram showing an example of a configuration of an image processor 330 in FIG. 21.

FIG. 22 shows an example of a block configuration of the image processor 330 included in the image processing apparatus 250 illustrated in FIG. 21. As shown in FIG. 22, the image processor 330 includes a parameter storage 1010, an attribute identifier 1020, a specific object area detector 1030, a parameter selector 1040, a weight determiner 1050, a parameter generator 1060 and a image generator 1070.

The parameter storage 1010 stores a plurality of image processing parameters for making the subject images concerning the attributes into high image quality in relation to the plurality of respective attributes of the subject images. The attribute identifier 1020 identifies the attribute of the subject image included in the input image. Here, the input image may be the frame image acquired by the decompressor 320. The parameter selector 1040 selects the plurality of image processing parameters stored in the parameter storage 1010, giving precedence thereto, in relation to the respective attributes matching better with the attributes identified by the attribute identifier 1020. The image generator 1070 generates the high quality image where the subject image included in the input image has been made into high image quality also using the plurality of image processing parameters selected by the parameter selector 1040. The super-resolution image processing device using the tensor projection of the present invention can be utilized for the high quality transforming processes.

Here, a condition of the subject such as the orientation of the subject can be exemplified as the attributes. More specifically, the parameter storage 1010 stores the plurality of the image processing parameters in relation to the plurality of respective attributes indicating the conditions of the subject taken as the subject images. The attribute identifier 1020 identifies the condition of the subject taken as the subject image included in the input image from the subject image.

The orientation of the subject when the image has been taken can be exemplified as the condition of the subject. For instance, the orientation of the subject may be the orientation of the face of the subject. In this case, the parameter storage 1010 stores the plurality of image processing parameters in relation to the plurality of respective attributes indicating the orientations of the subject taken as the subject images. The attribute identifier 1020 identifies the orientation of the subject taken as the subject image included in the input image from the subject image.

In addition thereto, the attribute may be the type of the subject. For instance, the sex of a person as a subject, age of the person, imaged facial expression of the person, imaged gesture of the person, imaged orientation of the person, imaged race of the person, wearing object worn by the imaged person (glasses, sunglasses, a mask, a hat, etc.), illumination condition, and the like can be exemplified as the subject types. The parameter storage 1010 may store the plurality of image processing parameters in relation to a plurality of attributes including at least any ones of these types of attributes. In this case, the attribute identifier 1020 identifies the attribute to which the person imaged as the subject image included in the input image corresponds, from the subject image.

The weight determiner 1050 determines the weights for the plurality of image processing parameters when the subject image included in the input image is made into high image quality. The image generator 1070 then generates the high quality image where the input image has been made into high image quality, on the basis of the weight determined by the weight determiner 1050, also using the plurality of the image processing parameter selected by the parameter selector 1040. The weight determiner 1050 may determine the weight weighted heavier for the image processing parameter associated with the attribute whose degree of matching is larger for the identified attribute.

The parameter generator 1060 generates a synthetic parameter where the plurality of image processing parameters selected by the parameter selector 1040 have been synthesized. The image generator 1070 generates the high quality image by making the subject image included in the input image into high image quality using the synthetic parameter generated by the parameter generator 1060.

The above description has illustrated the generation of the image processing parameter according to the attribute of the subject. In addition thereto, the image processor 330 may vary the degree of high quality processing on the image.

The parameter storage 1010 stores the a specific parameter, which is an image processing parameter used for making an image of a specific object into high image quality, and a non-specific parameter, which is an image processing parameter used for the high quality processing of an image whose object is not specified. As will be described later, a non-specific parameter may be a general-purpose image processing parameter having an effect of the high quality processing to a certain extent may be adopted instead of the object.

The specific object area detector 1030 detects a specific object area, which is an area of a specific object, from the input image. The specific object may be an object of a subject to be detected as a characteristic area. The weight determiner 1050 determines the weights of the specific parameter and the non-specific parameter when high-quality-processing the input image where the specific object area has been detected.

The weight determiner 1050 determines the weight whose degree of weighing for the specific parameter is heavier than that for the non-specific parameter, for an image in the specific object area in the input image. This can appropriately make the specific object to be detected as the characteristic area into high image quality. The weight determiner 1050 determines the weight whose degree of weighing for the non-specific parameter is heavier than that for the specific parameter, for an image in the non-specific object area other than the specific object area. This can prevent the high quality processing from being performed using the image processing parameter dedicated for the specific object.

The image generator 1070 generates the high quality image where the input image has been made into high image quality using both the specific parameter and the non-specific parameter, on the basis of the weight determined by the weight determiner 1050.

The parameter storage 1010 stores the specific parameter calculated by learning using a plurality of images of the specific object as the learning images (also referred to as "training images"), and the non-specific parameter calculated by learning using as learning images a plurality of images which are not images of the specific object. This can calculate a specific parameter specialized for the specific object. This can also calculate a general-purpose specific parameter for various objects.

In the preliminary learning, it is preferable that an image processing parameter using spatial variation information such as edge information of the learning image have been learned, instead of luminance information itself of the learning image. Use of the edge information, where information in a low spatial frequency area information has been reduced, can realize the high quality processing robust against variation in illumination such as change in low frequency illumination.

The parameter generator 1060 may generate the synthetic parameter by synthesizing the non-specific and specific parameters using the weights determined by the weight determiner 1050. The image generator 1070 may generate the high quality image by making the input image into high image quality using the synthetic parameter generated by the parameter generator 1060.

In the above example, the operation has been described in a case of generating the high quality image using the plurality of image processing parameters selected on the basis of the attribute of the subject identified by the attribute identifier 1020. In addition thereto, the image generator 1070 may make the subject image include in the input image into high image quality using another combination of the plurality of the image processing parameters. For instance, the image generator 1070 may make the subject image included in the input image into high image quality using another combination of the plurality of predetermined image processing parameters. The image generator 1070 may select at least one image, on the basis of comparison with the input image, from among the plurality of images acquired by the high quality processing, and make the selected image a high quality image. For instance, the image generator 1070 may select an image having more similar image contents to those of the input image as the high quality image, giving precedence thereto, among the plurality of images by the high quality processing.

The parameter selector 1040 may select another combination of the plurality of the image processing parameters on the basis of the attribute of the subject identified from the input image. The image generator 1070 may make the subject image included in the input image into high image quality using the plurality of selected image processing parameters. The image generator 1070 may select at least one image on the basis of comparison with the input image among the plurality of images acquired by the high quality processing and make the selected image a high quality image.

As described above, the image processing apparatus 250 can perform the high quality processing using the image processing parameter capable of addressing the various attributes of subject images even though the parameter storage 1010 stores the limited number of image processing parameters. The noise reduction, reduction in artifact, reduction in burring, sharpening, high frame rate processing can be exemplified as high quality processing, as well as the high resolution processing, multi-gradation and multicolor processing. The parameter storage 1010 can store the image processing parameters for these various high quality processes.

The external information acquiring section 380 shown in FIG. 21 acquires the image processing parameter to be stored in the parameter storage 1010 (see FIG. 22), from the outside. The parameter storage 1010 stores the image processing parameter acquired by the external information acquiring section 380. More specifically, the external information acquiring section 380 acquires at least one of the specific parameter and the non-specific parameter from the outside. The parameter storage 1010 stores at least one of the specific parameter and the non-specific parameter acquired by the external information acquiring section 380.

Figures 23, 24:
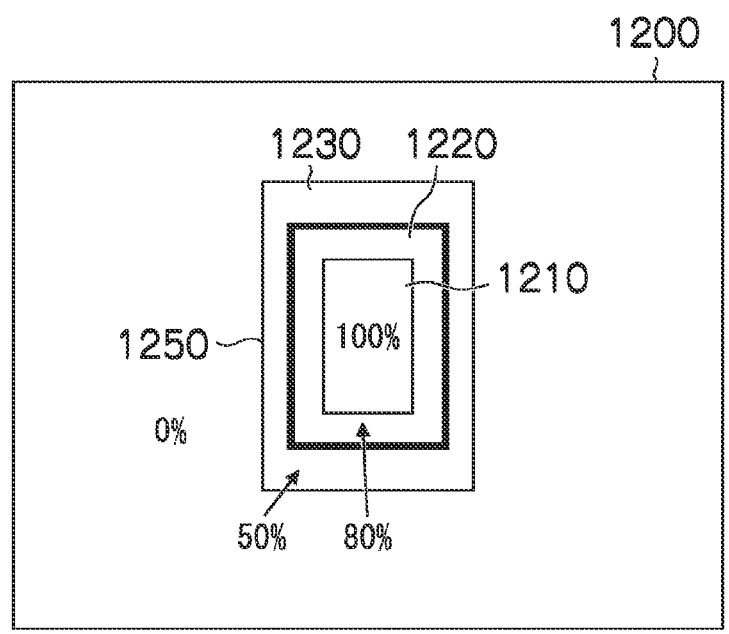
FIG. 23 is a diagram showing an example of a parameter stored in a parameter storage 1010 in a table format in FIG. 22.
FIG. 24 is a diagram showing an example of weighting a specific parameter.

FIG. 23 shows an example of the parameter stored in the parameter storage 1010 in a table format. The parameter storage 1010 stores the specific parameters, which are image processing parameters for the faces of people A0, A1, . . . , in relation to the orientations of the faces. The specific parameters A0, A1 have preliminarily been calculated by preliminary learning adopting images of the corresponding orientations of the faces as the learning images.

Here, a process of calculating the specific parameter A by the preliminary learning will be described, using an example of high resolution processing by weightedly adding the pixel values of peripheral pixels around the focused pixel. Here, it is provided that the pixel value y of the focused pixel is calculated by weightedly adding the pixel values $x_i$ (where i=1 to n) of n of peripheral pixels. That is, it is provided that $y=\Sigma(w_i x_i)$, where $\Sigma$ represents addition over i. $w_i$ is a weight coefficient for the peripheral pixel value $x_i$. The weight coefficient $w_i$ becomes a specific parameter A to be calculated by the preliminary learning.

It is provided that m of facial images where the faces in specific orientations have been taken are used as the learning images. Provided that the k-th (where k=1 to m) pixel value of the focused pixel of the learning image is $y_k$, the representation is $y_k=\Sigma w_i x_{ki}$. In this case, the weight coefficient $w_i$ can be calculated by operational processing such as the least squares method. For instance, $w_i$ substantially minimizing squares of vectors whose k-th element $e_k$ is represented as $e_k=y_k-(w_i x_{ki})$ can be calculated by operational processing such as the least squares method. The process of calculating the specific parameter is performed on the facial images with the plurality of orientations of the faces, thereby allowing the specific parameter A supporting each orientation of face to be calculated.

The parameter storage 1010 stores the non-specific parameter B with respect to the object which is not the face of a person. The non-specific parameter B has been preliminarily calculated in preliminary learning of learning images of a wide variety of subjects. The non-specific parameter B can be calculated by a preliminary learning process similar to that for the specific parameter A. For instance, in the preliminary learning process calculating the specific parameter A, use of images other than facial images and images of people as learning images can calculate the non-specific parameter B.

FIG. 24 shows an example of a weight of the specific parameter. It is provided that areas 1210 and 1220 inside a thick line in an image 1200 are detected as the characteristic areas. The weight determiner 1050 (see FIG. 22) determines that the weight coefficient of the specific parameter is 100% and that of the non-specific parameter is 0% for an inner area 1210 of the characteristic areas. It is also determines that the weight coefficient of the specific parameter is 80% and that of the non-specific parameter is 20% for an area 1220 in the characteristic area (inside the thick line frame), which is near the non-characteristic area outside of the area 1210.

As to areas outer the characteristic area, it is determines that the weight coefficient of the specific parameter is 50% and that of the non-specific parameter is 50% for an area 1230 near the characteristic area; it is determines that the weight coefficient of the specific parameter is 0% and that of the non-specific parameter is 100% for the much outer area 1250.

The weight determiner 1050 (see FIG. 22) thus determines the weight which is much heavier for the specific parameter for the image in the area much inner the specific object area in the input image. Further the weight determiner 1050 determines the weight for the image in the non-object area other than the specific object area such that the nearer the specific object area, the heavier the weight for the specific parameter is. The weight determiner 1050 thus stepwisely decreases the weight coefficient from the center of the characteristic area to the outside, from the characteristic area to the non-characteristic area. The weight determiner 1050 may continuously decrease the weight coefficient proportionally with the distance from the center of the characteristic area, the distance from the peripheral area of the characteristic area or the like, instead of the stepwise decrease of the weight coefficient. For instance, the weight determiner 1050 may determine the weight coefficient of the value decreasing exponentially, or in an exponentially functional manner, such as decrease of the weight coefficient with respect to the distance x according to the function $1/x$, $1/x^2$, $e^{-x}$ or the like.

The weight determiner 1050 may control the weight coefficient according to the degree of detection reliability for the characteristic area. More specifically, the weight determiner 1050 determines the weight heavier for the characteristic parameter with respect to the image in the specific object area whose degree of detection reliability for the specific object area is higher.

When the specific object exist in the area having not been detected as the characteristic area, it is sometimes unable to determine whether the specific object is exist or not, even if the area is made into high image quality using the general-purpose non-specific parameter. The image processor 330 performs the high quality processing having an effect of the specific parameter for the specific object even in the area having not being detected as the characteristic area. Accordingly, it can readily determine whether the specific object exist or not from the high-quality-processed image.

The specific parameter may be the image processing parameter where the plurality of image processing parameters described in relation to FIG. 23 have been synthesized. For instance, it is provided that the detected characteristic area includes an image of the face of a person looking aside by 5° with respect to the face looking forward. In this case, the weight determiner 1050 determines that the weight coefficient for the specific parameter A0 is 25% and the weight coefficient for the specific parameter A1 is 75%. The parameter generator 1060 then generates the synthetic parameter where the specific parameters A0 and A1 have been synthesized with the weight coefficients 25% and 75%, respectively. The image generator 1070, in turn, makes the synthetic parameter generated by the parameter synthesizer and the non-specific parameter into high image quality, using the image processing parameter acquired by weighing according to the proportion shown in FIG. 24.

For instance, when the image processing parameter (specific parameter or non-specific parameter) for high quality processing by weightedly adding the peripheral pixels is used, the parameter generator 1060 may weightedly add the weight coefficients of the image processing parameters according to the weight coefficients determined by the weight determiner 1050 and calculate the synthetic parameter represented by the acquired weight coefficient. For instance, spatial frequency components in the spatial frequency region or pixel data itself (e.g., image data of high frequency components) can be exemplified as the addable image processing parameter, in addition to the weight coefficient.

When the high quality processing is represented by a vector operation, matrix operation or tensor operation on the characteristic amount vector or the like, the parameter generator 1060 may generate the synthetic parameter by weightedly adding or multiplying the vector, matrix, tensor, n-dimensional mixed normal distribution or n-dimensional mixed multinominal distribution as the image processing parameter; here it is provided that n is an integer more than or equal to 1. For instance, blurring owing to synthesis can be alleviated on the vectors incapable of being represented as scalars by vector interpolation in the characteristic vector space. For instance, an operation is exemplified that regards the sum of a characteristic vector where a characteristic vector indicating 0° has been multiplied by a coefficient 0.25, and a characteristic vector where a characteristic vector indicating 20° has been multiplied by a coefficient 0.75 as a characteristic vector indicating 15°. An interpolation in the locality preserving projection (LPP) space can further alleviate the synthetic blurring. The parameter generator 1060 can calculate the synthetic parameter from the specific parameter and the non-specific parameter. The parameter generator 1060 can also calculate the synthetic parameter from a plurality of different specific parameters.

When the image generator 1070 generates the high quality image using the specific parameter and the non-specific parameter, the image generator 1070 may generate the high quality image by adding image information acquired using the specific parameter and image information acquired using the non-specific parameter using the weight coefficient determined by the weight determiner 1050. The image generator 1070 may generate the high quality image by performing image processing using the non-specific parameter on the image information acquired by image processing using the specific parameter. The similar processing can be applied to the high quality processing using a plurality of specific parameters. The pixel value itself, characteristic amount vector in the characteristic amount space, matrix, n-dimensional mixed normal distribution, n-dimensional mixed multinominal distribution and the like can be exemplified as the image data here. For instance, blurring owing to synthesis can be alleviated on the vectors incapable of being represented as scalars by vector interpolation in the characteristic vector space.

In the high quality processing illustrated in FIGS. 23 and 24, the plurality of image processing parameters to be used when performing the high quality image processing of the characteristic area is selected by the parameter selector 1040 on the basis of the orientation of the face of a person identified in the image in the characteristic area. The image generator 1070 generates a single high quality image using the plurality of image processing parameter selected by the parameter selector 1040.

In addition thereto, the image generator 1070 may generate a plurality of images where the characteristic area has been made into high image quality, from each of combinations of the image processing parameters stored by the image generator 1070. The image generator 1070 may generate the image most similar to that in the characteristic area among the plurality of acquired images as the high quality image where the characteristic area has been made into high image quality.

For instance, the image generator 1070 generates the image where the characteristic area has been made into high image quality using the synthetic parameter of the specific parameter A0 corresponding to the orientation 0° and the specific parameter A1 corresponding to the orientation 20°. Further, the image generator 1070 generates the image where the characteristic area has been made into high image quality using the synthetic parameter of another one or more combination of specific parameter.

The image generator 1070 calculates the degree of matching of the image contents by comparing each of a plurality of generated images with images in the characteristic area. The image generator 1070 determines as the high quality image the image whose degree of matching is the highest among a plurality of the generated images.

When the image generator 1070 generates the plurality of images where the characteristic areas have been made into high image quality, the image generator 1070 may make the image in the characteristic area a high quality image using each of synthetic parameters based on the plurality of combinations of the predetermined specific parameters. In this case, the parameter selector 1040 may select the plurality of combinations of the predetermined specific parameters, without performing the process of identifying the orientation of the face by the attribute identifier 1020.

Instead, the parameter selector 1040 can select a plurality of combinations of the specific parameters on the basis of the orientation of the face of the person identified from the image in the characteristic area. For instance, the parameter selector 1040 stores information identifying the plurality of combinations of the specific parameters and information identifying the orientation of the face of a person in relation to each other, and may select the plurality of combinations of the plurality of specific parameters stored in relation to the orientation of the face of the person identified from image in the characteristic area. The plurality of images where the characteristic area images have been made into high image quality may be generated by making the image in the characteristic area into high image quality using each of synthetic parameters based on the plurality of selected combinations.

When the image generator 1070 generates the plurality of images where the characteristic area images have been made into high image quality, the image generator 1070 may make the image in the characteristic area into high image quality using the plurality of specific parameters. The image generator 1070 generates the image most similar to the image in the characteristic area among the plurality of acquired images, as the image where the characteristic area images have been made into high image quality. Also in this case, the parameter selector 1040 may select the plurality of combinations of the predetermined specific parameters, without performing the process of identifying the orientation of the face by the attribute identifier 1020; the parameter selector 1040 may select the plurality of specific parameters on the basis of the orientation of the face of the person identified in the image in the characteristic area.

As described in relation to FIG. 23, the image processing parameter (specific parameter) making the specific orientation of facial image into high image quality can be calculated from the learning images with the specific orientation of the face. Calculation of the image processing parameter in a similar manner on another plurality of orientations of the faces can calculate the image processing parameters corresponding to the plurality of respective orientation of the faces. The parameter storage 1010 preliminarily stores the calculated image processing parameters in relation to the corresponding orientations of the faces. The image processing parameter for making the facial image into high image quality may be the image processing parameter for making the entire face into high image quality. Instead, the image processing parameter may make at least a part of the objects included in the facial image, such as the images of the eyes, image of the mouth, image of the nose and images of the ears into high image quality.

The orientation of the face is an example of the orientation of the subject. As with the orientation of the face, a plurality of image processing parameters can be calculated corresponding to the other respective orientations of the subject. When the subject is a person, orientations of the human body can be exemplified as the orientations of the subject. More specifically, the orientation of the body part, the orientations of hands can be exemplified as the orientations of the human body. When the subject is something other than a person, a plurality of image processing parameters can be calculated for making subject images where the subject has been imaged from a plurality of directions into high image quality, as with the facial image.

The orientation of the subject is an example of conditions of the subject. The conditions of the subject can further be classified according to the facial expressions. In this case, a plurality of image processing parameters stored in the parameter storage 1010 make the respective facial images with different, specific facial expressions into high image quality. For instance, the plurality of image processing parameters stored in the parameter storage 1010 make the face in conditions of emotions and the face in a condition where the person is nervous into high image quality.

The conditions of the subject can also be classified according to gestures of the person. In this case, the plurality of image processing parameters stored in the parameter storage 1010 make images of the person with different gesture into high image quality. For instance, the plurality of image processing parameters stored in the parameter storage 1010 make an image of a running person, an image of a fast-walking person, an image of a person about to run, an image of a person searching for an object and the like, into high image quality.

The conditions of the subject can further be classified according to attitudes of the person. In this case, the plurality of image processing parameters stored in the parameter storage 1010 make images of the person taking different, specific attitudes into high image quality. For instance, the plurality of image processing parameters stored in the parameter storage 1010 make an image of the person in a condition where he/she crouches, an image of the person in a condition where his/her hands are in pockets, an image of the person in a condition where he/she crosses the arms, an image of the person in a condition where the directions of the orientations of the face and the body does not match and the like, into high image quality.

The conditions of the subject can moreover be classified according to wearing objects of the person. In this case, the plurality of image processing parameters stored in the parameter storage 1010 make images of the person wearing different, specific wearing objects into high image quality. For instance, the plurality of image processing parameters stored in the parameter storage 1010 make an image of the person wearing glasses, an image of the person wearing sunglasses, an image of the person wearing a mask, an image of the person wearing a hat and the like into high image quality.

As described above, the subject are classified into the plurality of attributes according to the plurality of conditions of the subject. In addition thereto, the subject can be classified into the plurality of attributes according to the types of the subject. The human race can be exemplified as the type of the subject. The regionally classified human races such as the Asian race and European race, the human races classified according to the physical anthropology and the like can be exemplified as the human races. The plurality of image processing parameters stored in the parameter storage 1010 make images of people classified into the corresponding human races, into high image quality.

As the types of the subject, classification according to the sex of people, such as male and female, can be made. In this case, the plurality of image processing parameters stored in the parameter storage 1010 make the image of the person of the corresponding sex, such as an image of a male or female, into high image quality. As to the type of the subject, classification according to age groups of people can be made. In this case, the plurality of image processing parameters stored in the parameter storage 1010 make images of people of corresponding ages, such as images of people in their teens or images of people in their twenties, into high image quality.

The type of the subject, the plurality of conditions of the subject, or the combination thereof specify the attributes of the subject image. The parameter storage 1010 preliminarily stores the image processing parameters for making the subject images belonging to the attributes into high image quality in relation to the respective specified attributes. The image processing parameters stored by the parameter storage 1010 can be calculated according to the similar method to the calculation method of the image processing parameters for the respective orientations of the face. For instance, when the attribute is specified by the facial expression, the image processing parameter can be calculated for making the image with a smile face into high image quality by preliminary learning using a plurality of images where smile faces have been imaged as the learning images. Preliminary learning of other facial expressions such as an angry face can be also calculate a plurality of image processing parameter for making facial images of the respective facial expressions into high image quality. Likewise, the image processing parameters can also calculated for the attributes such as the gesture, wearing object, human race, sex and age.

The attribute identifier 1020 can identify the attribute of the subject image by applying an identifier which has preliminarily been calculated by for instance boosting such as the AdaBoost. For instance, the identifier is generated by synthesizing the weak identifiers by boosting process using a plurality of facial images where faces have been imaged in the specific orientation as teacher images. It can be determined whether the facial image is in the specific orientation of face or not according to the correct/wrong identification result acquired when the generated identifier is applied to the subject image. For instance, when a correct identification result is acquired, the input subject image is determined to be the facial image with the specific orientation of face.

Likewise, generation of the identifiers by the boosting process on the other plurality of orientations of faces can generate a plurality of identifiers corresponding to the respective orientations of faces. The attribute identifier 1020 can applies the plurality of identifiers to the subject image and identify the orientation of face on the basis of the correct/wrong identification results acquired by the identifiers. In addition to the orientation of face, another one or more attributes specified by the facial expression, sex and the like can be identified by applying the identifiers generated with respect to the respective attributes by the boosting processes. The attribute identifier 1020 can identify the attribute by applying the identifiers, which have learned for respective attributes according to various methods such as the linear discriminant method and the mixed Gaussian model in addition to the learning by boosting, to the subject image.

Example of Configuration of Display Apparatus 260

Figure 25:
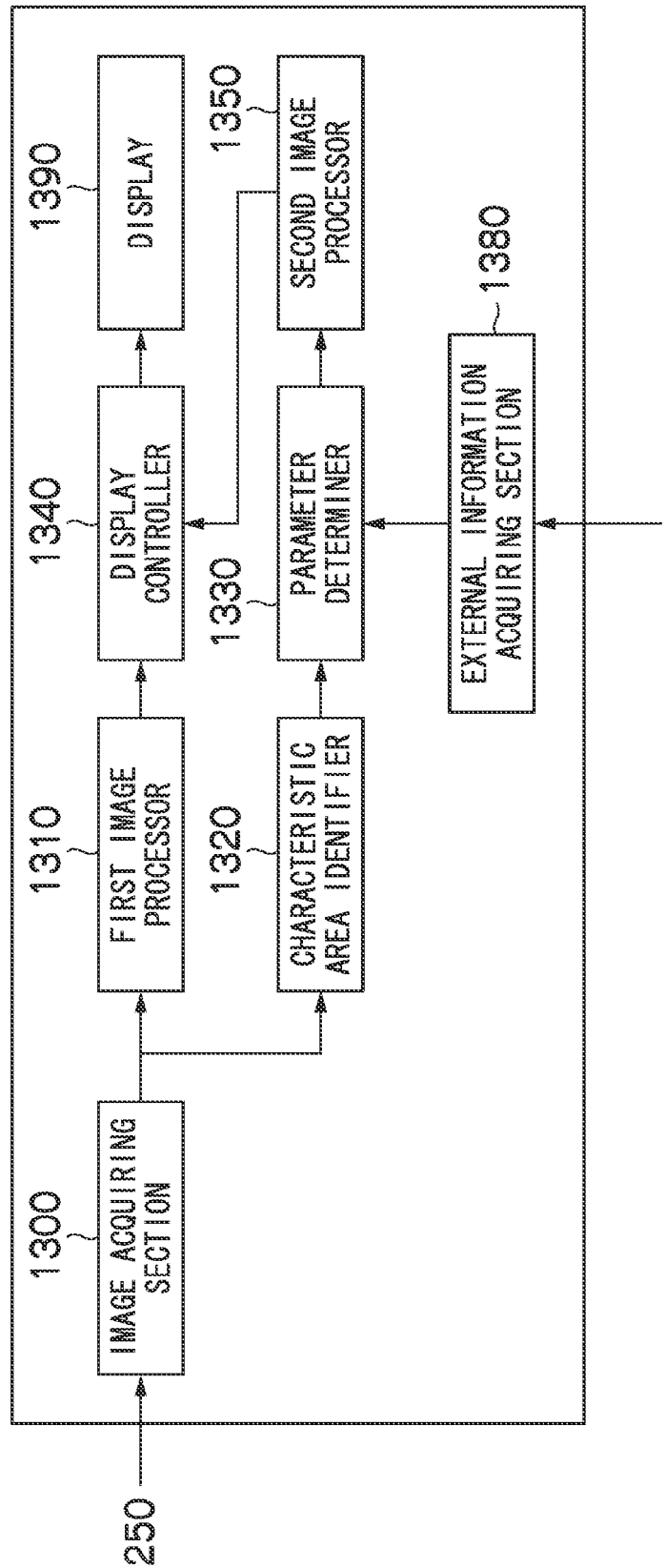
FIG. 25 is a block diagram showing an example of a configuration of a display apparatus 260 in FIG. 13.

FIG. 25 shows an example of a block configuration of the display apparatus 260 in FIG. 13. As shown in FIG. 25, the display apparatus 260 includes an image acquiring section 1300, a first image processor 1310, a characteristic area identifier 1320, a parameter determiner 1330, a display controller 1340, a second image processor 1350, an external information acquiring section 1380 and a display 1390.

The image acquiring section 1300 acquires the input image. The input image here may be a flame image included in the moving image acquired from the image processing apparatus 250. The first image processor 1310 generates a prescribed quality image where the input image has been made into high image quality, using a predetermined image processing parameter. For instance, when performing the high resolution processing, the first image processor 1310 generates the prescribed quality image using an image processing parameter of a method such as simple interpolation enlarging process where the required amount of processing is smaller than a predetermined value.

The display controller 1340 causes the display 1390 to display the prescribed quality image generated by the first image processor 1310. The display 1390 displays the prescribed quality image.

The characteristic area identifier 1320 identifies a plurality of characteristic areas in the input image. The characteristic area identifier 1320 may identify a plurality of characteristic areas in the input image, while the display 1390 displays the prescribed quality image. The image processing apparatus 250 may attach information identifying the characteristic area to the moving image as supplementary information and transmit the attached moving image to the display apparatus 260. The characteristic area identifier 1320 may identify the plurality of characteristic area by extracting the information identifying the characteristic area from the supplementary information of the moving image acquired by the image acquiring section 1300.

The parameter determiner 1330 determines the image processing parameters for further making the images of the plurality of characteristic areas into high image quality, for the respective characteristic areas. For instance, the parameter determiner 1330 determines the image processing parameters for making the images of the plurality of characteristic areas into high image quality by different degrees of high quality processing, for the respective characteristic areas. "Making the images into high image quality by different degrees of high quality processing" may mean a high quality processing by different amounts of processing, a high quality processing by different amounts of processing in a unit area, a high quality processing by high quality processing methods with different required amounts of processing or the like.

The second image processor 1350 generates a plurality of high quality characteristic area images where the plurality of respective characteristic area images have been made into high image quality, using the image processing parameters determined by the parameter determiner 1330. The display controller 1340 causes the display 1390 to display the plurality of characteristic area images in the plurality co characteristic areas in the prescribed quality image displayed on the display 1390. The display controller 1340 thus causes the display 1390 to display the high quality image instead of the prescribed quality image having already been displayed on the display 1390, at a stage where the high quality image has been generated. Since the display 1390 promptly generates and displays the prescribed quality image, the user can observe a monitor image with a certain extent of quality substantially without delay.

The parameter determiner 1330 may determine the image processing parameters for the characteristic areas on the basis of the respective degree of importance in the plurality of characteristic areas. Information representing the degree of importance may accompany the supplementary information. The degree of importance may have preliminarily been determined according to the type of the subject in the characteristic area. The degree of importance for each type of subject may be specified by a user observing the display 1390. The parameter determiner 1330 determines the image processing parameters for performs the high image quality processing such that the greater the degree of importance is, the greater the degree of high quality processing is performed. Accordingly, the user can observe the image where the more important the characteristic area is, the higher the image quality the user observes.

The parameter determiner 1330 determines the image processing parameters for the respective characteristic areas on the basis of the types of characteristics of the images in the plurality of characteristic areas. The parameter determiner 1330 may determine the image processing parameters for the respective characteristic areas on the basis of the types of subjects imaged in the plurality of characteristic areas. Thus, the parameter determiner 1330 may directly determine the image processing parameters according to the type of the subject.

The parameter determiner 1330 determines the image processing parameters on the basis of the required amount of processing required to make the plurality of characteristic areas into high image quality in the second image processor 1350. More specifically, the parameter determiner 1330 determines the image processing parameters such that the smaller the required amount of processing is, the greater the degree of high quality image processing of the image processing parameters is specified.

For instance, the parameter determiner 1330 determines the image processing parameters such that the smaller the sizes of the characteristic areas, the greater the degree of high quality processing of the image processing parameter is specified. The second image processor 1350 generates the plurality of high image quality characteristic area images where the images of the characteristic images have been made into high resolution, using the image processing parameters determined by the parameter determiner 1330. The parameter determiner 1330 may determine the image processing parameters such that the smaller the number of pixels in the characteristic areas, the higher the degree of the image processing parameters for the high image processing is specified.

The parameter determiner 1330 determines the image processing parameters on the basis of the processing capacity permitted in the second image processor 1350. More specifically, the parameter determiner 1330 may determine the image processing parameters such that the smaller the processing capacity is, the higher degrees of high quality image processing is performed.

The degree of high quality processing can thus be controlled according to the processing capacity of the second image processor 1350. This can prevent display of image from being delayed by an overload on the display 1390 owing to the high quality processing. An allowance in processing capacity of the display 1390 promptly generates the high quality image to be observed.

As described above, the high resolution processing can be exemplified as the high quality processing. More specifically, the parameter determiner 1330 determines the image processing parameters for making the respective images in the characteristic areas into high resolution, with respect to the plurality of characteristic areas. The second image processor 1350 generates a plurality of high quality characteristic area images where the plurality of characteristic area images has been made into high resolution, using the image processing parameter determined by the parameter determiner 1330. Here, the great degree of high resolution processing includes a high resolution processing in high precision, and generation of the high quality image with more number of pixels.

The high image quality processing includes the multi-gradation, multicolor processing, noise reduction, reduction in artifact, reduction in burring and sharpening can be exemplified in addition to the high resolution processing. As to these types of high image quality processes, as with the high resolution processing, the parameter determiner 1330 can determine the image processing parameters for various types of high quality processes with respect to the characteristic areas, and the second image processor 1350 can generate the plurality of high image quality characteristic area images where the images in the characteristic areas have been made into high image quality in various manners, using the image processing parameters determined by the parameter determiner 1330.

As described above, the image acquiring section 1300 may acquires the plurality of moving image component images included in the moving image as the input images. The parameter determiner 1330 determines the image processing parameters for making the plurality of characteristic areas into high frame rate with respect to the plurality of characteristic areas. The second image processor 1350 may then generate the plurality of high image quality characteristic area images having been made into high frame rate, using the image processing parameters determined by the parameter determiner 1330.

The parameter determiner 1330 determines the image processing parameters on the basis of the frame rate of the moving image. More specifically, the parameter determiner 1330 may determine the image processing parameters for high image quality processing by greater degree when the frame rate of the moving image is smaller. The second image processor 1350 may generate the high quality moving image by making the input images into high image quality using the determined image processing parameters. As with the high image quality processing by the image processing apparatus 250, the high image processing by the second image processor 1350 may also include concepts of the high resolution processing, multicolor processing, multi-gradation, noise reduction, reduction in artifact such as block noise and mosquito noise, reduction in burring and sharpening. The second image processor 1350 can generate the high quality image by these processes.

The display apparatus 260 thus can determine the degree of the high image quality processing according to the amount of data of the image to be made into high image quality, the amount of processing capable of being assigned to the high image quality processing. The display apparatus 260 can promptly provide the user with the image with a certain extent of quality, and prevent display of the image having been subjected to the high image quality processing from being extremely delayed. Accordingly, the display apparatus 260 can prevent an overload owing to the high image quality processing, and smoothly reproduce the moving image provided by the image processing apparatus 250.

The external information acquiring section 1380 acquires a determination condition for determining the image processing parameters for the respective characteristic areas from outside of the display apparatus 260. The parameter determiner 1330 determines the image processing parameters for the respective characteristic areas on the basis of the determining condition acquired by the external information acquiring section 1380. The degree of importance of the characteristic area, the type of the characteristic of the characteristic area, required amount of processing, size of the characteristic area, number of pixels of the characteristic area, processing capacity and the like can be exemplified as the determination conditions.

Figure 26:
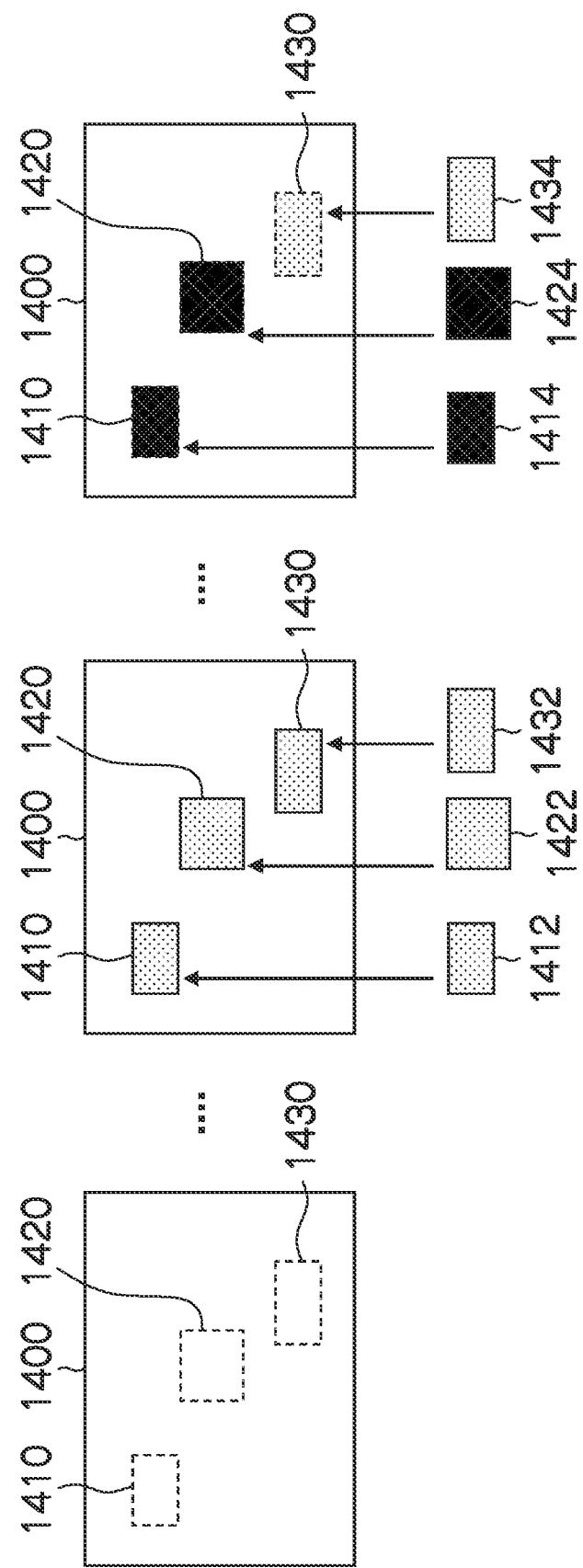
FIG. 26 is a diagram showing an example of a display area of the image.

FIG. 26 shows an example of a display area 1400 of the image. The display area is an area where the display 1390 displays the input image. Here, it is provided that three characteristic areas are identified from the input image as the characteristic areas. It is also provided that images of these characteristic areas are displayed in the characteristic areas 1410, 1420 and 1430 in the display area 1400.

When the image acquiring section 1300 illustrated in FIG. 25 acquires the input image, the display controller 1340 displays the acquired input image in the display area 1400 on the display 1390 as it is.

The second image processor 1350 applies a prescribed high resolution processing whose required amount of processing such as the simple interpolation is smaller than a predetermined value on the image in each characteristic area while the input image is displayed, and generates the prescribed quality image of the image of each characteristic area (a first high resolution processing stage). In the first high resolution processing stage, the degree of high resolution process is independent of the amount of data such as the number of pixels in the characteristic area and the frame rate, the importance of the characteristic area, the type of the subject, and the processing capacity in the second image processor 1350; the second image processor 1350 performs a prescribed degree of high resolution processing. The amount of processing required to apply the prescribed degree of high resolution processing to the entire areas of the input image may always be assigned to the second image processor 1350.

After completion of the first high resolution processing stage and generation of the prescribed quality images 1412, 1422 and 1432, the display controller 1340 displays the prescribed quality images 1412, 1422 and 1432 in the corresponding characteristic areas 1410, 1420 and 1430, respectively.

While the prescribed quality images 1412, 1422 and 1432 are displayed, the second image processor 1350 performs the high resolution processing by the degree determined by the parameter determiner 1330 for each characteristic area, and generates the high quality image for each characteristic area image (a second high resolution processing stage). In the second resolution processing stage, the degree of high resolution is the degree determined by the parameter determiner 1330, and dependent of the amount of data such as the number of pixels in the characteristic area and the frame rate, the importance of the characteristic area, the type of the subject, and the processing capacity in the second image processor 1350.

After completion of the second high resolution processing stage and generation of the high quality images 1414, 1424 and 1434, the display controller 1340 displays the high quality images 1414, 1424 and 1434 in the corresponding characteristic areas 1410, 1420 and 1430, respectively.

The second image processor 1350 thus performs the high resolution processing by the degree according to the current amount of load and the amount of processing required for the high image quality processing, thereby allowing the high quality images to be promptly provided for the user in an extent capable of providing.

Example of Another Mode of Image Processing System

Figure 27:
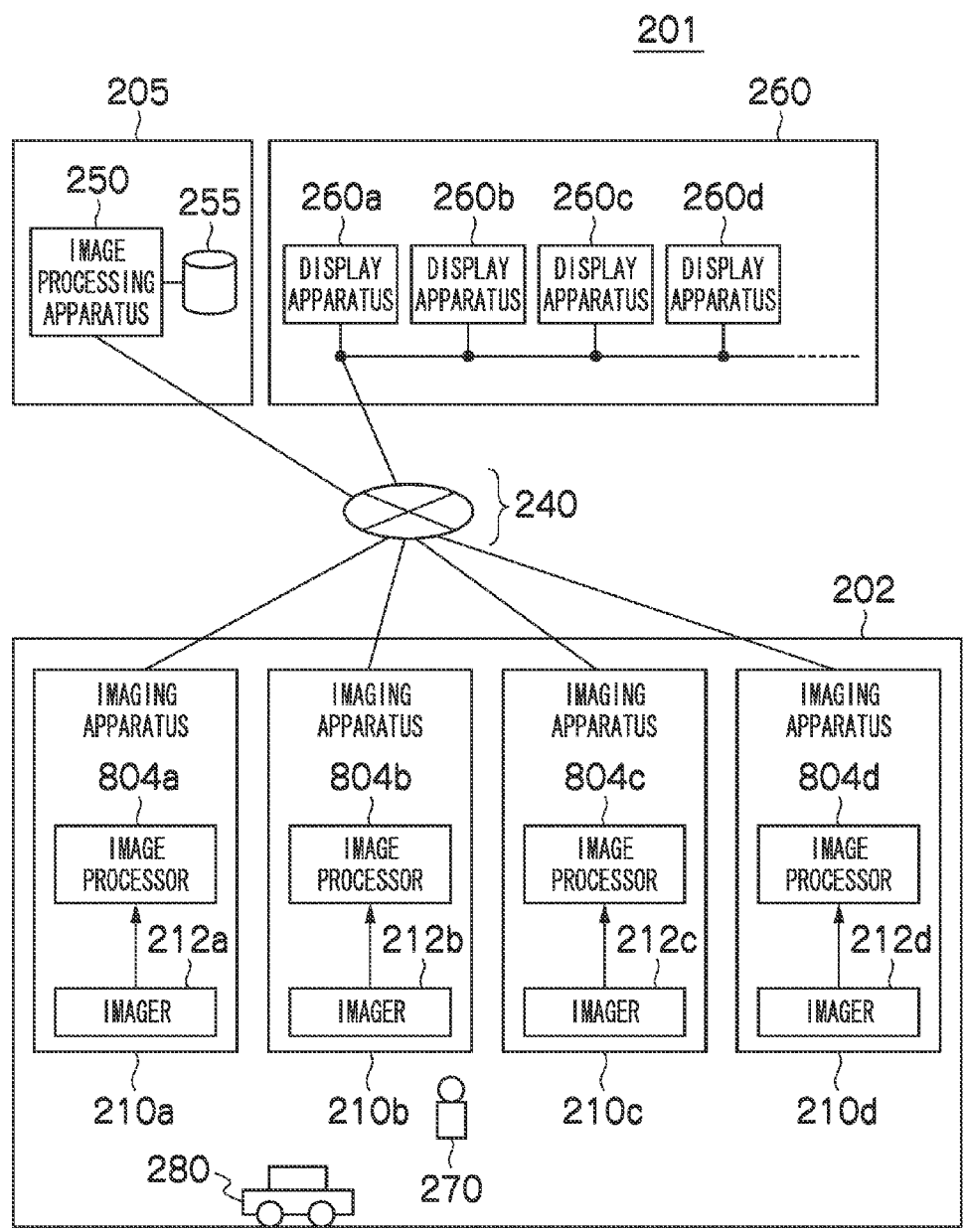
FIG. 27 is a configuration diagram showing an example of an image processing system according to another embodiment.

FIG. 27 shows an example of an image processing system 201 according to another embodiment. The configuration of the image processing system 201 in this embodiment is identical to that of the image processing system 200 illustrated in FIG. 13 except that the imaging apparatuses 210a to 210d include image processors 804a to 804d, respectively.

The image processor 804 includes the elements included in the image processing apparatus 220 except for the image acquiring section 222 as illustrated in FIG. 13. The function and operation of each element included in the image processor 804 may substantially be identical to those of each element included in the image processing apparatus 220 except that each element included in the image processing apparatus 220 processes a moving image acquired by the imager 212 instead of processing the moving image acquired by the decompression process by the compressed moving image decompressor 224. The image processing system 201 with this configuration can also exert the advantageous effect, which has been described in relation to the image processing system 200 in FIGS. 13 to 26.

The image processor 804 may acquire moving images including a plurality of taken images represented in the RAW format from the taken imager 212, and compress the plurality of taken images represented in the RAW format included in the acquired moving images as in the RAW format. The image processor 804 may detect one or more characteristic areas from the plurality of taken images represented in the RAW format. The image processor 804 may compress the moving image including the plurality of taken images in the compressed RAW format. The image processor 804 can compress the moving image according to the compression method, which has been described as the operation of the image processing apparatus 220 in relation to FIGS. 13 to 18.

The image processing apparatus 250 can acquire the plurality of taken images represented in the RAW format by decompressing the moving image acquired from the image processor 804. The image processing apparatus 250 enlarges the plurality of taken images represented in the RAW format acquired by the decompression in an area-by-area basis, and applies the synchronization processing in an area-by-area basis. Here, the image processing apparatus 250 may perform more precise synchronization processing in the characteristic area than that in the areas other than the characteristic area.

The image processing apparatus 250 may apply the super-resolution processing to the characteristic area images in the taken images acquired by the synchronization processing. The super-resolution device utilizing the tensor projection according to the present invention can be applied as the super-resolution processing in the image processing apparatus 250.

The image processing apparatus 250 may apply the super-resolution processing to each object included in the characteristic area. For instance, when the characteristic area includes the facial image of the person, the image processing apparatus 250 performs the super-resolution processing for each of facial parts (e.g., the eye, nose, mouth, etc.), as an example of the object. In this case, the image processing apparatus 250 preliminarily stores the learning data, such as a model, as described in Japanese Patent Application Laid-Open No. 2006-350498 with respect to each of facial parts (e.g., the eye, nose, mouth, etc.). The image processing apparatus 250 may apply the super resolution processing to each facial part image using the learning data selected for each facial part included in the characteristic area.

The learning data, such as a model, may be stored with respect to each combination of a plurality of facial expressions, a plurality of the direction of the face and a plurality of illumination conditions. The facial expressions include faces of emotions and a straight face. The directions of face include the front, upward, downward, right, left and backward directions. The illumination conditions include conditions on the intensity of illumination and directions of illumination. The image processing apparatus 250 may apply the super-resolution processing to the facial image using the learning data corresponding to a combination of the facial expression, direction of the face and illumination condition.

The facial expression and the facial direction can be identified on the basis of the image contents of the facial image included in the characteristic area. The facial expression can be identified from the shapes of the mouth and/or eyes. The direction of the face can be identified from positional relationship of the eyes, mouth, nose and ears. The intensity of illumination and the direction of the illumination for the face may be identified on the basis of the image contents of the facial image such as the position and size of a shadow. The facial expression, the direction of the face and the condition of the illumination may be identified in the image processor 804; the identified facial expression, the direction of the face and the condition of the illumination may be associated with the image and transmitted from the output section 236. The image processing apparatus 250 may apply the super-resolution processing utilizing the learning data associated with the facial expression, the direction of the face and the condition of the illumination outputted from the output section 236.

Models on the respective parts of the face may be used as the learning data such as models instead of a model representing the entire face. Further, models of the faces of sex and/or human races can be used. Models are not limited to those on people. Instead, models can be stored with respect to each of types of objects to be monitored, such as vehicles and ships.

The image processing apparatus 250 can reconstruct the characteristic area image using the locality preserving projection (LPP). Another method preserving the locality such as the locally linear embedding (LLE) can be used instead of the locality preserving projection (LPP) as a method for the image processing apparatus 250 to reconstruct the image and as a learning method for the reconstruction of the image.

The learning data may include low and high frequency components of the object image extracted from the multiple samples of the object, instead of or in addition to the model as described in Japanese Patent Application Laid-Open No. 2006-350498. Here, the low frequency components of the object image may be clustered into a plurality of clusters for the respective types of the objects by clustering the low frequency components of the object images for the respective types of objects according to the k-means method and the like. A representative low frequency component (e.g., the value of the center of gravity) may be specified for each cluster.

The image processing apparatus 250 extracts the low frequency components from the object image included in the characteristic area in the taken image. The image processing apparatus 250 identifies the cluster where a value matching with the extracted low frequency component is specified as the representative low frequency component from among the clusters of the extracted low frequency components extracted from sample images of the object whose type is that of the extracted object. The image processing apparatus 250 identifies the cluster of the high frequency component associated with the low frequency component included in the identified cluster. The image processing apparatus 250 can thus identify the cluster of the high frequency component correlated with the low frequency component extracted from the object included in the taken image. The image processing apparatus 250 may then transform the object image into the high quality image which is more high quality using the high frequency component representing the identified cluster of high frequency component. For instance, the image processing apparatus 250 may add the high frequency component selected on an object-by-object basis with the weight according to the distance from the center of each object to the processing target position on the face to the object image. The representative high frequency component may be generated by the closed loop learning. Since the image processing apparatus 250 thus selects the preferable learning data for every object from among the learning data generated by learning every object, the object image may be made into high image quality in high precision.

The image processing apparatus 250 can make the input image into high image quality using the stored low and high frequency components, without clustering according to the k-means method. For instance, the image processing apparatus 250 stores a pair of a low resolution edge component, which is an edge component extracted from each patch in the low resolution learning image, and a high resolution edge component, which is an edge component extracted from each patch in the high resolution learning image. These edge components may be stored as vectors in the eigenspace such as the LPP.

When the input image to be subjected to the high image quality processing is made into high image quality, the image processing apparatus 250 extracts the edge components for every patch from the enlarged image acquired by enlarging the input image according to a prescribed method such as bicubic method. The image processing apparatus 250 calculates the norm between the extracted edge component and the stored edge component in the eigenspace such as the LPP for every patch in the input image. The image processing apparatus 250 selects a plurality of patches where the norms smaller than a predetermined value are calculated from among the stored patches. The image processing apparatus 250 then establishes a Markov random field of the extracted edge components and the high resolution edge components of the plurality of selected patches with respect to the focused patch and the patches therearound. The image processing apparatus 250 selects the high resolution edge components to be added to the images in the focused patches for the respective focused patches in the stored high resolution edge components by solving an energy minimization problem in the established Markov random field established for every focused patch using loopy belief propagation (LBP) or the like. The image processing apparatus 250 generates the high quality images by adding each high resolution edge component selected for each patch to the image component of each patch in the enlarged image.

Further, the image processing apparatus 250 can make the input image into high image quality using plural classes of Gaussian mixture model. For instance, the image vector in each patch in the low resolution learning image and the image vector in each patch in the high resolution learning image are adopted as the learning data. The average and variance of the density distribution corresponding to each class in the Gaussian mixture model and the weight for each class is calculated by the EM algorithm or the like using the cluster vector acquired from the image vector in each patch in the low resolution learning image. The image processing apparatus 250 stores these averages, variances and weights as the learning data. When the input image to be made into high image quality, the image processing apparatus 250 generates the high quality image using the image vectors in the respective patches of the input image, the cluster vector acquired from the image vectors, the average, variance and weight stored as the learning data.

Further, the image processing apparatus 250 can generate the high quality image only from the input image, using edge information extracted from the input image. For instance, when the image processing apparatus 250 makes a specific image area near the edge extracted from the input image into high resolution, the image processing apparatus 250 can generate the high quality image where the specific image area has been made into high resolution, by disposing the pixel values of the pixels included in another area along the edge in the specific image area. For instance, the image processing apparatus 250 can determine which positions the pixel values of the pixels are disposed in the specific image area on the basis of the positional relationship between the position of the pixel included in the another area and the position of the edge, dispose the pixel values on the determined positions, thereby allows the specific image area to be made into high resolution.

The image processing apparatus 250 may apply the high resolution processing using the edge information only to proximity of the edge areas including the edges in the input image. The image areas other than the edge areas may be made into high resolution according to a filter method and the like. For instance, the image processing apparatus 250 may make a flat area where an amount of edges less than or equal to a prescribed amount is extracted may be made into high resolution using the filter method. The image processing apparatus 250 may make a texture area where an amount of edges greater than the prescribed amount is extracted may be made into high resolution by modifying the image made into high resolution using the filter method so as to satisfy a condition generated from the input image.

As described above, the high image quality processing using the low and high frequency components, the Gaussian mixture model, and the high resolution image processing using the edge information can be used when the image where no object has identified is made into high image quality. The parameter storage 1010 can store the parameters used for the high image quality processing by the image processing apparatus 250, for instance, the data of the high frequency components corresponding to the low frequency components, the filter for making the flat area into high resolution, the learning data related to the Gaussian mixture model. The high image quality processing using the locality preserving projection tensor according to the present invention may be applied as the high image quality processing for making the image where the object is identified into high image quality.

The high image quality processing on the facial images will hereinafter be exemplified as the high image quality processing using the tensor and described. Facial images different in the resolution, person and patch position are used as the learning images for calculating fourth rank tensors whose learning objects are the resolution, patch position, person and pixel by learning. In these learning images, the eigenvector in the eigenspace is calculated regarding the resolution, patch position, person and pixel as the objects. The fourth rank tensor represented as the product of the calculated eigenvectors are used for generating medium resolution facial images from the facial image included in the input image. The eigen vector can be calculated by learning according to the eigen-decomposition method, locality preserving projection (LPP) and the like. A high resolution patch used for restoring the high frequency component from the medium resolution facial image is acquired from the high resolution learning images. The image processing apparatus 250 stores the acquired tensor and high resolution patch.

When the facial image included in the input image as a target of the high image quality processing is made into high image quality, the image processing apparatus 250 acquires the patch for forming the medium resolution facial image by transforming the facial image using the stored fourth rank tensor on patch-by-patch basis. The image processing apparatus 250 then establishes the Markov random field with the medium resolution patch and the stored high resolution patch. The high resolution facial image whose high frequency component is restored is acquired by resolving the energy minimization problem of the entire patches in the Markov random field model according to iterative calculation method (ICM) and the like.

When the configuration of the image processing apparatus 100 illustrated in FIG. 6 is applied as the high image quality processing device in the image processing apparatus 250, the output image from the adding section 160 in FIG. 6 (or synthesizer 166) corresponds the "medium resolution" facial image. The "high resolution" image is acquired as the output by further resolving the energy minimization problem of the Markov random field model using the "medium resolution" image as the input thereof.

The image processing apparatus 250 may perform a process of generating the low resolution facial image from the image included in the input image, as a preprocess before acquiring the medium resolution patch. In this case the image processing apparatus 250 acquires the medium resolution patch by transforming the low resolution image acquired by the preprocess using the forth rank tensor. The preprocess may include a process of transforming the facial image included in the input image using a fifth rank tensor acquired in consideration of the orientation of the face, degree of illumination, facial expression, person and pixel as targets. Facial images different in the orientation of the face, degree of illumination, facial expression and person can be used as the learning images for acquiring the fifth rank tensor.

It is preferable that the preprocess include a process aligning the position of the facial images included in the input image. For instance, the facial images may be aligned by an affine transformation. More specifically, the parameters of the affine transformation are optimized, thereby aligning the position of the facial images after the affine transformation and the facial images for leaning. It is a matter of course that the facial images for learning are preferably aligned such that the positions thereof meet with each other.

An example of the high image quality processing using the locality preserving projection (LPP) will hereinafter be described. In the learning stage, the eigenvectors are calculated by the locality preserving projection (LPP) from the low resolution images and the high resolution images as the learning images. In the LPP space, the low resolution images and the high resolution images are associated with each other as the weight of the network by a radial basis function. A residual image between the medium resolution image and the low resolution image acquired using the low resolution image of the learning image as the input, and a residual image between the high resolution image of the learning image and the medium resolution image are calculated. The image processing apparatus 250 stores the residual image between the medium resolution image and the low resolution image and the residual image between the high resolution image of the learning image and the medium resolution image, for every patch.

When the image processing apparatus 250 makes the input image as a target of the high image quality processing into high image quality, the image processing apparatus 250 generates the eigenvector by the locality preserving projection (LPP) from the input image, and the medium resolution image from the radial basis function acquired in the learning step. The image processing apparatus 250 calculates a residual image between the medium resolution image and the input facial image. The image processing apparatus 250 select the residual image between the corresponding high resolution image and the medium resolution image from the stored residual images for every patch by the locally linear embedding (LLE) and the nearest neighbor search. The image processing apparatus 250 then generates the high resolution image by adding the residual image acquired by smoothing the selected residual image between the high resolution image and the medium resolution image to the medium resolution image generated from the input image.

In super-resolution processing based on the principal component analysis as described in Japanese Patent Application Laid-Open No. 2006-350498, the image of the object is represented by the principal component vector and the weight coefficient. The amount of data of these the principal component vector and the weight coefficient is significantly smaller than the amount of the pixel data that the image of the object itself has. In a compression process of compressing the image in the characteristic areas in the plurality of taken images acquired from the imager 212, the image processor 804 may then calculate the weight coefficient from the image of the object included in the characteristic area. That is, the image processor 804 can compress the image of the object included in the characteristic area by representation using the principal component vector and the weight coefficient. The image processor 804 may then transmit the principal component vector and the weight coefficient to the image processing apparatus

250. In this case, the image processing apparatus 250 can reconstruct the image of the object included in the characteristic area using the principal component vector and the weight coefficient acquired from the image processor 804. Needless to say, the image processor 804 can compress the image of the object included in the characteristic area utilizing the model representing the object using various characteristic parameters, instead of the model based on the principal component analysis as described in Japanese Patent Application Laid-Open No. 2006-350498.

In the configuration of the image processing system 200 described in relation to FIGS. 13 to 27, the image processing apparatus 250 and the display apparatus 260 can apply the super-resolution processing, as the high image quality processing, to the characteristic area image. In the image processing systems 200 and 201, the compressor 232 can further compress the taken image by represent the image using principal component vector and the weight coefficient, as with the image processing apparatus 220.

The operations as the image processing systems 200 and 201 have thus been described above with the example of the monitoring system. As another usage of the present invention, which can be applied to high quality image processing and coding on a document scanned by a scanning apparatus such as a copier. For instance, if areas of images, tables, photographs and the like are regarded as the characteristic areas, the high image quality processing such as the super-resolution processing can be applied as the high resolution processing to the areas. The characteristic area detection process and the compression process can be applied to the detection and coding of the characteristic area. Likewise, also in an endoscope system, the characteristic area detection process, high image quality processing, and compression process can be applied to detection, the high quality image processing and coding of interior parts of the body.

<Modification 1>

In the image processing systems 200 and 201, the examples including the plurality of imaging apparatuses 210A to 210D have been described. However, the number of the imaging apparatuses 210 is not limited; the number may be one. The number of display apparatuses 260 is not limited; the number may be one.

<Modification 2>

In the image processing systems 200 and 201, the characteristic area is identified from the taken image (frame image or field image) in the moving image data. However, this technique can be applied not only to the moving image data but also to a still image data.

<Modification 3>

In the image processing systems 200 and 201, the configuration capable of detecting the plurality of characteristic areas from one taken image has been described. However, the number of characteristic area is not limited. The number of characteristic areas may be one in one taken image.

<Modification 4>

The device for acquiring the learning image group is not limited to the mode where the image group of the pairs of high and low quality images are preliminarily prepared. Only the high quality image may be provided, and the pairs of images may acquired by generating the low quality images from the high quality images. For instance, a mode can be adopted where the processing device for performing the low quality image processing (low quality image processing device) is provided in the image processing apparatus and the learning image pairs are acquired by receiving the high quality learning images and making the images into low image quality in the apparatus.

In cases of the image processing systems 200 and 201 illustrated in FIGS. 13 and 27, the mode is not limited to that where the learning images are provided from the preliminarily provided database or the like. Instead, operation of the system can update the learning contents on the basis of the images actually acquired in the imaging apparatus 210 or images cut out from the images (partial images). The precision of transformation may further be improved by capturing appropriate learning images according to the usage of the system or the place where the imaging apparatus is placed and performing the learning step again.

<Modification 5>

In the above embodiment, the example of learning the image data and performing the image transformation of high image quality processing has been described. However the present invention is not limited to the high quality image processing. Instead, the present invention can be applied to another image transformation such as image recognition. The data to be processed is not limited to the images. Likewise, the technique can be applied to various types of data other than images. More specifically, the configurations described as the image processing apparatus, image processing device and image processing system may be expanded to those of a data processing apparatus, data processing device and data processing system.

<Application to Image Recognition>

An application to a technique of personal identification based on image recognition will be described as an application other than to the high quality image processing. In this case, at least one of both the similar processes to those up to the intermediate eigenspace in the high quality image processes illustrated in FIGS. 2, 3 and 6, and processes of directly inputting the output from the second sub-tensor projection step #34 in FIG. 3 (the eigenspace projector 134 and the coefficient vector correction processor 140 in FIG. 6) into the synthesis step #66 in FIG. 3 (the adding section 160 or the synthesizer 166 in FIG. 6) and combining this input with a calculated value from the generalized super-resolution processing step #64 in FIG. 3 (this may be another projection including, for example: a frequency transformation, such as the FFT, DCT and wavelet, other than the general-purpose super-resolution processor 164 in FIG. 6 and the generalized super-resolution processing; the orthogonal transformation such as KL transformation; the linear/nonlinear subspace transformation, such as the ICA, PCA and kPCA, and the geometrical transformation) according to a calculated value from the weight coefficient calculation step #62 in FIG. 3 (calculator 162 in FIG. 6), thereby allowing personal identification using the positional relationship of the coefficient vectors in the intermediate eigenspace. The positional relationship may be acquired according to the acquiring method of the "coefficient vector correction processor 140" and the distance and orientation may be acquired. That is, the nearer the distance and orientation of the acquired input data to the learning data, the higher the possibility that the object is the target object is.

More specifically, similarity with a specific person (e.g., identity of "person A") can be determined from the positional relationship between the learning data in the intermediate eigenspace (individual difference eigenspace) and the newly inputted data.

As to the facial image to be inputted, various conditions such as facing the front, facing right, facing left, . . . , etc., may be considered. The characteristics that any input of the image in any direction condenses into one point in the intermediate eigenspace (e.g., the individual difference eigenspace) via orientation modalities such as facing the front, facing right, facing left, . . . , etc. may be utilized, thereby exerting a new advantageous effect that one or more conditions can precisely be handled according to a single standard.

It is not limited to the modality of "orientation". The technique can be applied to the resolution modality, such as the low resolution, medium resolution, high resolution, . . . , etc., and the various modalities having one or more conditions in a similar manner. Thus, one or more conditions can precisely be handled under a single standard by utilizing the characteristics that any input of the image having any condition with respect to a certain modality condenses into one point in the intermediate eigenspace via the specific modality.

<Application to Speech Recognition>

An example of application to the speech recognition will be described as an example of handling data other than images. Audio data is processed as a target, instead of the image data; at least one of both the similar processes to those up to the intermediate eigenspace in the high quality image processes illustrated in FIGS. 2, 3 and 6, and processes of directly inputting the output from the second sub-tensor projection step #34 in FIG. 3 (the eigenspace projector 134 and the coefficient vector correction processor 140 in FIG. 6) into the synthesis step #66 in FIG. 3 (adding section 160 or the synthesizer 166 in FIG. 6) and combining this input with a calculated value from the generalized super-resolution processing step #64 in FIG. 3 (this may be another projection including, for example: a frequency transformation, such as the FFT, DCT and wavelet, other than the general-purpose super-resolution processor 164 in FIG. 6 and the generalized super-resolution processing; the orthogonal transformation such as KL transformation; the linear/nonlinear subspace transformation, such as the ICA, PCA and kPCA, and the geometrical transformation) according to a calculated value from the weight coefficient calculation step #62 in FIG. 3 (calculator 162 in FIG. 6), thereby allowing speech recognition using the positional relationship of the coefficient vectors in the intermediate eigenspace. As to the positional relationship, the direction, orientation and the like may be acquired by the acquiring method of the "coefficient vector correction processor 140". That is, the nearer the distance and orientation of the acquired input data to the learning data, the higher the possibility that the object is the target object is.

In this case, for instance, a modality of the number of audio sampling (low resolution and high resolution) of audio data is applied to the pixel modality (low resolution and high resolution) described with respect to the image data. Further, the signal-to-noise ratio (S/N) and the positions of a sound source and microphone (sensor) can be handled as the modalities.

According to the related method, it is required that learning eigenspaces for speech recognition are provided according to the number of sampling frequencies, such as 48 kHz, 44.1 kHz and 32 kHz, and the number of quantization levels, such as 16-bit, 8-bit.

In contrast thereto, according to the present invention, the determination is made in the common learning eigenspace for speech recognition (corresponding to "intermediate eigenspace"). Accordingly, the recognition can be commonly supported a single determination standard, even in cases of the plural number of sampling and quantization levels. Therefore, an advantages effect is exerted that negating the need for adjusting the determination standard according to the cases. Further, this projection and the other systems can be discriminated from each other according to the degree of deviation of the input condition, thereby enhancing the processing speed. A similar advantageous effect is exerted even in cases of modalities of the S/N, the position of sound source microphone and the like.

<Application to Language Processing>

An example of application to language processing will be described as another example of handling data other than images. Language data (this may be audio data or character data) is processed as a target, instead of the image data; at least one of both the similar processes to those up to the intermediate eigenspace in the high quality image processes illustrated in FIGS. 2, 3 and 6, and processes of directly inputting the output from the second sub-tensor projection step #34 in FIG. 3 (the eigenspace projector 134 and the coefficient vector correction processor 140 in FIG. 6) into the synthesis step #66 in FIG. 3 (adding section 160 or the synthesizer 166 in FIG. 6) and combining this input with a calculated value from the generalized super-resolution processing step #64 in FIG. 3 (this may be another projection including, for example: a frequency transformation, such as the FFT, DCT and wavelet, other than the general-purpose super-resolution processor 164 in FIG. 6 and the generalized super-resolution processing; the orthogonal transformation such as KL transformation; the linear/nonlinear subspace transformation, such as the ICA, PCA and kPCA, and the geometrical transformation) according to a calculated value from the weight coefficient calculation step #62 in FIG. 3 (calculator 162 in FIG. 6), thereby allowing language processing using the positional relationship of the coefficient vectors in the intermediate eigenspace. As to the positional relationship, the direction, orientation and the like may be acquired by the acquiring method of the "coefficient vector correction processor 140". That is, the nearer the distance and orientation of the acquired input data to the learning data, the higher the possibility that the object is the target object is.

In this case, for instance, a language modality (Japanese and English) is applied to the pixel modality (low resolution and high resolution) described with respect to the image data. Further, the region (dialect), usage (formal (news) and informal), period (Heian, Edo and present) and generation (high school students and the elderly) can be handled as the modalities.

According to the related method, it is required that learning eigenspaces for language recognition are provided with respect to the languages such as Japanese and English.

In contrast thereto, according to the present invention, the determination is made in the common learning eigenspace for language recognition (corresponding to "intermediate eigenspace"). Accordingly, the recognition can be commonly supported a single determination standard, even in cases of the plurality of languages. Therefore, an advantages effect is exerted that negating the need for adjusting the determination standard according to the cases. Further, this projection and the other systems can be discriminated from each other according to the degree of deviation of the input condition, thereby enhancing the processing speed. A similar advantageous effect is exerted even in cases of modalities of the region, usage, period, generation and the like.

<Application to Biological Information Processing>

An example of application to biological information processing will be described as another example of handling data other than images. The biological information includes, for instance, the wave form, period, amplitude and the like of heartbeat, pulsation, blood pressure, respiration and perspiration. Biological information data is processed as a target, instead of the image data; at least one of both the similar processes to those up to the intermediate eigenspace in the high quality image processes illustrated in FIGS. 2, 3 and 6, and processes of directly inputting the output from the second sub-tensor projection step #34 in FIG. 3 (the eigenspace projector 134 and the coefficient vector correction processor 140 in FIG. 6) into the synthesis step #66 in FIG. 3 (adding section 160 or the synthesizer 166 in FIG. 6) and combining this input with a calculated value from the generalized super-resolution processing step #64 in FIG. 3 (this may be another projection including, for example: a frequency transformation, such as the FFT, DCT and wavelet, other than the general-purpose super-resolution processor 164 in FIG. 6 and the generalized super-resolution processing; the orthogonal transformation such as KL transformation; the linear/nonlinear subspace transformation, such as the ICA, PCA and kPCA, and the geometrical transformation) according to a calculated value from the weight coefficient calculation step #62 in FIG. 3 (calculator 162 in FIG. 6), thereby allowing biological information processing using the positional relationship of the coefficient vectors in the intermediate eigenspace. As to the positional relationship, the direction, orientation and the like may be acquired by the acquiring method of the "coefficient vector correction processor 140". That is, the nearer the distance and orientation of the acquired input data to the learning data, the higher the possibility that the object is the target object is.

In this case, for instance, the number of data sampling of a biological information modality (low resolution and high resolution) is applied to the pixel modality (low resolution and high resolution) described with respect to the image data. Further, the signal-to-noise ratio (S/N) and the positions of signal source and sensor can be handled as the modalities.

According to the related method, it is required that learning eigenspaces for biological information processing are provided according to the number of sampling frequencies and the number of quantization levels.

In contrast thereto, according to the present invention, the determination is made in the common learning eigenspace for biological information processing (corresponding to "intermediate eigenspace"). Accordingly, the recognition can be commonly supported a single determination standard, even in cases of the plural number of sampling and quantization levels. Therefore, an advantages effect is exerted that negating the need for adjusting the determination standard according to the cases. Further, this projection and the other systems can be discriminated from each other according to the degree of deviation of the input condition, thereby enhancing the processing speed. A similar advantageous effect is exerted even in cases of modalities of the S/N, the position of sensor and the like.

<Application to Natural and Physical Information Processing>

An example of application to natural and physical information processing will be described as another example of handling data other than images. The natural and physical information includes, for instance, the wave form, period, amplitude and the like of weather, climate and earthquake. Natural and physical information data is processed as a target, instead of the image data; at least one of both the similar processes to those up to the intermediate eigenspace in the high quality image processes illustrated in FIGS. 2, 3 and 6, and processes of directly inputting the output from the second sub-tensor projection step #34 in FIG. 3 (the eigenspace projector 134 and the coefficient vector correction processor 140 in FIG. 6) into the synthesis step #66 in FIG. 3 (adding section 160 or the synthesizer 166 in FIG. 6) and combining this input with a calculated value from the generalized super-resolution processing step #64 in FIG. 3 (this may be another projection including, for example: a frequency transformation, such as the FFT, DCT and wavelet, other than the general-purpose super-resolution processor 164 in FIG. 6 and the generalized super-resolution processing; the orthogonal transformation such as KL transformation; the linear/nonlinear subspace transformation, such as the ICA, PCA and kPCA, and the geometrical transformation) according to a calculated value from the weight coefficient calculation step #62 in FIG. 3 (calculator 162 in FIG. 6), thereby allowing natural and physical information processing using the positional relationship of the coefficient vectors in the intermediate eigenspace. As to the positional relationship, the direction, orientation and the like may be acquired by the acquiring method of the "coefficient vector correction processor 140". That is, the nearer the distance and orientation of the acquired input data to the learning data, the higher the possibility that the object is the target object is.

In this case, for instance, the number of data sampling modality (low resolution and high resolution) is applied to the pixel modality (low resolution and high resolution) described with respect to the image data. Further, the signal-to-noise ratio (S/N) and the positions of signal source and sensor can be handled as the modalities.

According to the related method, it is required that learning eigenspaces for natural and physical information processing are provided according to the number of sampling frequencies and the number of quantization levels.

In contrast thereto, according to the present invention, the determination is made in the common learning eigenspace for natural and physical information processing (corresponding to "intermediate eigenspace"). Accordingly, the recognition can be commonly supported a single determination standard, even in cases of the plural number of sampling and quantization levels. Therefore, an advantages effect is exerted that negating the need for adjusting the determination standard according to the cases. Further, this projection and the other systems can be discriminated from each other according to the degree of deviation of the input condition, thereby enhancing the processing speed. A similar advantageous effect is exerted even in cases of modalities of the S/N, the position of sensor and the like.

What is claimed is:

1. An image processing apparatus, comprising:
an information acquisition device for acquiring an eigen projective matrix generated by a projective operation from a learning image group including pairs of first quality images and second quality images different in image quality from each other, and a projective kernel tensor generated from the learning image group and the eigen projective matrix;
a first sub-kernel tensor generation device for generating a first sub-kernel tensor satisfying a condition specified by a first setting from the acquired projective kernel tensor;
a second sub-kernel tensor generation device for generating a second sub-kernel tensor satisfying a condition specified by a second setting from the acquired projective kernel tensor;
a first sub-tensor projection device for projecting an input image as a processing target using a first projective operation utilizing the eigen projective matrix and the first sub-kernel tensor, and calculating a coefficient vector in an intermediate eigenspace;
a second sub-tensor projection device for generating a modified image having a different image quality from that of the input image by projecting the calculated coefficient vector using a second projective operation utilizing the second sub-kernel tensor and the eigen projective matrix;
a high image quality processing device for generating a high quality image having the same size as that of the modified image from the input image;

a learning image coefficient vector acquisition device for acquiring a coefficient vector of the learning image in the intermediate eigenspace;

a weight coefficient determination device for determining a weight coefficient according to a mutual relationship between the coefficient vector of the learning image in the intermediate eigenspace and the coefficient vector of the input image in the intermediate eigenspace calculated by the first sub-tensor projection device; and a synthesis device for determining an adopting ratio between a process including the first and second projective operations and a process by the high image quality processing device according to the weight coefficient, and combining the modified image and the high quality image.

2. The image processing apparatus according to claim 1, further comprising
a learning image coefficient vector storing device for storing the coefficient vector of the learning image in the intermediate eigenspace.

3. The image processing apparatus according to claim 1, wherein the weight coefficient determination device includes a weight coefficient calculation device for calculating the weight coefficient used for the synthesis device according to the mutual relationship between the coefficient vector of the learning image in the intermediate eigenspace and the coefficient vector of the input image in the intermediate eigenspace.

4. The image processing apparatus according to claim 1, wherein the weight coefficient determination device determines the weight coefficient utilizing a reliability coefficient determined from a mutual relationship between a representative coefficient vector in a distribution of coefficient vectors of the input image and the coefficient vector in each area with respect to a distribution of the coefficient vectors of the input image in the intermediate eigenspace where the number of divisions is regarded as a sample when the input image is divided into a plurality of areas.

5. The image processing apparatus according to claim 1, wherein the weight coefficient determination device determines the weight coefficient in consideration of a reconstruction error represented according to a difference between the predetermined coefficient vector of the learning image in the intermediate eigenspace and a high quality image to be generated from the input image.

6. The image processing apparatus according to claim 1, wherein the weight coefficient calculation device determines the weight coefficient such that, relatively the longer the shortest distance between a representative coefficient vector representing a learning image coefficient vector group including at least one coefficient vector of the learning image in the intermediate eigenspace and the coefficient vector of the input image in the eigenspace, the greater an adopting ratio of a process by the high image quality processing device is specified.

7. The image processing apparatus according to claim 6, wherein the weight coefficient determination device determines the weight coefficient with reference to a lookup table representing a relationship of the weight coefficient with the shortest distance between the pre-stored representative coefficient vector and the coefficient vector of the input image in the intermediate eigenspace, on the basis of the shortest distance between the representative coefficient vector and the coefficient vector of the input image in the intermediate eigenspace.

8. The image processing apparatus according to claim 6, wherein the shortest distance to the coefficient vector of the input image in the eigenspace is represented as any one of the Euclidean distance, Mahalanobis distance and KL distance.

9. The image processing apparatus according to claim 6, wherein the representative coefficient vector is any one of the average value, median value, maximum value and minimum value of the coefficient vectors of the learning image included in the learning image coefficient vector group.

10. The image processing apparatus according to claim 6, wherein the representative coefficient vector is the coefficient vector of the leaning image representing the center of gravity or circumferential boundary of the learning image coefficient vector group.

11. The image processing apparatus according to claim 1, wherein the weight coefficient determination device determines the weight coefficient, according to a degree of similarity in direction between a representative coefficient vector representing a learning image coefficient vector group including at least one coefficient vector of the learning image in the eigenspace and the coefficient vector of the input image in the eigenspace, such that relatively the lower the degree of similarity, the greater an adopting ratio of a process by the high image quality processing device is specified.

12. The image processing apparatus according to claim 11, wherein the degree of similarity between the direction of the representative coefficient vector and the coefficient vector of the input image in the eigenspace is represented as any one of an angle, an inner product, and an outer product between the representative coefficient vector and the coefficient vector of the input image in the eigenspace.

13. The image processing apparatus according to claim 1, wherein the weight coefficient determination device determines the weight coefficient, with respect to a distribution of a learning image coefficient vector group including at least one coefficient vector of the learning image in the eigenspace and a distribution of the coefficient vector of the input image in the eigenspace where the number of divisions is regarded as a sample when the input image is divided into a plurality of areas, such that, the wider the distribution spread of the coefficient vector of the input image in comparison with that of the learning image coefficient vector group, the greater an adopting ratio of a process by the high image quality processing device is specified.

14. The image processing apparatus according to claim 13, wherein the distribution spread of the coefficient vector of the input image in the eigenspace where the number of divisions of the input image is regarded as the sample is represented as the number of samples included in the distribution of the coefficient vector of the input image.

15. The image processing apparatus according to claim 13, wherein the distribution spread of the coefficient vector of the input image in the eigenspace where the number of divisions of the input image is regarded as a sample and the distribution spread of the learning image coefficient vector group are represented in any one of a variance and a standard deviation.

16. The image processing apparatus according to claim 1, wherein the weight coefficient is calculated so that the distribution profile of the learning image coefficient vector group including at least one coefficient vector of the learning image in the eigenspace and the distribution profile of the coefficient vector of the input image in the eigenspace where the number of divisions is regarded as a sample when the input image is divided into a plurality of areas, such that the higher a degree of similarity between the distribution profile of the learning image coefficient vector group and the distribution profile of the coefficient vector of the input image in the eigenspace, the greater an adopting ratio of a process including the first and second projective operations.

17. The image processing apparatus according to claim 1, wherein the synthesis device includes a filtering process device for applying a filtering process to a boundary between the modified image and the high quality image.

18. The image processing apparatus according to claim 1, wherein the first quality image is a relatively low quality image of the pair of images,
the second quality image is a relatively high quality image of the pair of images, and
the modified quality image is an image with higher quality than that of the input image.

19. The image processing apparatus according to claim 1, wherein the first setting designates a projective relationship projecting the first quality image to the intermediate eigenspace, and
the second setting designates a projective relationship projecting the second quality image to the intermediate eigenspace.

20. The image processing apparatus according to claim 1, wherein the projective operation is any one of locality preserving projection (LPP), locally linear embedding (LLE) and linear tangent-space alignment (LTSA).

21. The image processing apparatus according to claim 1, wherein the learning image group includes the pairs of images regarding a human face as a target, and
the intermediate eigenspace is a personal difference eigenspace.

22. The image processing apparatus according to claim 1, further comprising:
a first characteristic area identification device for identifying a first characteristic area in the inputted image;
a compression process device for compressing an image part of the first characteristic area with respect to the inputted image by a first degree of compression and compressing an image part other than the first characteristic area by a second degree of compression greater than the first degree of compression; and
an image quality modification device for modifying image quality by projecting at least the first characteristic area by the first and the second sub-tensor projection devices.

23. An image processing apparatus, comprising:
an information acquisition device for acquiring an eigen projective matrix generated by a projective operation from a learning image group including pairs of first quality images and second quality images different in image quality from each other, a first sub-kernel tensor satisfying a condition specified by a first setting generated using a projective kernel tensor generated from the learning image group and the eigen projective matrix, and a second sub-kernel tensor satisfying a condition specified by a second setting generated using the projective kernel tensor;
a first sub-tensor projection device for projecting an input image as a processing target using a first projective operation utilizing the eigen projective matrix and the first sub-kernel tensor, and calculating a coefficient vector in an intermediate eigenspace;

a second sub-tensor projection device for generating a modified image having a different image quality from that of the input image by projecting the calculated coefficient vector using a second projective operation utilizing the second sub-kernel tensor and the eigen projective matrix;
a high image quality processing device for generating a high quality image having the same size as that of the modified image from the input image;
a learning image coefficient vector acquisition device for acquiring a coefficient vector of the learning image in the intermediate eigenspace;
a weight coefficient determination device for determining a weight coefficient according to a mutual relationship between the coefficient vector of the learning image in the intermediate eigenspace and the coefficient vector of the input image in the intermediate eigenspace calculated by the first sub-tensor projection device; and
a synthesis device for determining an adopting ratio between a process including the first and second projective operations and a process by the high image quality processing device according to the weight coefficient, and combining the modified image and the high quality image.

24. An image processing apparatus, comprising:
an eigen projective matrix generation device for generating an eigen projective matrix generated by a projective operation from a learning image group including pairs of first quality images and second quality images different in image quality from each other;
a projective kernel tensor generation device for generating a projective kernel tensor specifying a corresponding relationship between the first quality images and an intermediate eigenspace and a corresponding relationship between the second quality images and the intermediate eigenspace;
a first sub-kernel tensor acquisition device for generating a first sub-kernel tensor satisfying a condition specified by a first setting from the generated projective kernel tensor;
a second sub-kernel tensor acquisition device for generating a second sub-kernel tensor satisfying a condition specified by a second setting from the generated projective kernel tensor;
a first sub-tensor projection device for projecting an input image as a processing target using a first projective operation utilizing the eigen projective matrix and the first sub-kernel tensor, and calculating a coefficient vector in the intermediate eigenspace;
a second sub-tensor projection device for generating a modified image having a different image quality from that of the input image by projecting the calculated coefficient vector using a second projective operation utilizing the second sub-kernel tensor and the eigen projective matrix;
a high image quality processing device for generating a high quality image having the same size as that of the modified image from the input image;
a learning image coefficient vector acquisition device for acquiring a coefficient vector of the learning image in the intermediate eigenspace;
a weight coefficient determination device for determining a weight coefficient according to a mutual relationship between the coefficient vector of the learning image in the intermediate eigenspace and the coefficient vector of the input image in the intermediate eigenspace calculated by the first sub-tensor projection device; and a synthesis device for determining an adopting ratio between a process including the first and second projective operations and a process by the high image quality processing device according to the weight coefficient, and combining the modified image and the high quality image.

25. The image processing apparatus according to claim 24, further comprising a learning image coefficient vector calculation device for calculating the coefficient vector of the learning image in the intermediate eigenspace by projecting the learning image using the first projective operation utilizing the eigen projective matrix and the first sub-kernel tensor, instead of the learning image coefficient vector acquisition device.

26. An image processing method, including:

an information acquiring step of acquiring an eigen projective matrix generated by a projective operation from a learning image group including pairs of first quality images and second quality images different in image quality from each other, and a projective kernel tensor generated from the learning image group and the eigen projective matrix;

a first sub-kernel tensor generating step of generating a first sub-kernel tensor satisfying a condition specified by a first setting from the acquired projective kernel tensor;

a second sub-kernel tensor generating step of generating a second sub-kernel tensor satisfying a condition specified by a second setting from the acquired projective kernel tensor;

a first sub-tensor projecting step of projecting an input image as a processing target using a first projective operation utilizing the eigen projective matrix and the first sub-kernel tensor, and calculating a coefficient vector in an intermediate eigenspace;

a second sub-tensor projecting step of generating a modified image having a different image quality from that of the input image by projecting the calculated coefficient vector using a second projective operation utilizing the second sub-kernel tensor and the eigen projective matrix;

a high image quality processing step of generating a high quality image having the same size as that of the modified image from the input image;

a learning image coefficient vector acquiring step of acquiring a coefficient vector of the learning image in the intermediate eigenspace;

a weight coefficient determining step of determining a weight coefficient according to a mutual relationship between the coefficient vector of the learning image in the intermediate eigenspace and the coefficient vector of the input image in the intermediate eigenspace calculated by the first sub-tensor projecting step; and a synthesis step of determining an adopting ratio between a process including the first and second projective operations and a process by the high image quality processing step according to the weight coefficient, and combining the modified image and the high quality image.

27. An image processing method, including:

an information acquiring step of acquiring an eigen projective matrix generated by a projective operation from a learning image group including pairs of first quality images and second quality images different in image quality from each other, a first sub-kernel tensor satisfying a condition specified by a first setting generated using a projective kernel tensor generated from the learning image group and the eigen projective matrix, and a second sub-kernel tensor satisfying a condition specified by a second setting generated using the projective kernel tensor;

a first sub-tensor projecting step of projecting an input image as a processing target using a first projective operation utilizing the eigen projective matrix and the first sub-kernel tensor, and calculating a coefficient vector in an intermediate eigenspace;

a second sub-tensor projecting step of generating a modified image having a different image quality from that of the input image by projecting the calculated coefficient vector using a second projective operation utilizing the second sub-kernel tensor and the eigen projective matrix;

a high image quality processing step of generating a high quality image having the same size as that of the modified image from the input image;

a learning image coefficient vector acquiring step of acquiring a coefficient vector of the learning image in the intermediate eigenspace;

a weight coefficient determining step of determining a weight coefficient according to a mutual relationship between the coefficient vector of the learning image in the intermediate eigenspace and the coefficient vector of the input image in the intermediate eigenspace calculated by the first sub-tensor projecting step; and a synthesis step of determining an adopting ratio between a process including the first and second projective operations and a process by the high image quality processing step according to the weight coefficient, and combining the modified image and the high quality image.

28. An image processing method, including:

an eigen projective matrix generating step of generating an eigen projective matrix generated by a projective operation from a learning image group including pairs of first quality images and second quality images different in image quality from each other;

a projective kernel tensor generating step of generating a projective kernel tensor specifying a corresponding relationship between the first quality images and an intermediate eigenspace and a corresponding relationship between the second quality images and the intermediate eigenspace;

a first sub-kernel tensor acquiring step of generating a first sub-kernel tensor satisfying a condition specified by a first setting from the generated projective kernel tensor;

a second sub-kernel tensor acquiring step of generating a second sub-kernel tensor satisfying a condition specified by a second setting from the generated projective kernel tensor;

a first sub-tensor projecting step of projecting an input image as a processing target using a first projective operation utilizing the eigen projective matrix and the first sub-kernel tensor, and calculating a coefficient vector in the intermediate eigenspace;

a second sub-tensor projecting step of generating a modified image having a different image quality from that of the input image by projecting the calculated coefficient vector using a second projective operation utilizing the second sub-kernel tensor and the eigen projective matrix;

a high image quality processing step of generating a high quality image having the same size as that of the modified image from the input image;

a learning image coefficient vector acquiring step of acquiring a coefficient vector of the learning image in the intermediate eigenspace;

a weight coefficient determining step of determining a weight coefficient according to a mutual relationship between the coefficient vector of the learning image in the intermediate eigenspace and the coefficient vector of the input image in the intermediate eigenspace calculated by the first sub-tensor projection step; and a synthesis step of determining an adopting ratio between a process including the first and second projective operations and a process by the high image quality processing step according to the weight coefficient, and combining the modified image and the high quality image.

29. A non-transitory computer-readable medium in which computer readable code of an image processing program is stored, wherein the image processing program causes a computer to function as:

an information acquisition device for acquiring an eigen projective matrix generated by a projective operation from a learning image group including pairs of first quality images and second quality images different in image quality from each other, and a projective kernel tensor generated from the learning image group and the eigen projective matrix;

a first sub-kernel tensor generation device for generating a first sub-kernel tensor satisfying a condition specified by a first setting from the acquired projective kernel tensor;

a second sub-kernel tensor generation device for generating a second sub-kernel tensor satisfying a condition specified by a second setting from the acquired projective kernel tensor;

a first sub-tensor projection device for projecting an input image as a processing target using a first projective operation utilizing the eigen projective matrix and the first sub-kernel tensor, and calculating a coefficient vector in an intermediate eigenspace;

a second sub-tensor projection device for generating a modified image having a different image quality from that of the input image by projecting the calculated coefficient vector using a second projective operation utilizing the second sub-kernel tensor and the eigen projective matrix;

a high image quality processing device for generating a high quality image having the same size as that of the modified image from the input image;

a learning image coefficient vector acquisition device for acquiring a coefficient vector of the learning image in the intermediate eigenspace;

a weight coefficient determination device for determining a weight coefficient according to a mutual relationship between the coefficient vector of the learning image in the intermediate eigenspace and the coefficient vector of the input image in the intermediate eigenspace calculated by the first sub-tensor projection device; and a synthesis device for determining an adopting ratio between a process including the first and second projective operations and a process by the high image quality processing device according to the weight coefficient, and combining the modified image and the high quality image.

30. A non-transitory computer-readable medium in which computer readable code of an image processing program is stored, wherein the image processing program causes a computer to function as:

an information acquisition device for acquiring an eigen projective matrix generated by a projective operation from a learning image group including pairs of first quality images and second quality images different in image quality from each other, a first sub-kernel tensor satisfying a condition specified by a first setting generated using a projective kernel tensor generated from the learning image group and the eigen projective matrix, and a second sub-kernel tensor satisfying a condition specified by a second setting generated using the projective kernel tensor;

a first sub-tensor projection device for projecting an input image as a processing target using a first projective operation utilizing the eigen projective matrix and the first sub-kernel tensor, and calculating a coefficient vector in an intermediate eigenspace;

a second sub-tensor projection device for generating a modified image having a different image quality from that of the input image by projecting the calculated coefficient vector using a second projective operation utilizing the second sub-kernel tensor and the eigen projective matrix;

a high image quality processing device for generating a high quality image having the same size as that of the modified image from the input image;

a learning image coefficient vector acquisition device for acquiring a coefficient vector of the learning image in the intermediate eigenspace;

a weight coefficient determination device for determining a weight coefficient according to a mutual relationship between the coefficient vector of the learning image in the intermediate eigenspace and the coefficient vector of the input image in the intermediate eigenspace calculated by the first sub-tensor projection device; and a synthesis device for determining an adopting ratio between a process including the first and second projective operations and a process by the high image quality processing device according to the weight coefficient, and combining the modified image and the high quality image.

31. A non-transitory computer-readable medium in which computer readable code of an image processing program is stored, wherein the image processing program causes a computer to function as:

an eigen projective matrix generation device for generating an eigen projective matrix generated by a projective operation from a learning image group including pairs of first quality images and second quality images different in image quality from each other;

a projective kernel tensor generation device for generating a projective kernel tensor specifying a corresponding relationship between the first quality images and an intermediate eigenspace and a corresponding relationship between the second quality images and the intermediate eigenspace;

a first sub-kernel tensor acquisition device for generating a first sub-kernel tensor satisfying a condition specified by a first setting from the generated projective kernel tensor;

a second sub-kernel tensor acquisition device for generating a second sub-kernel tensor satisfying a condition specified by a second setting from the generated projective kernel tensor;

a first sub-tensor projection device for projecting an input image as a processing target using a first projective operation utilizing the eigen projective matrix and the first sub-kernel tensor, and calculating a coefficient vector in the intermediate eigenspace;

a second sub-tensor projection device for generating a modified image having a different image quality from that of the input image by projecting the calculated coefficient vector using a second projective operation utilizing the second sub-kernel tensor and the eigen projective matrix;
a high image quality processing device for generating a high quality image having the same size as that of the modified image from the input image;
a learning image coefficient vector acquisition device for acquiring a coefficient vector of the learning image in the intermediate eigenspace;
a weight coefficient determination device for determining a weight coefficient according to a mutual relationship between the coefficient vector of the learning image in the intermediate eigenspace and the coefficient vector of the input image in the intermediate eigenspace calculated by the first sub-tensor projection device; and
a synthesis device for determining an adopting ratio between a process including the first and second projective operations and a process by the high image quality processing device according to the weight coefficient, and combining the modified image and the high quality image.

* * * * *